(12) United States Patent
Shine et al.

(10) Patent No.: US 12,433,869 B2
(45) Date of Patent: Oct. 7, 2025

(54) PREVENTING AND TREATING MALARIA

(71) Applicants: Ian Basil Shine, Swampscott, MA (US); Thomas Adam Shine, Brookline, MA (US)

(72) Inventors: Ian Basil Shine, Swampscott, MA (US); Thomas Adam Shine, Brookline, MA (US)

(73) Assignees: Ian Basil Shine, Swampscott, MA (US); Thomas Adam Shine, Brookline, MA (US)

( * ) Notice: Subject to any disclaimer, the term of this patent is extended or adjusted under 35 U.S.C. 154(b) by 903 days.

(21) Appl. No.: 17/605,025

(22) PCT Filed: Apr. 21, 2020

(86) PCT No.: PCT/US2020/029114
§ 371 (c)(1),
(2) Date: Oct. 20, 2021

(87) PCT Pub. No.: WO2020/219445
PCT Pub. Date: Oct. 29, 2020

(65) Prior Publication Data
US 2022/0211670 A1 Jul. 7, 2022

Related U.S. Application Data

(60) Provisional application No. 62/943,689, filed on Dec. 4, 2019, provisional application No. 62/836,997, filed on Apr. 22, 2019.

(51) Int. Cl.
| *A61K 31/4045* | (2006.01) |
| *A61K 31/405* | (2006.01) |
| *A61K 45/06* | (2006.01) |
| *A61P 33/06* | (2006.01) |
| *C12N 5/078* | (2010.01) |
| *G01N 33/50* | (2006.01) |

(52) U.S. Cl.
CPC ........ *A61K 31/4045* (2013.01); *A61K 31/405* (2013.01); *A61K 45/06* (2013.01); *A61P 33/06* (2018.01); *C12N 5/0641* (2013.01); *G01N 33/5091* (2013.01); *G01N 2333/445* (2013.01)

(58) Field of Classification Search
CPC .................................................. A61K 31/4045
See application file for complete search history.

(56) References Cited

U.S. PATENT DOCUMENTS

| 4,159,895 A | 7/1979 | Shine |
| 4,278,936 A | 7/1981 | Shine |
| 6,086,918 A | 7/2000 | Stern et al. |
| 6,673,574 B2 | 1/2004 | Stern et al. |
| 6,960,355 B2 | 11/2005 | Leone-Bay et al. |
| 7,351,741 B2 | 4/2008 | Weidner et al. |
| 2010/0278920 A1 | 11/2010 | Turos et al. |

FOREIGN PATENT DOCUMENTS

| WO | WO-1996/004898 A1 | 2/1996 | |
| WO | WO-97/24529 A1 | 7/1997 | |
| WO | WO-97/24598 A1 | 7/1997 | |
| WO | WO-97/24599 A1 | 7/1997 | |
| WO | WO-97/24600 A1 | 7/1997 | |
| WO | WO-97/24601 A1 | 7/1997 | |
| WO | WO97/0024598 | * 10/1997 | ............. G01N 15/10 |
| WO | WO-00/39559 A2 | 7/2000 | |
| WO | WO-00/39560 A2 | 7/2000 | |
| WO | WO-2007/131286 A1 | 11/2007 | |
| WO | WO-2010/011537 A1 | 1/2010 | |
| WO | WO-2020/117983 A1 | 6/2020 | |
| WO | WO-2020/219445 A1 | 10/2020 | |
| WO | WO-2021/113652 A1 | 6/2021 | |

OTHER PUBLICATIONS

Glushakova et al., Curr Biol 20(12) (2010) pp. 1117-1121.*
Dennis et a. Amto, ocrpb Agemts Cje, ptjer. 2018, vol. 62(6) pp. 1-17.*
Locher et al., Channel Antimicrob Agents Chemother, vol. 47(12) (2003) pp. 3806-3809.*
Ginsburg et al., Biochim Biophys Acta (1983) vol. 729(1).*
Khairul et al. Jpn J'nal Infect Dis (2006), vol. 59(5) pp. 329-331.*
Beraldo, F.H. and Garcia, C.R.S., Products of tryptophan catabolisminduce Ca2+ release and modulate the cell cycle of Plasmodium falciparum malaria parasites, J. Pineal. Res., 39(3):224-230 (2005).
Bitonti, A.J. et al., Reversal of chloroquine resistance in malaria parasite Plasmodium falciparum by desipramine, Science, 242(4883):1301-1303 (1988).
Dutta, P. et al., Antimalarial properties of imipramine and amitriptyline, J. Protozool., 37(1):54-58 (1990).
Singh, N. and Puri, S.K., Modulation of halofantrine resistance after coadministration of halofantrine with diverse pharmacological agents in a rodent malaria model, Life Sci., 67(11):1345-1354 (2000).
Cooke, B.M. et al., Malaria and the red blood cell membrane, Semin. Hematol., 41(2):173-188 (2004).
Dennis et al., Cell Swelling Induced by the Antimalarial KAE609 (Cipargamin) and Other PfATP4-Associated Antimalarials, Antimicrob Agents Chemother, 62(6):1-17, (2008).
Diagne, N. et al., Incidence of clinical malaria in pregnant women exposed to intense perennial transmission, Transactions of the Royal Society of Tropical Medicine and Hygiene, 91(2):166-170 (1997).

(Continued)

*Primary Examiner* — Paul V Ward
(74) *Attorney, Agent, or Firm* — Brenda Herschbach Jarrell; Samuel R. Polio; Peter A. Flynn

(57) ABSTRACT

Methods of treating and preventing malaria infection, comprising administering a therapeutically effective amount of cell permeability modulating therapy are provided herein. Among other things, the present disclosure provides parameters that define subjects who are relatively susceptible or resistant to malaria infection. The present disclosure also provides therapeutic strategies for increasing malarial resistance and/or imparting a resistant state on subjects.

20 Claims, 17 Drawing Sheets

(56) References Cited

OTHER PUBLICATIONS

Gilboa-Garber et al., Structural Specificity of Serotonin Effect on Human Erythrocyte Fragility, Mol Genet Metab., 64(4):283-285, (1998).
Ginsburg et al., Uptake of L-tryptophan by Erythrocytes Infected With Malaria Parasites (*Plasmodium falciparum*), Biochim Biophys Acta, 729(1):97-103, (1983).
Glushakova et al., New Stages in the Program of Malaria Parasite Egress Imaged in Normal and Sickle Erythrocytes, Curr Biol, 20(12):1117-1121, (2010).
International Search Report for PCT/US2020/029114 filed Apr. 21, 2020, 5 pages, (Jul. 20, 2020).
Khairul et al., Fluoxetine Potentiates Chloroquine and Mefloquine Effect on Multidrug-Resistant Plasmodium Falciparum in Vitro, Jpn J Infect Dis, 59(5):329-331 (2006).
Locher et al., 5HT1A Serotonin Receptor Agonists Inhibit Plasmodium Falciparum by Blocking a Membrane Channel, Antimicrob Agents Chemother, 47(12):3806-3809, (2003).
Mohandas, N. and An, X., Malaria and Human Red Blood Cells, Med Microbiol Immunol., 201(4):593-598 (2012).
Saudek, C.D. et al., A preliminary trial of the programmable implantable medication system for insulin delivery, N. Engl. J. Med., 321(9):574-579 (1989).
Written Opinion for PCT/US2020/029114 filed Apr. 21, 2020, 5 pages, (Jul. 20, 2020).

\* cited by examiner (a)

(b)

(c)

(d)

(e)

(f)

(a)

(b)

(c)

(d)

| Summary Statistics | | | | | | | | | |
|---|---|---|---|---|---|---|---|---|---|
| N = 5 | Time | Cp | IsoV | Ypk | pko | Real C | Diam | S.I. | Dipth | RBC |
| Mean | --- | 4.25 | 82.52 | 151.57 | 132.18 | 4987.8 | 6.62 | 14.98 | 1.05 | 2114.9 |
| S.D. | --- | 0.03 | 0.26 | 0.32 | 0.85 | 106.77 | 0.00 | 0.06 | 0.01 | 46.46 |
| S.E. | --- | 0.01 | 0.12 | 0.14 | 0.38 | 47.75 | 0.00 | 0.03 | 0.00 | 20.78 |
| C.V. | --- | 0.73 | 0.31 | 0.21 | 0.65 | 2.14 | 0.07 | 0.41 | 0.60 | 2.20 |
| 5 | 3:12:57 PM | 4.26 | 82.87 | 151.24 | 130.93 | 5095.2 | 6.61 | 14.90 | 1.06 | 2137.8 |
| 4 | 3:11:32 PM | 4.24 | 82.51 | 151.82 | 132.95 | 5077.0 | 6.62 | 15.00 | 1.05 | 2166.5 |
| 3 | 3:10:06 PM | 4.21 | 82.65 | 151.37 | 132.96 | 5009.8 | 6.61 | 14.94 | 1.05 | 2138.0 |
| 2 | 3:08:49 PM | 4.27 | 82.35 | 151.46 | 131.80 | 4907.2 | 6.61 | 14.99 | 1.06 | 2074.1 |
| 1 | 3:06:13 PM | 4.29 | 82.21 | 151.99 | 132.28 | 4849.5 | 6.62 | 15.06 | 1.05 | 2058.0 |

PREVENTING AND TREATING MALARIA

RELATED APPLICATIONS

The present application is a 371 National Stage entry of International Application No. PCT/US20/29114, filed Apr. 21, 2020, which claims priority to U.S. Provisional Patent Application No. 62/836,997, filed Apr. 22, 2019, and U.S. Provisional Patent Application No. 62/943,689, filed Dec. 4, 2019, the entire contents of which are hereby incorporated by reference.

BACKGROUND

Malaria afflicts 200 million people worldwide and kills 2-3 million per annum, 75% of whom are children. While several drugs are available to treat malaria infection (such as chloroquine and artemisins), two of the four human malaria parasite strains, *Plasmodium falciparum* and *Plasmodium vivax*, are known to have developed resistance, rendering previous treatments less reliable.

SUMMARY

The present disclosure provides technologies relating to treatment and/or prevention of malaria. Among other things, the present disclosure provides parameters that define subjects who are relatively susceptible or resistant to malaria infection. The present disclosure also provides therapeutic strategies for increasing malarial resistance and/or imparting a resistant state on subjects. In some embodiments, provided technologies provide prophylactic therapies that offer and/or can achieve malarial resistance for subjects not infected with malaria. In some embodiments, provided technologies provide treatments for infected subjects. Alternatively or additionally, in some embodiments, the present disclosure provides technologies for monitoring resistance status of subjects and/or for monitoring administered therapies (e.g., prophylactic therapies and/or treatments administered post-infection).

Among other things, the present disclosure demonstrates that one or more feature(s) of red blood cells (RBCs), such as RBC membrane permeability, characterize subjects who are relatively resistant vs. relatively susceptible to malaria infection. Furthermore, the present disclosure demonstrates that such feature(s) can be altered for any particular individual, for example through administration of RBC permeability modulating therapy as described herein.

In some embodiments, a RBC permeability status is determined for a particular individual in a particular state and/or at a particular moment in time. In some embodiments, changes in an individual's RBC permeability status reflect a change in that subject's susceptibility to initiation and/or maintenance of malarial infection.

The present disclosure also encompasses the recognition that one or more features of RBC membrane permeability may impart resistance or susceptibility to malaria infection. For example, the present disclosure encompasses the previously unrecognized relationship between resistance to osmotic stress and resistance to malarial infection, and further that resistance to osmotic stress can be used to determine a subject's status with respect to resistance or susceptibility to malarial infection.

In some embodiments, a subject for whom a plot of % change in cell volume vs. osmolality (e.g., a Cell Scan Plot of Example 1) displays a peak ("Pk0") within a range of about 120 mOsm/kg to about 185 mOsm/kg, about 130 mOsm/kg to about 160 mOsm/kg, about 130 mOsm/kg to about 150 mOsm/kg, about 132 mOsm/kg to about 148 mOsm/kg, about 135 mOsm/kg to about 145 mOsm/kg, about 138 mOsm/kg to about 142 mOsm/kg, about 132 mOsm/kg to about 164 mOsm/kg, about 137 mOsm/kg to about 159 mOsm/kg, or about 142 mOsm/kg to about 153 mOsm/kg is relatively susceptible to initiation and/or maintenance of malarial infection; in some embodiments, a subject for whom such a plot displays a peak ("Pk0") within a range of about 100 mOsm/kg to about 120 mOsm/kg, about 102 mOsm/kg to about 118 mOsm/kg, about 105 mOsm/kg to about 115 mOsm/kg or about 108 mOsm/kg to about 112 mOsm/kg is relatively resistant to initiation and/or maintenance of malarial infection.

In some embodiments, a shift (e.g., an increase or a decrease) of about 20 mOsm/kg, about 25 mOsm/kg, or about 30 mOsm/kg or more in a subject's Pk0 value indicates that subject has switched between relatively susceptible vs. relatively resistant states with respect to malarial infection.

In some embodiments, the present disclosure provides RBC permeability modulating agents and/or therapies, and/or systems for identifying and/or characterizing such RBC permeability modulating agents and/or therapies. In some embodiments, RBC permeability modulating agents and/or therapies identified and/or characterized using the methods provided herein are useful for treating and/or preventing malarial infection.

In some embodiments, an RBC permeability modulating therapy as described herein is or comprises administration of an RBC permeability modulating agent.

In some embodiments, an RBC modulating therapy is or achieves delivery of 5-hydroxytryptamine (5-HT; serotonin) in an amount and/or for a period of time sufficient to shift a subject's RBC permeability state from a relatively malaria susceptible state to a relatively malaria resistant state and/or to maintain a subject in a relatively malaria resistant RBC permeability state.

Among other things, the present disclosure provides the surprising teaching that serotonin, when contacted with red blood cells, can alter their membrane permeability characteristic(s) as described herein. As noted above, the present disclosure further provides a surprising teaching that RBC membrane permeability characteristic(s) can influence susceptibility vs. resistance to initiation and/or maintenance of malarial infection. Thus, among other things, the present disclosure provides methods of treating and/or preventing malarial infection by modulating RBC membrane permeability, e.g., by administering and/or otherwise achieving delivery of 5-HT to a subject or subjects susceptible to and/or suffering from malarial infection. In some embodiments, provided therapy and/or prophylaxis is administered to a subject who has been determined to be in a susceptible RBC permeability state as described herein. In some embodiments, provided methods may include one or more steps of determining one or more RBC membrane permeability characteristics e.g., prior to, during and/or after administering therapy and/or prophylaxis as described herein. In some embodiments, such determining may impact continuation, termination, and/or modification of administered therapy and/or prophylaxis (e.g., timing and/or magnitude of one or more doses of an administered agent, etc.).

BRIEF DESCRIPTION OF THE DRAWINGS

FIG. 1a is a graph of data collected in a cell-by-cell analysis showing the voltage recorded for individual red blood cells of a healthy individual over decreasing osmolality (in a range from 280 mOsm/kg to 54 mOsm/kg. Population density is represented by color, with zero density corresponding to white, the lowest nonzero density corresponding to darker points (e.g., at 106), and, as density progressively increases, color of the points lightens and then darkens to black. FIG. 1b is a graph of percent change in cell volume with respect to change in osmolality of a test sample ("Cell Scan Plot"). FIG. 1c is a fluid flux curve (FFC) plotting the percent change of rate of fluid flux with respect to change in osmolality of a test sample. FIG. 1d is a frequency distribution graph of three "cuts" of the cell-by-cell curve of FIG. 1a. The "cuts" correspond to three osmolality values: the solid thin line 107 being isotonic (resting) cells (i.e., 280 mOsm/kg), bold line 109 being spherical cells (i.e., 142 mOsm/kg), and dotted line 108 being ghost cells (i.e., 110 mOsm/kg). FIG. 1e is an illustrative embodiment of the cell size and shape at the isotonic osmolality. FIG. 1f shows superimposed graphs of mean voltage 111 and cell count 110 for the test against osmolality.

FIG. 2a is an example of a cell-by-cell graph with a low degree of cell fragmentation. FIG. 2b is an example of a cell-by-cell graph with a moderate degree of cell fragmentation. FIG. 2c is an example of a cell-by-cell graph with a severe degree of cell fragmentation. FIG. 2d is an example of a cell-by-cell graph with a very severe degree of cell fragmentation.

FIG. 14A shows a three-dimensional plot of measured voltage against osmolality. FIG. 14B shows a graph of osmolality against percentage change in measured voltage for a series of tests of a sample. FIG. 14C shows the results in a tabulated form. FIG. 14D shows superimposed graphs of mean voltage and cell count for the test, respectively, against osmolality.

DETAILED DESCRIPTION

Definitions

Figure 1:
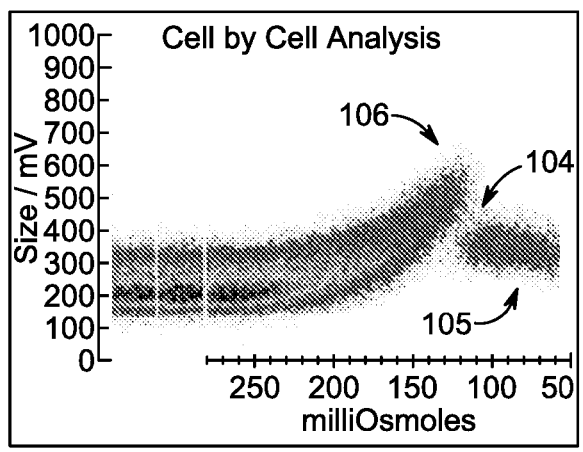
FIG. 1, comprising panels a-f, shows an exemplary cell membrane permeability analysis of a healthy individual.
Figure 1:
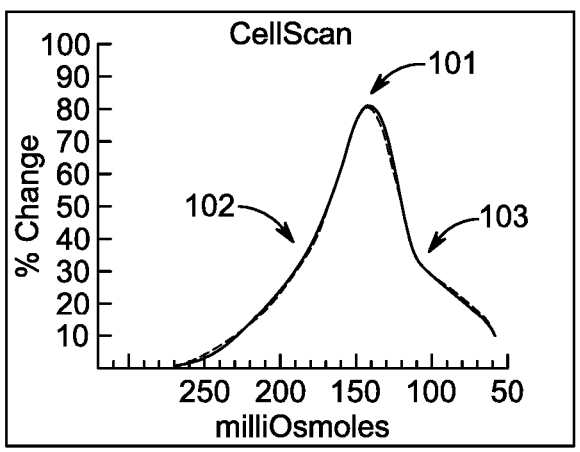
Figure 1:
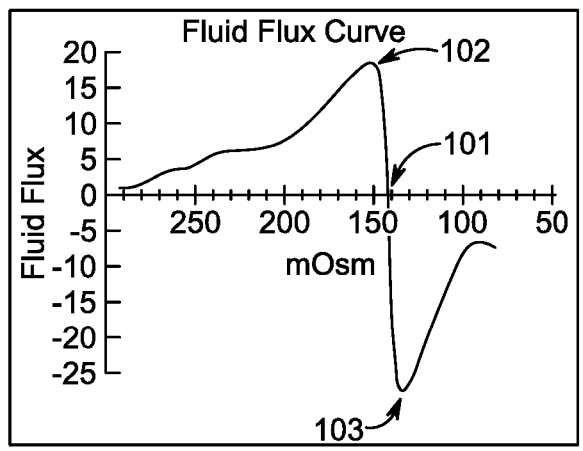
Figure 1:
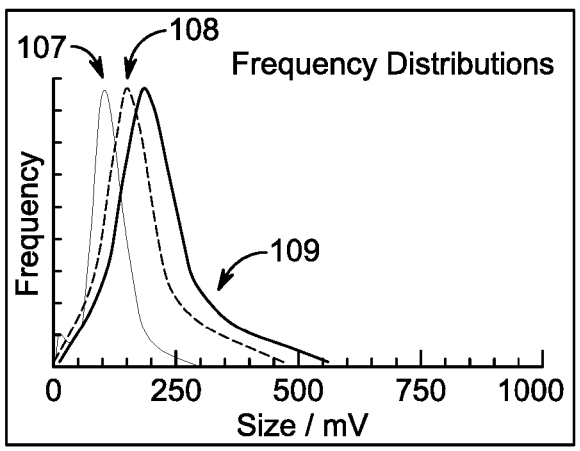
Figure 1:
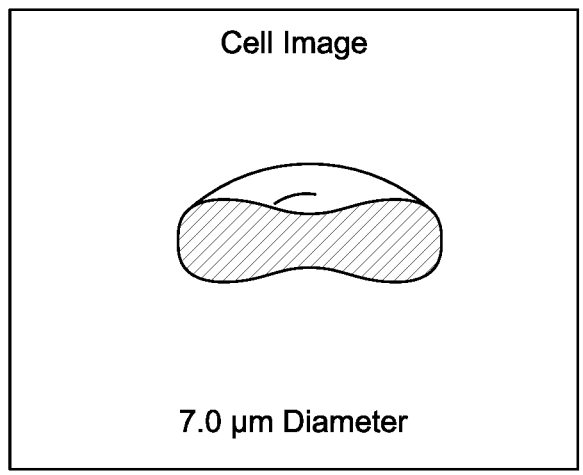
Figure 1:
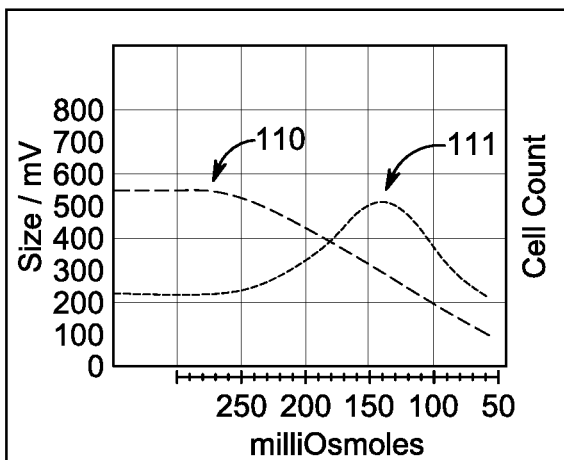

As used herein "cell membrane permeability" refers to a property of a cell or population of cells (e.g., RBCs) that describes the ability of one or more molecule(s) or entities to pass through the cell membrane. In some embodiments, cell membrane permeability may be quantified or characterized by reference to one or more cell membrane permeability parameters, such as Pk0. Alternatively or additionally, in some embodiments, cell membrane permeability may be quantified or characterized by reference to one or more cell membrane permeability parameters provided herein (e.g., a cell-by-cell color map, fluid flux curve, Cp, CPP, Pymax, and/or Pymin). Still further alternatively or additionally, in some embodiments, cell membrane permeability may be quantified or characterized using technology such as that described herein. Cells with lesser cell membrane permeability may be described as "resistant" or in a "resistant state," i.e., the cells are more resistant to transport across the membrane of the one or more molecule(s) or entities, such as water. In many embodiments described herein, a relevant cell membrane permeability is that of cell membrane permeability to water.

The term "about", when used herein in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

As used herein, the term "administration" typically refers to the administration of a composition to a subject or system. Those of ordinary skill in the art will be aware of a variety of routes that may, in appropriate circumstances, be utilized for administration to a subject, for example a human. For example, in some embodiments, administration may be ocular, oral, parenteral, topical, etc. In some particular embodiments, administration may be bronchial (e.g., by bronchial instillation), buccal, dermal (which may be or comprise, for example, one or more of topical to the dermis, intradermal, interdermal, transdermal, etc.), enteral, intraarterial, intragastric, intramedullary, intramuscular, intranasal, intraperitoneal, intrathecal, intravenous, intraventricular, within a specific organ (e.g. intrahepatic), mucosal, nasal, oral, rectal, subcutaneous, sublingual, topical, tracheal (e.g., by intratracheal instillation), vaginal, vitreal, etc. In some embodiments, administration may involve dosing that is intermittent (e.g., a plurality of doses separated in time) and/or periodic (e.g., individual doses separated by a common period of time) dosing. In some embodiments, administration may involve continuous dosing (e.g., perfusion) for at least a selected period of time.

In general, the term "agent", as used herein, may be used to refer to a compound or entity of any chemical class including, for example, a polypeptide, nucleic acid, saccharide, lipid, small molecule, metal, or combination or complex thereof. In appropriate circumstances, as will be clear from context to those skilled in the art, the term may be utilized to refer to an entity that is or comprises a cell or organism, or a fraction, extract, or component thereof. Alternatively or additionally, as context will make clear, the term may be used to refer to a natural product in that it is found in and/or is obtained from nature. In some instances, again as will be clear from context, the term may be used to refer to one or more entities that is man-made in that it is designed, engineered, and/or produced through action of the hand of man and/or is not found in nature. In some embodiments, an agent may be utilized in isolated or pure form; in some embodiments, an agent may be utilized in crude form. In some embodiments, potential agents may be provided as collections or libraries, for example that may be screened to identify or characterize active agents within them. In some cases, the term "agent" may refer to a compound or entity that is or comprises a polymer; in some cases, the term may refer to a compound or entity that comprises one or more polymeric moieties. In some embodiments, the term "agent" may refer to a compound or entity that is not a polymer and/or is substantially free of any polymer and/or of one or more particular polymeric moieties. In some embodiments, the term may refer to a compound or entity that lacks or is substantially free of any polymeric moiety.

As used herein, the term "combination therapy" refers to those situations in which a subject is simultaneously exposed to two or more therapeutic or prophylactic regimens (e.g., two or more therapeutic or prophylactic agents). In some embodiments, the two or more regimens may be administered simultaneously; in some embodiments, such regimens may be administered sequentially (e.g., all "doses" of a first regimen are administered prior to administration of any doses of a second regimen); in some embodiments, such agents are administered in overlapping dosing regimens. In some embodiments, "administration" of combination therapy may involve administration of one or more agent(s) or modality(ies) to a subject receiving the other agent(s) or modality(ies) in the combination. For clarity, combination therapy does not require that individual agents be administered together in a single composition (or even necessarily at the same time), although in some embodiments, two or more agents, or active moieties thereof, may be administered together in a combination composition, or even in a combination compound (e.g., as part of a single chemical complex or covalent entity).

As used herein, the term "comparable" refers to two or more agents, entities, situations, sets of conditions, circumstances, individuals, or populations, etc., that may not be identical to one another but that are sufficiently similar to permit comparison there between so that one skilled in the art will appreciate that conclusions may reasonably be drawn based on differences or similarities observed. In some embodiments, comparable agents, entities, situations, sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, circumstances, individuals, or populations, etc. to be considered comparable. For example, those of ordinary skill in the art will appreciate that sets of circumstances, agents, entities, situations, individuals, or populations are comparable to one another when characterized by a sufficient number and type of substantially identical features to warrant a reasonable conclusion that differences in results obtained or phenomena observed under or with different agents, entities, situations sets of circumstances, individuals, or populations are caused by or indicative of the variation in those features that are varied.

Those skilled in the art will appreciate that the term "dosage form" may be used to refer to a physically discrete unit of an active agent (e.g., a therapeutic or diagnostic agent) for administration to a subject. Typically, each such unit contains a predetermined quantity of active agent. In some embodiments, such quantity is a unit dosage amount (or a whole fraction thereof) appropriate for administration in accordance with a dosing regimen that has been determined to correlate with a desired or beneficial outcome when administered to a relevant population (i.e., with a therapeutic dosing regimen). Those of ordinary skill in the art appreciate that the total amount of a therapeutic composition or agent administered to a particular subject is determined by one or more attending physicians and may involve administration of multiple dosage forms.

As used herein, the term "reference" describes a standard or control relative to which a comparison is performed. For example, in some embodiments, an agent, individual, population, sample, sequence or value of interest is compared with a reference or control agent, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

As used herein, the term "reference" describes a standard or control relative to which a comparison is performed. For example, in some embodiments, an agent, individual, population, sample, sequence or value of interest is compared with a reference or control agent, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

As used herein, the term "subject" refers to an organism, typically a mammal (e.g., a human). In some embodiments, a subject is suffering from a relevant disease, disorder or condition. In some embodiments, a human subject is an adult, adolescent, or pediatric (including, e.g., infant, neonatal, or fetal) subject. In some embodiments, a subject is at risk of (e.g., susceptible to), e.g., at elevated risk of relative to an appropriate control individual or population thereof, a disease, disorder, or condition. In some embodiments, a subject displays one or more symptoms or characteristics of a disease, disorder or condition. In some embodiments, a subject does not display any symptom or characteristic of a disease, disorder, or condition. In some embodiments, a subject is someone with one or more features characteristic of susceptibility to or risk of a disease, disorder, or condition. In some embodiments, a subject is an individual to whom diagnosis and/or therapy and/or prophylaxis is and/or has been administered. The terms "subject" and "patient" are used interchangeably herein.

Malaria

Malaria is caused by a parasite hosted by *Anopheles* mosquitoes, which deposit malarial sporozoites into the human bloodstream when feeding; these sporozoites travel to and infect human liver cells, where they mature into schizonts. Some species of the parasite (e.g., *Plasmodium vivax* and *Plasmodium ovale*) can enter a dormant stage inside liver cells; non-dormant malarial schizonts develop into merozoites, which are released into the bloodstream by rupture of the infected liver cells. The released merozoites infect red blood cells and reproduce asexually, so that they destroy the red blood cells that they infect, and thus cause the symptoms of malarial infection.

A small percentage of merozoites differentiate into male and female gametocytes in the human bloodstream. The malarial life cycle comes full circle when another *Anopheles* mosquito bites and feeds on the blood of a human individual who has such male and female gametes in his or her bloodstream. When both types of gametes are drawn into the mosquito, they fuse to form zygotes, which develop and travel through the mosquito midgut, eventually forming more sporozoites, which migrate to the salivary glands, where they are poised for delivery to another human and initiation of a new infection.

Malarial infection of red blood cells causes dramatic structural and morphological changes to the cells, including loss of normal discoid shape, increased rigidity of the cell membrane and increased adhesiveness, including to the lining of blood vessels. These changes, and the ultimate outright destruction of infected red blood cells, significantly impair circulation and also contribute to the severe anemia characteristic of the disease. See, for example, Mohandas et al. *Med Microbiol Immunol* 201(4): 593, November 2012 (published online Sep. 11, 2012); Cooke et al., *Seminars in Hematology* 41:173, April 2004. As described by Mohandas et al:

"These induced membrane and cellular changes are responsible for the clinical symptoms and pathologies associated with malaria including severe anemia and cerebral malaria. Alterations in the adhesive and rheological properties of red cells are of particular importance since these traits are directly linked to increased destruction of red cells leading to anemia and to the sequestration of parasitised red cells in the microvasculature resulting in cerebral malaria."

Cell Scanning Technologies

The present disclosure encompasses the recognition that cell (e.g., RBC) membrane permeability is an important indicator of an individual's health, and furthermore that cell (e.g., RBC) membrane permeability can indicate an individual's susceptible vs. resistant state for malaria infection. The present disclosure further appreciates that a convenient and accurate method of analyzing RBC membrane permeability is desirable for assessing the status of an individual's health, and particularly for assessing such individual's susceptibility state with respect to malarial infection. Technologies for determining susceptibility to malarial infection are provided, including by application (i.e., to relevant populations) of technologies for assessing membrane permeability.

In some embodiments, the present disclosure describes application of and/or utilizes existing membrane permeability assessment technologies in a new context and use (e.g., with respect to particular individuals and/or populations), and documents that such application can achieve remarkable and unexpected results, particularly including diagnosis and/or determination of malarial susceptibility state for such individual(s) and/or population(s). In some embodiments, cell (e.g., RBC) membrane permeability can be measured using the devices and/or methods described in U.S. Pat. Nos. 4,159,895, 4,278,936, WO 97/24598, WO 97/24529, WO 97/24599, WO 97/24600, WO 97/24601, WO 00/39559, and WO 00/39560 ("Prior Shine Technologies"), each of which is hereby incorporated by reference in its entirety. Certain aspects of WO 97/24598 and WO 97/24601 are reproduced in Appendices A and B, respectively, and are contemplated in some embodiments of the present disclosure, both singly and in combination.

Alternatively or additionally, in some embodiments, the present disclosure describes and/or utilizes newly developed and/or improved membrane permeability assessment technologies, for example as described herein and/or in copending application U.S. 62/943,757 filed Dec. 4, 2019, the entire contents of which are hereby incorporated by reference. In some embodiments, cell scanning technologies comprise mechanical pumps and/or fluid delivery systems (e.g., high resolution syringe pumps and syringes) that allow for achievement and/or maintenance of a desired cell concentration of a sample being passed to a sensor of an apparatus as the environment (e.g., pH, osmolality, agent concentration) of the sample is changed. In some embodiments, a uniform cell concentration within a tested sample passed to a sensor of a device is achieved by making an initial, standard fixed dilution of a biological sample with a diluent, counting a number of cells within a portion of the diluted sample by flowing the diluted sample and a diluent to a sensor (e.g., using computer-controlled, digital syringe pumps), and then adjusting the dilution ratio between the diluent and biological sample to achieve a desired cell concentration. In some embodiments, a concentration of cells in a biological sample is adjusted to a desired value by altering relative flow rates of biological sample and at least two other streams of liquid (e.g., one or more diluents), e.g., using a computer-controlled digital syringe. In some embodiments, cell scanning technologies comprise methods and apparatus to improve the throughput of samples by, for example, multiplexing the preparation and measurements of said samples. In some embodiments, cell scanning technologies comprise delivery of arbitrary gradients of one or more agents to a sensor of a device while maintaining a desired cell concentration of said sample being flowed to the sensor (e.g., using computer-controlled digital syringes). In some embodiments, cell scanning technologies comprise methods and apparatus for calibrating an apparatus, e.g., using one or more markers (e.g., fluorescent markers) or nanoparticles (e.g., latex beads), or e.g., using a sample (e.g., blood) from a healthy subject or population thereof (e.g., from one or more subjects previously determined and/or otherwise known not to be suffering from a condition or otherwise in a state that is associated with an "abnormal" reading as described herein). In some embodiments, cell scanning technologies comprise certain improvements and/or strategies that can achieve reduction(s) in mechanical and/or electrical noise, for example that might otherwise be transmitted through gradient generating systems (e.g., through an osmotic gradient generating system). In some embodiments, cell scanning technologies comprise technologies that can reduce and/or dampen one or more effects of mechanical noise, for example through incorporation of flexible tubing elements into the fluid flow path. In some embodiments, cell scanning technologies comprise systems in which a sensor is mechanically isolated. In some embodiments, cell scanning technologies comprise systems that include one or more electrically conducting components arranged and constructed, and/or otherwise associated with other components of the system, so that electrical noise experienced by the system is reduced and/or one or more components is shielded and/or grounded. In some embodiments, cell scanning technologies comprise two or more similar sample syringes are present and connected in parallel to one another at a substantially similar location in the fluid delivery path, e.g., in order to minimize refill and/or wash time of sample syringes between samples being tested. In some embodiments, cell scanning technologies comprise removing a blockage by temporarily reversing pressure within a sensor and/or expelling fluid from a syringe creating a reversal of fluid flow through the sensor. In some embodiments, a pressure across a sensor is constant and/or very well regulated (e.g., using digitally controlled syringes). In some embodiments, cell scanning technologies comprise methods and apparatus to allow for even mixing of a diluent and samples containing cells (e.g., by mixing at one or multiple locations within a fluid path).

In some embodiments, samples for use in cell scanning technologies described herein can be prepared according to standard procedures. Alternatively or additionally, in some embodiments, samples are prepared and/or analyzed as described in copending application U.S. 62/943,757 filed Dec. 4, 2019, for example ensuring uniform cell density and/or assessment of a plurality of dilutions of an obtained sample (e.g., a primary blood sample)

In some embodiments, a sample is a blood sample. In some embodiments, additional components (e.g., preservatives and/or anticoagulants) can be added to a blood sample. Additional components can include, but are not limited to, heparin, ACD, EDTA, and sodium citrate. Addition of typical preservatives and/or anticoagulants do not significantly affect the output of cell scanning technologies provided herein.

In some embodiments, a blood sample may be a primary blood sample. In some embodiments, a blood sample is a sample comprising red blood cells, platelets, white blood cells, and/or stem cells, or any combination thereof. In some embodiments, a blood sample may have been processed through one or more purification and/or separation steps. Alternatively or additionally, in some embodiments, a blood sample may have been processed through one or more dilution steps.

Figure 12:
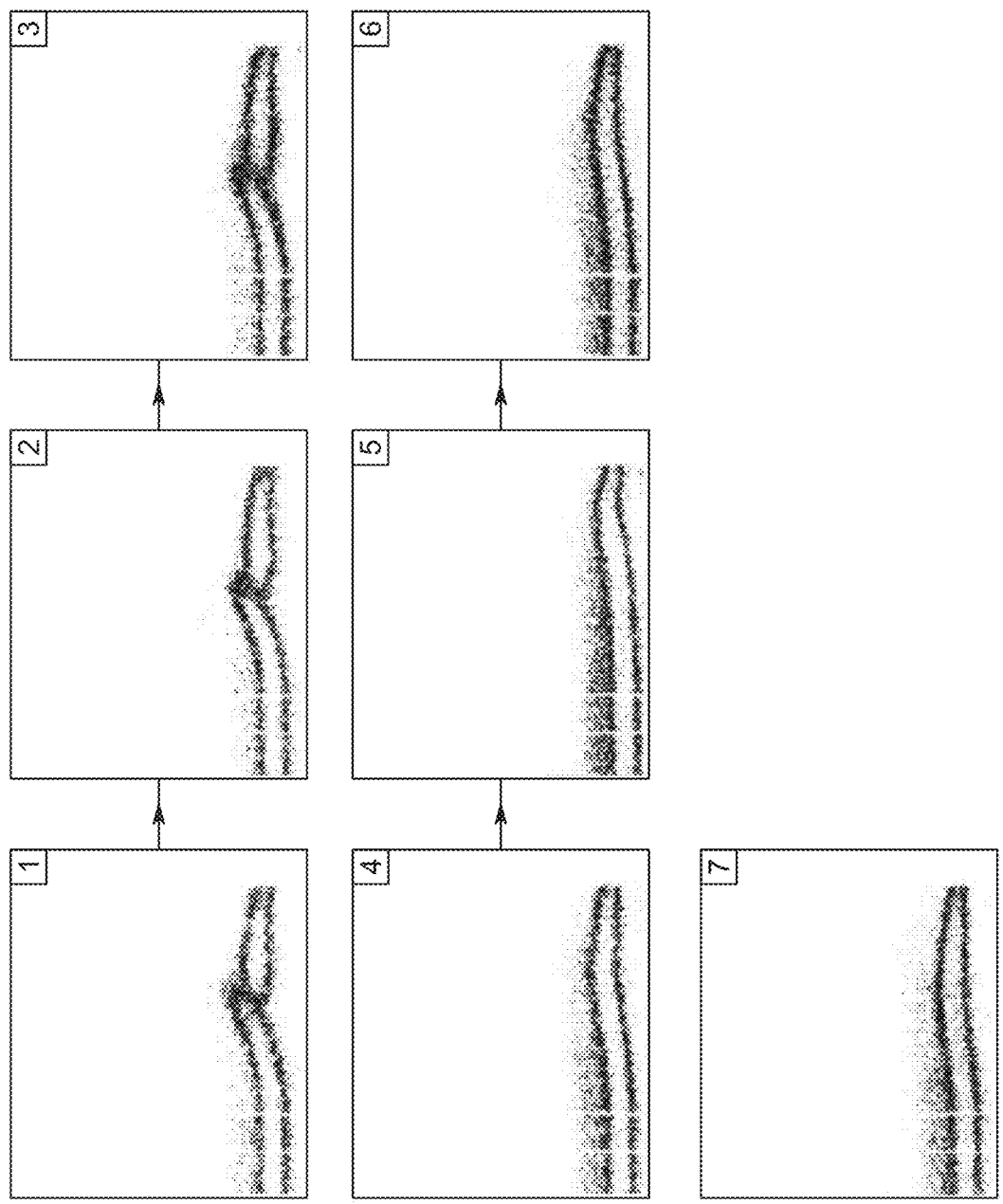
FIG. 12 shows a series of three-dimensional plots for a sample tested at hourly intervals.

In some embodiments, a blood sample can be stored for a period of time prior to testing without significantly affecting the output of the cell scanning technologies provided herein (e.g., whereby test results may change predictably over time, as shown in, e.g., FIG. 12, without loss of diagnostic distinctions and/or reliability). For example, a blood sample can be stored for up to about 1 hour, about 2 hours, about 3 hours, about 4 hours, about 5 hours, about 6 hours, about 12 hours, about 24 hours, about 48 hours, about 1 week, about 2 weeks, about 1 month, about 2 months, about 6 months, about 1 year, about 2 years, about 3 years, or longer without significantly affecting the output of the cell scanning technologies provided herein. In some embodiments, a blood sample can be stored at a particular temperature prior to testing without significantly affecting the output of the cell scanning technologies provided herein. For example, in some embodiments, a blood sample can be stored at about −80° C., about −20° C., about 0° C., about 10° C., about 20° C., or about 30° C. without significantly affecting the output of the cell scanning technologies provided herein.

RBC Membrane Permeability Parameters

The present disclosure provides certain parameter(s) referred to herein as "cell membrane permeability parameters" or "RBC membrane permeability parameters", obtainable using cell scanning technologies described herein, that are useful in provided methods (e.g., screening, diagnosing, and monitoring subjects, etc.). It will be understood, of course, that such parameters, and measurement thereof, are useful as described herein independent of whether such measurement is associated with assessment of permeability per se. Furthermore, those skilled in the art, reading the present disclosure will appreciate that provided cell scanning technologies can also be used to determine cell membrane permeability parameter(s) for cells other than RBCs; RBC membrane permeability parameters are described herein as exemplary cell membrane permeability parameters.

Throughout this section, "normal" values for certain RBC membrane permeability parameters are provided. Such "normal" values have been determined from analysis of samples of healthy individuals (i.e., subjects not suffering from and/or not resistant to malaria). It is expected that subjects who are resistant to malaria may not display "normal" values for one or more RBC membrane permeability parameters; in some embodiments, subjects who are resistant to malaria are identified by detection of an "abnormal" value for one or more RBC membrane permeability parameters. It is also expected that subjects who are susceptible to malaria may display "normal" values for one or more RBC membrane permeability parameters; in some embodiments, subjects who are susceptible to malaria are identified by detection of a "normal" value for one or more RBC membrane permeability parameters.

In some embodiments, a RBC membrane permeability parameter is coefficient of permeability (Cp or $Cp_{net}$). Cp represents the volume of water that passes through the cell membrane per unit area at maximum pressure. Cp can be calculated as described herein, e.g., in Appendix A. In some embodiments, a Cp of from about 2.7 $mL/m^2$ to about 5.1 $mL/m^2$, from about 3.1 $mL/m^2$ to about 4.7 $mL/m^2$, or from about 3.5 $mL/m^2$ to about 4.3 $mL/m^2$ is considered normal. In some embodiments, a Cp of about 3.1 $mL/m^2$, about 3.3 $mL/m^2$, about 3.5 $mL/m^2$, about 3.7 $mL/m^2$, about 3.9 $mL/m^2$, about 4.0 $mL/m^2$, about 4.1 $mL/m^2$, or about 4.3 $mL/m^2$ is considered normal. In some embodiments, a Cp of less than about 3.5 $mL/m^2$, about 3.1 $mL/m^2$, or about 2.7 $mL/m^2$, or greater than about 4.3 $mL/m^2$, about 4.7 $mL/m^2$, or about 5.1 $mL/m^2$ is considered abnormal. In some embodiments, a Cp of from about 0 mL/m² to about 2.7 mL/m², from about 0 mL/m² to about 3.1 mL/m², from about 0 mL/m² to about 3.5 mL/m², from about 4.3 mL/m² to about 10 mL/m², from about 4.7 mL/m² to about 10 mL/m², or from about 5.1 mL/m² to about 10 mL/m² is considered abnormal.

In some embodiments, a RBC membrane permeability parameter is Pk0. Pk0 represents the osmotic pressure at which a cell reaches maximum volume (e.g., before bursting). Pk0 can be calculated as described herein, e.g., in Appendix A, and/or from the peak of the Cell Scan Plot, e.g., as described in Example 1. In some embodiments, a Pk0 from about, 126.4 mOsm/kg to about 161.8 mOsm/kg, from about 132.3 mOsm/kg to about 155.9 mOsm/kg, or from about 138.2 mOsm/kg to about 150 mOsm/kg is considered normal. In some embodiments, a Pk0 of about 132 mOsm/kg, about 138 mOsm/kg, about 144 mOsm/kg, about 150 mOsm/kg, or about 156 mOsm/kg is considered normal. In some embodiments, a Pk0 of less than about 138 mOsm/kg, about 132 mOsm/kg, or about 126 mOsm/kg, or greater than about 150 mOsm/kg, about 150 mOsm/kg, or about 162 mOsm/kg is considered abnormal. In some embodiments, a Pk0 of from about 70 mOsm/kg to about 126 mOsm/kg, from about 70 mOsm/kg to about 132 mOsm/kg, from about 70 mOsm/kg to about 138 mOsm/kg, from about 150 mOsm/kg to about 275 mOsm/kg, from about 156 mOsm/kg to about 275 mOsm/kg, or from about 162 mOsm/kg to about 275 mOsm/kg is considered abnormal. In some embodiments, a Pk0 of from about 132 mOsm/kg to about 164 mOsm/kg, from about 137 mOsm/kg to about 159 mOsm/kg, or from about 142 mOsm/kg to about 153 mOsm/kg is considered normal. In some embodiments, a Pk0 of about 137 mOsm/kg, about 142 mOsm/kg, about 148 mOsm/kg, about 153 mOsm/kg, or about 159 mOsm/kg is considered normal. In some embodiments, a Pk0 of less than about 142 mOsm/kg, about 137 mOsm/kg, or about 132 mOsm/kg, or greater than about 153 mOsm/kg, about 159 mOsm/kg, or about 164 mOsm/kg is considered abnormal. In some embodiments, a Pk0 of from about 50 mOsm/kg to about 132 mOsm/kg, from about 50 mOsm/kg to about 137 mOsm/kg, from about 50 mOsm/kg to about 142 mOsm/kg, from about 153 mOsm/kg to about 290 mOsm/kg, from about 159 mOsm/kg to about 290 mOsm/kg, or from about 164 mOsm/kg to about 290 mOsm/kg is considered abnormal.

In some embodiments, a RBC membrane permeability parameter is isotonic volume (IsoV or Volume$_{iso}$). IsoV represents cell volume under isotonic conditions. IsoV can be determined as described herein, e.g., in Appendix A. In some embodiments, an IsoV of from about 77 fL to about 106 fL, from about 82 fL to about 101 fL, or from about 87 fL to about 96 fL is considered normal. In some embodiments, an IsoV of about 82 fL, about 87 fL, about 92 fL, about 96 fL, or about 101 fL is considered normal. In some embodiments, an IsoV of less than about 87 fL, about 82 fL, or about 77 fL, or greater than about 96 fL, about 101 fL, or about 106 fL is considered abnormal. In some embodiments, an IsoV of from about 50 fL to about 77 fL, from about 50 fL to about 82 fL, from about 50 fL to about 87 fL, from about 96 fL to about 150 fL, from about 101 fL to about 150 fL, or from about 106 fL to about 150 fL is considered abnormal.

In some embodiments, a RBC membrane permeability parameter is spherical volume (SphV or Volume$_{sph}$). SphV represents maximum cell volume (i.e., spherical volume). In some embodiments, SphV is calibrated against spherical latex particles. SphV can be determined as described herein, e.g., in Appendix A. In some embodiments, a SphV of from about 136 fL to about 202 fL, from about 147 fL to about 191 fL, or from about 158 fL to about 180 fL is considered normal. In some embodiments, a SphV of about 147 fL, about 158 fL, about 169 fL, about 180 fL, or about 191 fL is considered normal. In some embodiments, a SphV of less than about 158 fL, about 147 fL, or about 136 fL, or greater than about 180 fL, about 191 fL, or about 202 fL is considered abnormal. In some embodiments, a SphV of from about 90 fL to about 136 fL, from about 90 fL to about 147 fL, from about 90 fL to about 158 fL, from about 180 fL to about 280 fL, from about 191 fL to about 280 fL, or from about 202 fL to about 280 fL is considered abnormal. In some embodiments, a SphV of from about 126 fL to about 201 fL, from about 138 fL to about 189 fL, or from about 151 fL to about 176 fL is considered normal. In some embodiments, a SphV of about 138 fL, about 151 fL, about 164 fL, about 176 fL, or about 189 fL is considered normal. In some embodiments, a SphV of less than about 151 fL, about 138 fL, or about 126 fL, or greater than about 176 fL, about 189 fL, or about 201 fL is considered abnormal. In some embodiments, a SphV of from about 90 fL to about 126 fL, from about 90 fL to about 138 fL, from about 90 fL to about 151 fL, from about 176 fL to about 280 fL, from about 189 fL to about 280 fL, or from about 201 fL to about 280 fL is considered abnormal.

In some embodiments, a RBC membrane permeability parameter is maximum % change in volume (Inc %). Inc % represents maximum % change in cell volume, i.e., the % change at Pk0. Inc % can be determined as described herein, e.g., from the Cell Scan Plot of Example 1. In some embodiments, an Inc % of from about 61% to about 108%, from about 69% to about 100%, or from about 77% to about 93% is considered normal. In some embodiments, an Inc % of about 69%, about 77%, about 85%, about 93%, or about 100% is considered normal. In some embodiments, an Inc % of less than about 61%, about 69%, or about 77%, or greater than about 93%, about 100%, or about 108% is considered abnormal. In some embodiments, an Inc % of from about 0% to about 61%, from about 0% to about 69%, from about 0% to about 77%, from about 93% to about 200%, from about 100% to about 200%, or from about 108% to about 200% is considered abnormal.

In some embodiments, a RBC membrane permeability parameter is peak width of Cell Scan Plot at 10% below maximum height (W10). W10 is indicative of cell homogeneity and cell diversity and can be determined from the Cell Scan Plot of Example 1. In some embodiments, a W10 of from about 15 mOsm/kg to about 22 mOsm/kg, from about 16 mOsm/kg to about 21 mOsm/kg, or from about 17 mOsm/kg to about 20 mOsm/kg is considered normal. In some embodiments, a W10 of about 16 mOsm/kg, about 17 mOsm/kg, about 18 mOsm/kg, about 19 mOsm/kg, about 20 mOsm/kg, or about 21 mOsm/kg is considered normal. In some embodiments, a W10 of less than about 15 mOsm/kg, about 16 mOsm/kg, or about 17 mOsm/kg, or greater than about 20 mOsm/kg, about 21 mOsm/kg, or about 22 mOsm/kg is considered abnormal. In some embodiments, a W10 of from about 5 mOsm/kg to about 15 mOsm/kg, from about 5 mOsm/kg to about 16 mOsm/kg, from about 5 mOsm/kg to about 17 mOsm/kg, from about 20 mOsm/kg to about 50 mOsm/kg, from about 21 mOsm/kg to about 50 mOsm/kg, or from about 22 mOsm/kg to about 50 mOsm/kg is considered abnormal. In some embodiments, a W10 of from about 13 mOsm/kg to about 21 mOsm/kg, from about 15 mOsm/kg to about 20 mOsm/kg, or from about 16 mOsm/kg to about 20 mOsm/kg is considered normal. In some embodiments, a W10 of about 15 mOsm/kg, about 16 mOsm/kg, about 17 mOsm/kg, about 18 mOsm/kg, about 19 mOsm/kg, or about 20 mOsm/kg is considered normal. In some embodiments, a W10 of less than about 13 mOsm/kg, about 15 mOsm/kg, or about 16 mOsm/kg, or greater than about 19 mOsm/kg, about 20 mOsm/kg, or about 21 mOsm/kg is considered abnormal. In some embodiments, a W10 of from about 5 mOsm/kg to about 13 mOsm/kg, from about 5 mOsm/kg to about 15 mOsm/kg, from about 5 mOsm/kg to about 16 mOsm/kg, from about 19 mOsm/kg to about 50 mOsm/kg, from about 20 mOsm/kg to about 50 mOsm/kg, or from about 21 mOsm/kg to about 50 mOsm/kg is considered abnormal.

In some embodiments, a RBC membrane permeability parameter is Pxmax (i.e., Cpmax). Pxmax is the osmolality at which the Fluid Flux Curve (e.g., of Example 1) is at maximum % fluid flux. In some embodiments, a Pxmax of from about 149 mOsm/kg to about 180 mOsm/kg, from about 154 mOsm/kg to about 175 mOsm/kg, or from about 159 mOsm/kg to about 170 mOsm/kg is considered normal. In some embodiments, a Pxmax of about 154 mOsm/kg, about 159 mOsm/kg, about 165 mOsm/kg, about 170 mOsm/kg, or about 175 mOsm/kg is considered normal. In some embodiments, a Pxmax of less than about 159 mOsm/kg, about 154 mOsm/kg, or about 149 mOsm/kg, or greater than about 170 mOsm/kg, about 175 mOsm/kg, or about 180 mOsm/kg is considered abnormal. In some embodiments, a Pxmax of from about 50 mOsm/kg to about 149 mOsm/kg, from about 50 mOsm/kg to about 154 mOsm/kg, from about 50 mOsm/kg to about 159 mOsm/kg, from about 170 mOsm/kg to about 290 mOsm/kg, from about 175 mOsm/kg to about 290 mOsm/kg, or from about 180 mOsm/kg to about 290 mOsm/kg is considered abnormal.

In some embodiments, a RBC membrane permeability parameter is Pxmin (i.e., Cpmin). Pxmin is the osmolality at which the Fluid Flux Curve (e.g., of Example 1) is at minimum % fluid flux. In some embodiments, a Pxmin of from about 111 mOsm/kg to about 149 mOsm/kg, from about 118 mOsm/kg to about 143 mOsm/kg, or from about 124 mOsm/kg to about 137 mOsm/kg is considered normal. In some embodiments, a Pxmin of about 118 mOsm/kg, about 124 mOsm/kg, about 130 mOsm/kg, about 137 mOsm/kg, or about 143 mOsm/kg is considered normal. In some embodiments, a Pxmin of less than about 124 mOsm/kg, about 118 mOsm/kg, or about 111 mOsm/kg, or greater than about 137 mOsm/kg, about 143 mOsm/kg, or about 149 mOsm/kg is considered abnormal. In some embodiments, a Pxmin of from about 50 mOsm/kg to about 111 mOsm/kg, from about 50 mOsm/kg to about 118 mOsm/kg, from about 50 mOsm/kg to about 124 mOsm/kg, from about 137 mOsm/kg to about 290 mOsm/kg, from about 143 mOsm/kg to about 290 mOsm/kg, or from about 149 mOsm/kg to about 290 mOsm/kg is considered abnormal.

In some embodiments, a RBC membrane permeability parameter is Pymax. Pymax is the maximum fluid flux on the Fluid Flux Curve (e.g., of Example 1). In some embodiments, a Pymax of from about 9 $(fL \cdot 10^{-1})$/mOsm/kg to about 16 $(fL \cdot 10^{-1})$/mOsm/kg, from about 10 $(fL \cdot 10^{-1})$/mOsm/kg to about 15 $(fL \cdot 10^{-1})$/mOsm/kg, or from about 12 $(fL \cdot 10^{-1})$/mOsm/kg to about 14 $(fL \cdot 10^{-1})$/mOsm/kg is considered normal. In some embodiments, a Pymax of about 10 $(fL \cdot 10^{-1})$/mOsm/kg, about 12 $(fL \cdot 10^{-1})$/mOsm/kg, about 13 $(fL \cdot 10^{-1})$/mOsm/kg, about 14 $(fL \cdot 10^{-1})$/mOsm/kg, or about 15 $(fL \cdot 10^{-1})$/mOsm/kg is considered normal. In some embodiments, a Pymax of less than about 12 $(fL \cdot 10^{-1})$/mOsm/kg, about 10 $(fL \cdot 10^{-1})$/mOsm/kg, or about 9 $(fL \cdot 10^{-1})$/mOsm/kg, or greater than about 14 $(fL \cdot 10^{-1})$/mOsm/kg, about 15 $(fL \cdot 10^{-1})$/mOsm/kg, or about 16 $(fL \cdot 10^{-1})$/mOsm/kg is considered abnormal. In some embodiments, a Pymax of from about 1 $(fL \cdot 10^{-1})$/mOsm/kg to about 9 $(fL \cdot 10^{-1})$/mOsm/kg, from about 1 $(fL \cdot 10^{-1})$/mOsm/kg to about 10 $(fL \cdot 10^{-1})$/mOsm/kg, from about 1 $(fL \cdot 10^{-1})$/mOsm/kg to about 12 $(fL \cdot 10^{-1})$/mOsm/kg, from about 14 $(fL \cdot 10^{-1})$/mOsm/kg to about 50 $(fL \cdot 10^{-1})$/mOsm/kg, from about 15 $(fL \cdot 10^{-1})$/mOsm/kg to about 50 $(fL \cdot 10^{-1})$/mOsm/kg, or about 16 $(fL \cdot 10^{-1})$/mOsm/kg to about 50 $(fL \cdot 10^{-1})$/mOsm/kg is considered abnormal.

In some embodiments, a RBC membrane permeability parameter is Pymin. Pymin is the minimum fluid flux on the Fluid Flux Curve (e.g., of Example 1). In some embodiments, a Pymin of from about −11 $(fL \cdot 10^{-1})$/mOsm/kg to about −28 $(fL \cdot 10^{-1})$/mOsm/kg, from about −14 $(fL \cdot 10^{-1})$/mOsm/kg to about −25 $(fL \cdot 10^{-1})$/mOsm/kg, or from about −17 $(fL \cdot 10^{-1})$/mOsm/kg to about −22 $(fL \cdot 10^{-1})$/mOsm/kg is considered normal. In some embodiments, a Pymin of about −14 $(fL \cdot 10^{-1})$/mOsm/kg, about −17 $(fL \cdot 10^{-1})$/mOsm/kg, about −20 $(fL \cdot 10^{-1})$/mOsm/kg, about −22 $(fL \cdot 10^{-1})$/mOsm/kg, or about −25 $(fL \cdot 10^{-1})$/mOsm/kg is considered normal. In some embodiments, a Pymin of less than about −17 $(fL \cdot 10^{-1})$/mOsm/kg, about −14 $(fL \cdot 10^{-1})$/mOsm/kg, or about −11 $(fL \cdot 10^{-1})$/mOsm/kg, or greater than about −22 $(fL \cdot 10^{-1})$/mOsm/kg, about −25 $(fL \cdot 10^{-1})$/mOsm/kg, or about −28 $(fL \cdot 10^{-1})$/mOsm/kg is considered abnormal. In some embodiments, a Pymin of from about −1 $(fL \cdot 10^{-1})$/mOsm/kg to about −11 $(fL \cdot 10^{-1})$/mOsm/kg, from about −1 $(fL \cdot 10^{-1})$/mOsm/kg to about −14 $(fL \cdot 10^{-1})$/mOsm/kg, from about −1 $(fL \cdot 10^{-1})$/mOsm/kg to about −17 $(fL \cdot 10^{-1})$/mOsm/kg, from about −22 $(fL \cdot 10^{-1})$/mOsm/kg to about −50 $(fL \cdot 10^{-1})$/mOsm/kg, from about −25 $(fL \cdot 10^{-1})$/mOsm/kg to about −50 $(fL \cdot 10^{-1})$/mOsm/kg, or about −28 $(fL \cdot 10^{-1})$/mOsm/kg to about −50 $(fL \cdot 10^{-1})$/mOsm/kg is considered abnormal.

In some embodiments, a RBC membrane permeability parameter is Py ratio. Py ratio is the ratio of Pymax:Pymin in absolute values. In some embodiments, a Py ratio of from about 0.4 to about 1.0, from about 0.5 to about 0.9, or from about 0.6 to about 0.8 is considered normal. In some embodiments, a Py ratio of about 0.5, about 0.6, about 0.7, about 0.8, or about 0.9 is considered normal. In some embodiments, a Py ratio of less than about 0.4, about 0.5, or about 0.6, or greater than about 0.8, about 0.9, or about 1.0 is considered abnormal. In some embodiments, a Py ratio of from about 0.01 to about 0.4, from about 0.01 to about 0.5, from about 0.01 to about 0.6, from about 0.8 to about 10, from about 0.9 to about 10, or from about 1.0 to about 10 is considered abnormal.

In some embodiments, a RBC membrane permeability parameter is sphericity index (SI). Sphericity index can be determined as described herein, e.g., in Appendix A. In some embodiments, a sphericity index of from about 1.42 to about 1.72, from about 1.47 to about 1.67, or from about 1.52 to about 1.62 is considered normal. In some embodiments, a sphericity index of about 1.47, about 1.52, about 1.57, about 1.62, or about 1.67 is considered normal. In some embodiments, a sphericity index of less than about 1.42, about 1.47, or about 1.52, or greater than about 1.62, about 1.67, or about 1.72 is considered abnormal. In some embodiments, a sphericity index of from about 1.0 to about 1.42, from about 1.0 to about 1.47, from about 1.0 to about 1.52, from about 1.62 to about 3.0, from about 1.67 to about 3.0, or from about 1.72 to about 3.0 is considered abnormal.

In some embodiments, a RBC membrane permeability parameter is scaled sphericity index (sSI). sSI is sphericity index (SI) multiplied by a scaling factor of 10. In some embodiments, a sSI of from about 14.2 to about 17.2, from about 14.7 to about 16.7, or from about 15.2 to about 16.2 is considered normal. In some embodiments, a sphericity index of about 14.7, about 15.2, about 15.7, about 16.2, or about 16.7 is considered normal. In some embodiments, a sphericity index of less than about 14.2, about 14.7, or about 15.2, or greater than about 16.2, about 16.7, or about 17.2 is considered abnormal. In some embodiments, a sphericity index of from about 10.0 to about 14.2, from about 10.0 to about 14.7, from about 10.0 to about 15.2, from about 16.2 to about 30.0, from about 16.7 to about 30.0, or from about 17.2 to about 30.0 is considered abnormal.

In some embodiments, a RBC membrane permeability parameter is slope between maximum and minimum points of the Fluid Flux Curve (slope$_{FFC}$). Slope$_{FFC}$ is a measure of cell diversity and can be determined as described herein, e.g., from the Fluid Flux Curve of Example 1. In some embodiments, a slope$_{FFC}$ of from about $-1.7$ (fL·10$^{-1}$)/(mOsm/kg)$^2$ to about 3.1 (fL·10$^{-1}$)/(mOsm/kg)$^2$, from about $-0.9$ (fL·10$^{-1}$)/(mOsm/kg)$^2$ to about 2.3 (fL·10$^{-1}$)/(mOsm/kg)$^2$, or from about $-0.1$ (fL·10$^{-1}$)/(mOsm/kg)$^2$ to about 1.5 (fL·10$^{-1}$)/(mOsm/kg)$^2$ is considered normal. In some embodiments, a slope$_{FFC}$ of about $-0.9$ (fL·10$^{-1}$)/(mOsm/kg)$^2$, about $-0.1$ (fL·10$^{-1}$)/(mOsm/kg)$^2$, about 0.7 (fL·10$^{-1}$)/(mOsm/kg)$^2$, about 1.5 (fL·10$^{-1}$)/(mOsm/kg)$^2$, or about 2.3 (fL·10$^{-1}$)/(mOsm/kg)$^2$ is considered normal. In some embodiments, a slope$_{FFC}$ of less than about $-0.1$ (fL·10$^{-1}$)/(mOsm/kg)$^2$, about $-0.9$ (fL·10$^{-1}$)/(mOsm/kg)$^2$, or about $-1.7$ (fL·10$^{-1}$)/(mOsm/kg)$^2$, or greater than about 1.5 (fL·10$^{-1}$)/(mOsm/kg)$^2$, about 2.3 (fL·10$^{-1}$)/(mOsm/kg)$^2$, or about 3.1 (fL·10$^{-1}$)/(mOsm/kg)$^2$ is considered abnormal. In some embodiments, a slope$_{FFC}$ of from about $-10$ (fL·10$^{-1}$)/(mOsm/kg)$^2$ to about $-1.7$ (fL·10$^{-1}$)/(mOsm/kg)$^2$, from about $-10$ (fL·10$^{-1}$)/(mOsm/kg)$^2$ to about $-0.9$ (fL·10$^{-1}$)/(mOsm/kg)$^2$, from about $-10$ (fL·10$^{-1}$)/(mOsm/kg)$^2$ to about $-0.1$ (fL·10$^{-1}$)/(mOsm/kg)$^2$, from about 1.5 (fL·10$^{-1}$)/(mOsm/kg)$^2$ to about 10 (fL·10$^{-1}$)/(mOsm/kg)$^2$, from about 2.3 (fL·10$^{-1}$)/(mOsm/kg)$^2$ to about 10 (fL·10$^{-1}$)/(mOsm/kg)$^2$, or from about 3.1 (fL·10$^{-1}$)/(mOsm/kg)$^2$ to about 10 (fL·10$^{-1}$)/(mOsm/kg)$^2$ is considered abnormal.

In some embodiments, a RBC membrane permeability parameter is δ dynes. δ dynes is a measure of the force necessary to convert intact cells at their spherical volume to ghost cells at their spherical volume. In some embodiments, δ dynes is determined by measuring the difference between the most common cell size in the intact cell population at a particular osmolality and the most common cell size in the ghost cell population at a particular osmolality. In some embodiments, a δ dynes of from about 25 dynes to about 44 dynes, from about 28 dynes to about 41 dynes, or from about 31 dynes to about 38 dynes is considered normal. In some embodiments, a δ dynes of about 28 dynes, about 31 dynes, about 35 dynes, about 38 dynes, or about 41 dynes is considered normal. In some embodiments, a δ dynes of less than about 25 dynes, about 28 dynes, or about 31 dynes, or greater than about 38 dynes, about 41 dynes, or about 44 dynes is considered abnormal. In some embodiments, a δ dynes of from about 1 dynes to about 25 dynes, from about 1 dynes to about 28 dynes, from about 1 dynes to about 31 dynes, from about 38 dynes to about 100 dynes, from about 41 dynes to about 100 dynes, or from about 44 dynes to about 100 dynes is considered abnormal.

In some embodiments, a RBC membrane permeability parameter is fragmentation grade. In some embodiments, fragmentation grade is assigned on a scale of 0-3 as described in Example 1 and FIG. 2. In some embodiments, a fragmentation grade of from about 0 to about 1 or from about 0 to about 0.5 is considered normal. In some embodiments, a fragmentation grade of about 0, about 0.5, or about 1 is considered normal. In some embodiments, a fragmentation grade of greater than about 0.5, greater than about 1, or greater than about 1.5 is considered abnormal. In some embodiments, a fragmentation grade of from about to 0.5 to about 3, from about 1 to about 3, or from about 1.5 to about 3 is considered abnormal.

In some embodiments, a RBC membrane permeability parameter is combined probability profile (CPP). In some embodiments, CPP is an additive likelihood that a sample is normal or abnormal, calculated by adding together [(mean-value)/SD]$^2$ for two or more cell (e.g., RBC membrane parameters). In some embodiments, CPP is an additive likelihood that a sample is normal or abnormal, calculated by adding together [(mean-value)/SD]$^2$ for each of the following parameters: Cp, Pk0, IsoV, SphV, Inc %, W10, Pxmin, Pxmax, Pymin, Pymax, Py ratio, sSI, slope$_{FFC}$, and ∂ dynes. In some embodiments, a CPP of from about 5.8 to about 15, from about 6.5 to about 12, or from about 7.0 to about 10 is considered normal. In some embodiments, a CPP of about 6.5, about 7.0, about 8.5, about 10, or about 12 is considered normal. In some embodiments, a CPP of less than about 7.0, about 6.5, or about 5.8, or greater than about 10, about 12, or about 15 is considered abnormal. In some embodiments, a CPP of from about 0 to about 5.8, from about to 0 to about 6.5, from about 0 to about 7.0, from about 10 to about 30, from about 12 to about 30, or from about 15 to about 30 is considered abnormal. In some embodiments, a CPP of from about 0.5 to about 8.5, from about 2.6 to about 5.4, or from about 2.5 to about 6.5 is considered normal. In some embodiments, a CPP of about 2.6, about 2.5, about 4.0, about 4.5, about 5.4, or about 6.5 is considered normal. In some embodiments, a CPP of less than about 2.6, about 2.5, or about 0.5, or greater than about 6.5, about 5.4, or about 8.4 is considered abnormal. In some embodiments, a CPP of from about 0 to about 0.5, from about to 0 to about 2.6, from about 0 to about 2.5, from about 8.5 to about 30, from about 5.4 to about 30, or from about 6.5 to about 30 is considered abnormal.

Treating and Preventing Malaria

Among other things, the present disclosure provides technologies for treating and/or preventing malaria infection by modulating (e.g., increasing or decreasing) RBC membrane permeability (e.g., by reducing Pk0 of a subject's RBCs).

RBC Permeability Modulating Therapy

In some embodiments, the present disclosure provides methods of treating and/or preventing malaria infection, comprising administering to a subject in need thereof RBC permeability modulating therapy, as described herein. It will be understood, of course, that "RBC permeability modulating therapy," as used herein, is not limited to therapies which only modulate permeability of RBCs and may have an effect on cells other than RBCs (either solely or in addition to RBCs) in a manner which may be beneficial for methods described herein.

RBC Permeability Modulating Agents

In some embodiments, RBC permeability modulating therapy as provided by the present disclosure is or comprises administration (i.e., to a subject or population of subjects) of a RBC permeability modulating agent. In some embodiments, a RBC permeability modulating agent modulates the permeability of RBCs to water.

For example, in some embodiments, a RBC permeability modulating agent may be or comprise 5-hydroxytryptamine (5-HT). 5-HT (i.e., serotonin) has the following structure:

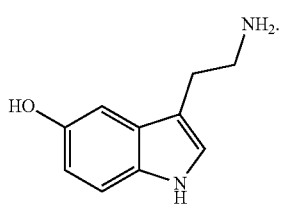 [SMILES: NCCc1c[nH]c2ccc(O)cc12]

In some embodiments, 5-HT is provided and/or utilized as a pharmaceutically acceptable salt. Pharmaceutically acceptable salts are well known in the art. For example, S. M. Berge, et al. describes exemplary pharmaceutically acceptable salts in detail in J. Pharmaceutical Sciences, 66: 1-19 (1977). In some embodiments, 5-HT, or a pharmaceutically acceptable salt thereof, is provided and/or utilized as a solid form (e.g., an amorphous solid form, a crystalline solid form, or a mixture thereof).

In some embodiments, a RBC permeability modulating agent provides 5-HT. For example, in some embodiments, an RBC permeability modulating agent is a biochemical precursor to 5-HT, such as tryptophan or 5-hydroxytryptophan (5-HTP), which is converted into 5-HT in vivo.

In some embodiments, a RBC permeability modulating agent is an agent that induces increased levels of serotonin in vivo. For example, in some embodiments, an RBC permeability modulating agent is selected from a selective serotonin reuptake inhibitor (SSRI), serotonin norepinephrine reuptake inhibitor (SNRI), monoamine oxidase inhibitors (MAOI), tricyclic antidepressants (TCA), and serotonin antagonist and reuptake inhibitor (SARI). Examples of SSRIs include citalopram, escitalopram, fluoxetine, fluvoxamine, paroxetine, sertraline, and dapoxetine. Examples of SNRIs include atomoxetine, desvenlafaxine, duloxetine, levomilnacipran, milnacipran, sibutramine, tramadol, and venlafaxine. Examples of MAOIs include isocarboxazid, nialamide, phenelzine, hydracarbazide, tranylcypromine, bifemelane, moclobemide, pirlindole, toloxatone, rasagiline, selegiline, and safinamide. Examples of TCAs include butriptyline, clomipramine, imipramine, trimipramine, desipramine, dibenzepin, lofepramine, maprotiline, nortriptyline, protriptyline, amitriptyline, amitriptylinoxide, amoxapine, demexiptiline, dimetacrine, dosulepin, doxepin, fluacizine, imipraminoxide, melitracen, metapramine, nitroxazepine, noxiptiline, pipofezine, propizepine, quinupramine, amineptin, iprindole, opipramol, and tianeptine. Examples of SARIs include nefazodone and trazodone.

Without wishing to be bound by any particular theory, the present disclosure encompasses the recognition that it may be disadvantageous to alter the amount of 5-HT, or a precursor thereof, in the brain. Accordingly, in some embodiments, a RBC permeability modulating agent is provided so that it does not cross or minimally crosses the blood-brain barrier (BBB). In some embodiments, RBC permeability modulating therapy comprises combination therapy of a RBC permeability modulating agent with a BBB blocking agent (e.g., glycerol).

In some embodiments, a RBC permeability modulating agent is provided as a pharmaceutical composition comprising a RBC permeability modulating agent and a pharmaceutically acceptable carrier.

Provided pharmaceutical compositions can be in a variety of forms including oral dosage forms, topical creams, topical patches, iontophoresis forms, suppositories, nasal spray and inhaler, eye drops, intraocular injection forms, depot forms, as well as injectable and infusible solutions. Methods for preparing pharmaceutical compositions are well known in the art.

Pharmaceutical compositions typically contain an active agent described herein (e.g., a RBC permeability modulating agent) in an amount effective to achieve a desired therapeutic effect while avoiding or minimizing adverse side effects. Pharmaceutically acceptable preparations and salts of an active agent are provided herein and are well known in the art. For administration of RBC permeability modulating agents and the like, the amount administered desirably is chosen so that it is therapeutically effective with few to no adverse side effects. The amount of the pharmaceutical composition which is effective in the treatment and/or prevention of malaria infection, or a related disease, disorder or condition, depends on the nature and severity of the disease, the target site of action, the subject's weight, special diets being followed by the subject, concurrent medications being used, the administration route and other factors that are recognized by those skilled in the art. The dosage can be adapted by a clinician in accordance with conventional factors such as extent of the disease and different parameters from the subject. Effective doses may be extrapolated from dose-response curves derived from in vitro or animal model test systems (e.g., as described by the U.S. Department of Health and Human Services, Food and Drug Administration, and Center for Drug Evaluation and Research in "Guidance for Industry: Estimating Maximum Safe Starting Dose in Initial Clinical Trials for Therapeutics in Adult Healthy Volunteers", *Pharmacology and Toxicology*, July 2005, the entire contents of which are incorporated herein by reference).

Various delivery systems are known and can be used to administer an active agent described herein or a pharmaceutical composition comprising the same.

In some embodiments, pharmaceutical compositions described herein can be administered by any suitable route including, but not limited to enteral, gastroenteral, epidural, oral, transdermal, epidural (peridural), intracerebral (into the cerebrum), intracerebroventricular (into the cerebral ventricles), epicutaneous (application onto the skin), intradermal, (into the skin itself), subcutaneous (under the skin), nasal administration (through the nose), intravenous (into a vein), intraarterial (into an artery), intramuscular (into a muscle), intracardiac (into the heart), intraosseous infusion (into the bone marrow), intrathecal (into the spinal canal), intraperitoneal, (infusion or injection into the peritoneum), intravesical infusion, intravitreal, (through the eye), intracavernous injection, (into the base of the penis), intravaginal administration, intrauterine, extra-amniotic administration, transdermal (diffusion through the intact skin for systemic distribution), transmucosal (diffusion through a mucous membrane), insufflation (snorting), sublingual, sublabial, enema, eye drops (onto the conjunctiva), or in ear drops. Other delivery systems well known in the art can be used for delivery of the pharmaceutical compositions described herein, for example via aqueous solutions, encapsulation in microparticules, or microcapsules. The pharmaceutical compositions described herein can also be delivered in a controlled release system. For example, a polymeric material can be used (see, e.g., Smolen and Ball, Controlled Drug Bioavailability, Drug product design and performance, 1984, John Wiley & Sons; Ranade and Hollinger, Drug Delivery Systems, pharmacology and toxicology series, 2003, $2^{nd}$ edition, CRRC Press). Alternatively, a pump may be used (Saudek et al., *N. Engl. J Med.* 321:574 (1989)). The compositions described herein may also be coupled to a class of biodegradable polymers useful in achieving controlled release of the active agent, for example, polylactic acid, polyorthoesters, cross-linked amphipathic block copolymers and hydrogels, polyhydroxy butyric acid, and polydihydropyrans.

As described above, in some embodiments, pharmaceutical compositions desirably include a pharmaceutically acceptable carrier. The term "carrier" refers to diluents, adjuvants, excipients or vehicles with which modulators are administered. Such pharmaceutical carriers include sterile liquids such as water and oils including mineral oil, vegetable oil (e.g., soybean oil or corn oil), animal oil or oil of synthetic origin. Aqueous glycerol and dextrose solutions as well as saline solutions may also be employed as liquid carriers of the pharmaceutical compositions of the present invention. The choice of the carrier depends on factors well recognized in the art, such as the nature of the agent, its solubility and other physiological properties as well as the target site of delivery and application. Examples of suitable pharmaceutical carriers are described in Remington: The Science and Practice of Pharmacy by Alfonso R. Gennaro, 2003, 21$^{th}$ edition, Mack Publishing Company. Moreover, suitable carriers for oral administration are known in the art and are described, for example, in U.S. Pat. Nos. 6,086,918, 6,673,574, 6,960,355, and 7,351,741 and in WO2007/131286, the disclosures of which are hereby incorporated by reference.

In some embodiments, pharmaceutically suitable materials that may be incorporated in pharmaceutical preparations include absorption enhancers including those intended to increase paracellular absorption, pH regulators and buffers, osmolarity adjusters, preservatives, stabilizers, antioxidants, surfactants, thickeners, emollient, dispersing agents, flavoring agents, coloring agents, and wetting agents.

Examples of suitable pharmaceutical excipients include, water, glucose, sucrose, lactose, glycol, ethanol, glycerol monostearate, gelatin, starch flour (e.g., rice flour), chalk, sodium stearate, malt, sodium chloride, and the like. Pharmaceutical compositions comprising RBC permeability modulating agents can take the form of solutions, capsules, tablets, creams, gels, powders sustained release formulations and the like. A composition can be formulated as a suppository, with traditional binders and carriers such as triglycerides (see Remington: The Science and Practice of Pharmacy by Alfonso R. Gennaro, 2003, 21$^{th}$ edition, Mack Publishing Company). Such compositions contain a therapeutically effective amount of a therapeutic composition, together with a suitable amount of carrier so as to provide the form for proper administration to the subject. Formulations are designed to suit the mode of administration and the target site of action (e.g., a particular organ or cell type).

Examples of fillers or binders that may be used in accordance with the present disclosure include acacia, alginic acid, calcium phosphate (dibasic), carboxymethylcellulose, carboxymethylcellulose sodium, hydroxyethylcellulose, hydroxypropylcellulose, hydroxypropylmethylcellulose, dextrin, dextrates, sucrose, tylose, pregelatinized starch, calcium sulfate, amylose, glycine, bentonite, maltose, sorbitol, ethylcellulose, disodium hydrogen phosphate, disodium phosphate, disodium pyrosulfite, polyvinyl alcohol, gelatin, glucose, guar gum, liquid glucose, compressible sugar, magnesium aluminum silicate, maltodextrin, polyethylene oxide, polymethacrylates, povidone, sodium alginate, tragacanth microcrystalline cellulose, starch, and zein.

Examples of disintegrating agents that may be used include alginic acid, carboxymethylcellulose, carboxymethylcellulose sodium, hydroxypropylcellulose (low substituted), microcrystalline cellulose, powdered cellulose, colloidal silicon dioxide, sodium croscarmellose, crospovidone, methylcellulose, polacrilin potassium, povidone, sodium alginate, sodium starch glycolate, starch, disodium disulfite, disodium edathamil, disodium edetate, disodiumethylenediaminetetraacetate (Na$_2$EDTA) crosslinked polyvinylpyrrolidones, pregelatinized starch, carboxymethyl starch, and sodium carboxymethyl starch.

Examples of lubricants include calcium stearate, canola oil, glyceryl palmitostearate, hydrogenated vegetable oil (type I), magnesium oxide, magnesium stearate, mineral oil, poloxamer, polyethylene glycol, sodium lauryl sulfate, sodium stearate fumarate, stearic acid, talc and, zinc stearate, glyceryl behapate, magnesium lauryl sulfate, boric acid, sodium benzoate, sodium acetate, sodium benzoate/sodium acetate (in combination), and DL-leucine.

Examples of silica flow conditioners include colloidal silicon dioxide, magnesium aluminum silicate and guar gum.

Examples of stabilizing agents include acacia, albumin, polyvinyl alcohol, alginic acid, bentonite, dicalcium phosphate, carboxymethylcellulose, hydroxypropylcellulose, colloidal silicon dioxide, cyclodextrins, glyceryl monostearate, hydroxypropyl methylcellulose, magnesium trisilicate, magnesium aluminum silicate, propylene glycol, propylene glycol alginate, sodium alginate, carnauba wax, xanthan gum, starch, stearate(s), stearic acid, stearic monoglyceride and stearyl alcohol.

Other RBC Permeability Modulating Therapies

In some embodiments, RBC permeability modulating therapy comprises one or more therapies other than administration of a RBC permeability modulating agent.

In some embodiments, RBC permeability modulating therapy as provided by the present disclosure may be or include administration of a preparation of RBCs in a resistant membrane permeability state. In some embodiments, such a preparation includes RBCs of a relevant subject that have been treated ex vivo to adopt a resistant state; in some embodiments, such a preparation includes RBCs of a donor (e.g., an immunologically matched donor), whose RBCs are in (e.g., have been treated to adopt or are otherwise in) a resistant state. In some embodiments, a subject or donor from whom RBCs for use in such a preparation are obtained is infected with malaria; in some embodiments, such a subject or donor is not so infected.

In some embodiments, RBC permeability modulating therapy comprises administration of platelet supernatant obtained from a relevant subject or suitable donor. For example, platelet supernatant can be provided by obtaining a sample of whole blood from a relevant subject or suitable donor, separating the platelets, and rupturing them in order to provide platelet supernatant. The present disclosure encompasses the recognition that platelets contain serotonin, and therefore, may be utilized as RBC permeability modulating therapy.

In some embodiments, RBC permeability modulating therapy comprises exposure to bright light. In some embodiments, RBC permeability modulating therapy comprises exercise. In some embodiments, RBC permeability modulating therapy comprises a tryptophan-rich diet.

Subjects to be Treated

As described herein, the present disclosure documents that subjects susceptible to initiation and/or maintenance of malarial infection can be identified and/or characterized through assessment of their RBC membrane permeability status.

In some embodiments, a subject may be considered to be susceptible to initiation and/or maintenance of malarial infection if the subject's Pk0 is greater than about 125 mOsm/kg, about 130 mOsm/kg, about 135 mOsm/kg, or about 140 mOsm/kg. In some embodiments, a subject may be considered to be susceptible to initiation and/or maintenance of malarial infection if the subject's Pk0 is from about 120 mOsm/kg to about 185 mOsm/kg, from about 130 mOsm/kg to about 160 mOsm/kg, from about 130 mOsm/kg to about 150 mOsm/kg, from about 132 mOsm/kg to about 152 mOsm/kg, from about 132 mOsm/kg to about 148 mOsm/kg, from about 135 mOsm/kg to about 145 mOsm/kg, from about 137 mOsm/kg to about 147 mOsm/kg, from about 140 mOsm/kg to about 144 mOsm/kg, from about 138 mOsm/kg to about 142 mOsm/kg, from about 132 mOsm/kg to about 164 mOsm/kg, from about 137 mOsm/kg to about 159 mOsm/kg, or from about 142 mOsm/kg to about 153 mOsm/kg.

In some embodiments, a subject may be considered to be susceptible to initiation and/or maintenance of malarial infection if a shift (e.g., an increase) of about 20 mOsm/kg, about 25 mOsm/kg, or about 30 mOsm/kg or more in a subject's Pk0 value is observed. In some embodiments, a subject may be considered to be susceptible to initiation and/or maintenance of malarial infection if a shift (e.g., an increase) of about 20 mOsm/kg, about 25 mOsm/kg, or about 30 mOsm/kg or more in a subject's Pk0 value is observed relative to a previous Pk0 value of the subject. In some embodiments, a shift is observed after a certain period of time, such as after about 1 day, about 1 week, about 1 month, about 6 months, or about 1 year, or longer.

In some embodiments, a subject's RBC membrane permeability has been assessed or monitored prior to administration of RBC permeability modulating therapy. In some embodiments, a subject's RBC permeability has been assessed or monitored at least once prior to administration of RBC permeability modulating therapy. In some embodiments, a subject's RBC permeability has been assessed or monitored a plurality of times, each separated by period of time, prior to administration of RBC permeability modulating therapy. In some embodiments, two or more such periods of time are the same (e.g., 1 day, 2 days, 1 week, 2 weeks, 1 month, 2 months, 6 months, 1 year, 2 years, 5 years, or 10 years, or longer).

The present disclosure also provides methods for identifying subjects in need of diagnostic assessment and/or therapy and/or prophylaxis for malarial infection. In some embodiments, a method of identifying a subject in need of diagnostic assessment and/or therapy and/or prophylaxis for malarial infection comprises steps of:
  determining one or more cell (e.g., RBC) membrane permeability parameters (e.g., Pk0) from a sample of the subject's blood; and
  comparing the determined one or more cell (e.g., RBC) membrane permeability parameters (e.g., Pk0) to a reference control parameter selected from the group consisting of a negative reference control parameter, a positive reference control parameter, or both; and
  identifying the subject as in need of when the determined one or more cell (e.g., RBC) membrane permeability parameters (e.g., Pk0) is not comparable to the negative reference control parameter and/or is comparable to the positive reference control parameter.

In some embodiments, a reference control parameter is a negative reference control parameter. For example, in some embodiments, a negative reference control parameter is obtained from a healthy individual or population of healthy individuals. In some embodiments, a negative reference control parameter is obtained from a population of healthy blood donors.

In some embodiments, a subject is identified as in need of diagnostic assessment and/or therapy and/or prophylaxis when the determined parameter is not comparable to the negative reference control parameter. In some embodiments, a determined parameter is not comparable to the negative reference control parameter when the determined parameter has a value that is at least 2%, 3%, 4%, 5%, 6%, 7%, 8%, 9%, 1%, 110%, 12%, 13%, 14%, 15%, 16%, 17%, 18%, 19%, or 20% different from the negative reference control parameter. In some embodiments, the determined parameter is not comparable to the negative reference control parameter when the determined parameter has a value that is 1, 2, 3, 4, 5, or more standard deviations away from the negative reference control parameter. In some embodiments, a determined parameter is not comparable to the negative reference control parameter when the determined parameter comprises one or more features that are not substantially comparable to the negative reference control parameter.

In some embodiments, a reference control parameter is a positive reference control parameter. For example, a positive reference control parameter can be obtained from a subject or population of subjects suffering from a disease, disorder, or condition. In some embodiments, a positive reference control parameter is obtained from a subject or population of subjects suffering from a disease, disorder, or condition that is the same disease, disorder, or condition for which the subject is being screened.

In some embodiments, a subject is identified as in need of diagnostic assessment and/or therapy and/or prophylaxis when the determined parameter is comparable to the positive reference control parameter. In some embodiments, a determined parameter is comparable to the positive reference control parameter when the determined parameter has a value that is within 2%, 3%, 4%, 5%, 6%, 7%, 8%, 9%, 10%, 11%, 12%, 13%, 14%, 15%, 16%, 17%1, 8%, 19%, or 20% of the positive reference control parameter. In some embodiments, the determined parameter is comparable to the positive reference control parameter when the determined parameter has a value that is within 1, 2, 3, 4, or 5 standard deviations of the positive reference control parameter. In some embodiments, a determined parameter is comparable to the positive reference control parameter when the determined parameter comprises one or more features that are substantially comparable to the positive reference control parameter.

In some embodiments, provided therapy is administered to a subject, or to a population of subjects. Subjects can be selected for provided therapies according to criteria described herein. For example, in some embodiments, provided therapy is administered to subjects who are considered susceptible to initiation and/or maintenance of malarial infection, as described herein. In some embodiments, provided therapy is not administered to subjects who are considered resistant to initiation and/or maintenance of malarial infection, as described herein.

In some embodiments, a subject has one or more of the following risk factors:
  (i) lives in a geographical area with a high incidence of malaria;
  (ii) has recently traveled to a geographical area with a high incidence of malaria;
  (iii) has recently been bitten by a mosquito in a geographical area with a high incidence of malaria;

(iv) is harboring dormant malaria parasite;
(v) is under 5 years of age; and
(vi) is pregnant.

In some embodiments, a subject lives in a geographical area with a high incidence of malaria, such as parts of Africa, Asia, Central America, South America, Haiti, Dominican Republic, and some Pacific islands.

In some embodiments, a subject has recently traveled to a geographical area with a high incidence of malaria, such as parts of Africa, Asia, Central America, South America, Haiti, Dominican Republic, and some Pacific islands. In some such embodiments, travel occurred within the last week, last month, last 6 months, or last year.

In some embodiments, a subject has recently been bitten by a mosquito in a geographical area with a high incidence of malaria. In some such embodiments, a mosquito bite occurred within the last week, last month, last 6 months, or last year. In some such embodiments, provided methods further comprise administering RBC permeability modulating therapy within 24 hours, within 48 hours, within 1 week, within 1 month, within 6 months, or within 1 year of a mosquito bite.

In some embodiments, a subject is harboring dormant malaria parasite.

In some embodiments, a subject is under 5 years of age, under 4 years of age, under 3 years of age, under 2 years of age, or under 1 year of age.

In some embodiments, a subject is pregnant.

In some embodiments, a subject is receiving or has received one or more additional therapies (e.g., one or more additional agents) in addition to RBC permeability modulating therapy as described herein. For example, in some embodiments, a subject or population of subjects is receiving or has received one or more agents that is typically administered as or otherwise considered to be a malarial prophylactic agent such as, for example, one or more agents selected from mefloquine, doxycycline, atovaquone, or proguanil, and combinations thereof, alternatively or additionally, in some embodiments, a subject or population of subjects is receiving or has received one or more agents that is typically administered as a malarial therapeutic agent such as, for example, one or more agents selected from the group consisting of amodiaquine, arteether, artemether, artesunate, artemisinin, atovaquone, chloroquine, cinchoine, cinchonidine, clindamycin, dihydroartemisinin, doxycycline, halofantrine, hydroxychloroquine, lumefantrine, mefloquine, piperaquine, primaquine, pyrimethamine, quinidine, quinine, sulfadoxine, sulfamethoxypyridazine, tafenoquine, or tetracycline, and combinations thereof.

In some embodiments, the subject is resistant to treatment with one or more agents selected from amodiaquine, arteether, artemether, artesunate, artemisinin, atovaquone, chloroquine, cinchoine, cinchonidine, clindamycin, dihydroartemisinin, doxycycline, halofantrine, hydroxychloroquine, lumefantrine, mefloquine, piperaquine, primaquine, pyrimethamine, quinidine, quinine, sulfadoxine, sulfamethoxypyridazine, tafenoquine, or tetracycline, and combinations thereof.

Administration

In some embodiments, provided methods can comprise administering RBC permeability modulating therapy via a route such as, for example, orally, parenterally, topically, etc., or a combination thereof.

In some embodiments, RBC permeability modulating therapy (e.g., a RBC permeability modulating agent) as described herein is administered as a single dose. In some embodiments, RBC permeability modulating therapy (e.g., a RBC permeability modulating agent) as described herein is administered at regular intervals. Administration at an "interval," as used herein, indicates that the therapeutically effective amount is administered periodically (as distinguished from a one-time dose). The interval can be determined by standard clinical techniques. In some embodiments, RBC permeability modulating therapy (e.g., a RBC permeability modulating agent) as described herein is administered bimonthly, monthly, twice monthly, triweekly, biweekly, weekly, twice weekly, thrice weekly, daily, twice daily, or every six hours. The administration interval for a single individual need not be a fixed interval, but can be varied over time, depending on the needs of the individual.

In some embodiments, RBC permeability modulating therapy (e.g., a RBC permeability modulating agent) as described herein is administered at regular intervals indefinitely. In some embodiments, RBC permeability modulating therapy (e.g., a RBC permeability modulating agent) as described herein is administered at regular intervals for a defined period of time. In some embodiments, RBC permeability modulating therapy (e.g., a RBC permeability modulating agent) as described herein is administered at regular intervals for at least 50 years, 20 years, 15 years, 10 years, 5 years, 4, years, 3, years, 2, years, 1 year, 11 months, 10 months, 9 months, 8 months, 7 months, 6 months, 5 months, 4 months, 3 months, 2 months, a month, 3 weeks, 2, weeks, a week, 6 days, 5 days, 4 days, 3 days, 2 days, or a day.

In some embodiments, the RBC permeability modulating therapy (e.g., a RBC permeability modulating agent) as described herein is administered indefinitely (e.g., at undefined or irregular intervals). In some embodiments, the RBC permeability modulating therapy (e.g., a RBC permeability modulating agent) is provided in food or drink (e.g., as a supplement and/or in analogy to fluoridated water).

In some embodiments, the present disclosure encompasses the recognition that it may be advantageous to administer RBC permeability modulating therapy according to a dosing regimen that comprises a dosing holiday. For example, in some embodiments, RBC permeability modulating therapy is administered regularly for a certain period of time and then is not administered for a certain period of time ("the dosing holiday"). In some embodiments, a dosing regimen corresponds to the lifetime of RBCs in humans (approx. 120 days). In some embodiments, a dosing regimen is about 120 days and comprises a first period (e.g., 1 day, 2 days, 5 days, 7 days, 14 days, 30 days, or 60 days) during which RBC permeability modulating therapy is administered, followed by a second period (e.g., 119 days, 118 days, 115 days, 113 days, 106 days, 90 days, or 60 days) during which no RBC permeability modulating therapy is administered. Such dosing regimens can be repeated multiples times (e.g., two, three, four, five, or more times).

In some embodiments, where RBC permeability modulating therapy includes administration of a composition that comprises or delivers an agent for which one or more approved or otherwise generally accepted dosing regimens has been established, RBC permeability modulating therapy may be or comprise administration according to such regimen. In other embodiments, RBC permeability modulating therapy may be or comprise administration according to a different regimen.

For example, in some embodiments, RBC permeability modulating therapy may be or comprise administration according to a regimen that achieves a shift in one or more RBC membrane permeability parameters, e.g., as described herein, associated with resistance to malarial infection. In some embodiments, RBC permeability modulating therapy involves suspending or discontinuing treatment once such shift has been achieved. In some embodiments, RBC permeability modulating therapy comprises monitoring one or more RBC membrane permeability parameters before and/or during treatment, and/or after and/or during any suspension or discontinuance of treatment. In some embodiments, RBC permeability modulating therapy may comprise re-initiation of treatment after a period of suspension or discontinuation, for example, if a loss or diminution of a previously established shift is detected. In some embodiments, RBC permeability modulating therapy may comprise administering an RBC permeability modulating agent according to a regimen in which one or more of dose amount, dose timing, route of administration, etc., may be altered over time, for example, responsive to permeability changes determined by monitoring as described herein.

Monitoring Population(s) and/or Therapy

Among other things, the present disclosure provides technologies for monitoring subjects and/or populations to assess their RBC permeability state, e.g., relative to susceptibility to malarial infection.

In some embodiments, a method comprises steps of:
determining one or more cell (e.g., RBC) membrane permeability parameters (e.g., Pk0) from each of a plurality of blood samples obtained at different time points from a single subject; and
comparing the determined one or more cell (e.g., RBC) membrane permeability parameters (e.g., Pk0) from a first time point with that from at least one later time point,
wherein a significant change in the determined one or more cell (e.g., RBC) membrane permeability parameters (e.g., Pk0) over time indicates a material change in the subject's susceptibility and/or resistance state to malarial infection.

In some embodiments, a method comprises steps of:
determining one or more cell (e.g., RBC) membrane permeability parameters (e.g., Pk0) from a blood sample obtained from a subject for whom one or more cell (e.g., RBC) membrane permeability parameters (e.g., Pk0) has previously been obtained at least once; and
comparing the determined one or more cell (e.g., RBC) membrane permeability parameters (e.g., Pk0) with the previously obtained one or more cell (e.g., RBC) membrane permeability parameters (e.g., Pk0),
wherein a significant change in the determined one or more cell (e.g., RBC) membrane permeability parameters (e.g., Pk0) compared to the previously obtained one or more cell (e.g., RBC) membrane permeability parameters (e.g., Pk0) indicates a material change in the subject's susceptibility and/or resistance state to malarial infection.

In some embodiments, a significant change in a determined parameter (e.g., Pk0) is a change of 1%, 2%, 3%, 4%, 5%, 6%, 7%, 8%, 9%, 10%, 11%, 2%1, 3%1, 4%1, 5%1, 16%, 17%, 18%, 19%, or 20%, or greater. In some embodiments, a significant change in a cell (e.g., RBC) membrane permeability parameter (e.g., Pk0) is a change of 1, 2, 3, 4, or 5, or greater standard deviations.

In some embodiments, a subject for whom Pk0 is determined to be within a range of about 120 mOsm/kg to about 185 mOsm/kg, about 130 mOsm/kg to about 160 mOsm/kg, about 130 mOsm/kg to about 150 mOsm/kg, about 132 mOsm/kg to about 152 mOsm/kg, about 132 mOsm/kg to about 148 mOsm/kg, about 135 mOsm/kg to about 145 mOsm/kg, about 137 mOsm/kg to about 147 mOsm/kg, about 140 mOsm/kg to about 144 mOsm/kg, about 138 mOsm/kg to about 142 mOsm/kg, from about 132 mOsm/kg to about 164 mOsm/kg, from about 137 mOsm/kg to about 159 mOsm/kg, or from about 142 mOsm/kg to about 153 mOsm/kg is relatively susceptible to initiation and/or maintenance of malarial infection; in some embodiments, a subject for whom Pk0 is determined to be within a range of about 100 mOsm/kg to about 120 mOsm/kg, about 102 mOsm/kg to about 118 mOsm/kg, about 105 mOsm/kg to about 115 mOsm/kg or about 108 mOsm/kg to about 112 mOsm/kg is relatively resistant to initiation and/or maintenance of malarial infection.

In some embodiments, a shift (e.g., an increase or a decrease) of about 20 mOsm/kg, about 25 mOsm/kg, or about 30 mOsm/kg or more in a subject's Pk0 value indicates that subject has switched between relatively susceptible vs. relatively resistant states with respect to malarial infection. In some embodiments, an increase of about 20 mOsm/kg, about 25 mOsm/kg, or about 30 mOsm/kg or more in a subject's Pk0 value indicates that subject has switched from a relatively resistant state to a relatively susceptible state with respect to malarial infection. In some embodiments, a decrease of about 20 mOsm/kg, about 25 mOsm/kg, or about 30 mOsm/kg or more in a subject's Pk0 value indicates that subject has switched from a relatively susceptible state to a relatively resistant state with respect to malarial infection.

In some embodiments, a subject is monitored at regular intervals, such as every day, every week, every month, every two months, every 6 months, every 12 months, etc. In some embodiments, different time points are separated from one another by a reasonably consistent interval. In some embodiments, different time points are separated from one another by a day, a week, a month, two months, six months, a year, or longer. In some embodiments, the previously obtained cell (e.g., RBC) membrane permeability parameter was obtained, e.g., a day, a week, a month, two months, six months, a year, or longer before the determined cell (e.g., RBC) membrane permeability parameter).

In some embodiments, a subject may be monitored before and/or after a particular event (e.g., an event that increases or decreases the subject's risk of malarial infection). For example, in some embodiments, a subject may be monitored before, during, and/or after travel to a geographical area where there is an increased risk of contracting malarial infection (e.g., travel to parts of Africa, Asia, Central America, South America, Haiti, Dominican Republic, and some Pacific islands increasing an individual's risk of contracting malaria). In some embodiments, a subject may be monitored before and/or after initiation and/or diagnosis of malarial infection. In some embodiments, a subject may be monitored before and/or after becoming at risk of malarial infection.

In some embodiments, monitoring a subject and/or population provides insight into the susceptibility and/or resistance state of the subject and/or population. Such insight may be used to inform decisions about suitable therapy. For example, in some embodiments, RBC permeability modulating therapy is administered to subjects and/or populations that have been deemed susceptible, based on a method of monitoring described herein. Conversely, in some embodiments, RBC permeability modulating therapy is not administered to subjects and/or populations that have been deemed resistant, based on a method of monitoring described herein.

In some embodiments, methods provided herein may be useful for monitoring therapy and/or prophylaxis status and/or efficacy. In some embodiments, a subject may be monitored before and after initiation of therapy and/or prophylaxis. In some embodiments, therapy and/or prophylaxis is continued or discontinued based on the outcome of monitoring with provided methods. For example, in some embodiments, if a significant change is observed in a cell (e.g., RBC) membrane permeability parameter compared to a a cell (e.g., RBC) membrane permeability parameter obtained prior to initiation of therapy, then the therapy may be considered effective and continued or discontinued based on the recommendation of a medical professional. In some embodiments, if a significant change is not observed in a cell (e.g., RBC) membrane permeability parameter compared to a cell (e.g., RBC) membrane permeability parameter obtained prior to initiation of therapy, then the therapy may be considered ineffective and continued or discontinued based on the recommendation of a medical professional. In some embodiments, if a significant change is observed in a cell (e.g., RBC) membrane permeability parameter compared to a cell (e.g., RBC) membrane permeability parameter obtained prior to initiation of prophylaxis, then the prophylaxis may be considered not effective and continued or discontinued based on the recommendation of a medical professional. In some embodiments, if a significant change is not observed in a cell (e.g., RBC) membrane permeability parameter compared to a cell (e.g., RBC) membrane permeability parameter obtained prior to initiation of prophylaxis, then the prophylaxis may be considered effective and continued or discontinued based on the recommendation of a medical professional.

In some embodiments, methods of monitoring are useful for monitoring the effectiveness of RBC permeability modulating therapy, as well as determining efficacious dosing and dosing regimens for RBC permeability modulating therapy. In some embodiments, a method of monitoring comprises monitoring a subject and/or population that is receiving or has received RBC permeability modulating therapy. In some embodiments, a method of monitoring comprises adjusting the dose and/or dosing regimen of RBC permeability modulating therapy, based on the subject's RBC membrane permeability. In some embodiments, the method further comprises increasing the dose and/or frequency of dosing if the subject is not in a resistant state and/or is in a susceptible state, as determined by the RBC membrane permeability of the subject. In some embodiments, the method further comprises maintain or decreasing the dose and/or frequency of dosing if the subject is in a resistant state and/or is not in a susceptible state, as determined by the RBC membrane permeability of the subject.

Identification and/or Characterization of RBC Permeability Modulating Agents and/or Therapies Among other things, the present disclosure provides technologies for assessing (e.g., identifying and/or characterizing) agents and/or treatments that modulate cell (e.g., RBC) membrane permeability. As described herein, in some embodiments, agents and/or treatments that decrease RBC permeability may be useful to treat and/or prevent malarial infection; alternatively or additionally, in some embodiments, agents and/or treatments that increase RBC permeability may desirably be avoided by subjects suffering from and/or susceptible to malarial infection.

In some embodiments, a method comprises:
 contacting a sample of blood from a healthy subject with an agent or therapy;
 determining one or more RBC membrane permeability parameters (e.g., Pk0) from the sample of blood;
 comparing the determined one or more RBC membrane permeability parameters (e.g., Pk0) to a reference control parameter selected from the group consisting of a positive reference control parameter, a negative reference control parameter, or both; and
 identifying the agent or therapy as a RBC permeability modulating agent when the determined one or more RBC membrane permeability parameters (e.g., Pk0) is not comparable to the negative reference control parameter and/or is comparable to the positive reference control parameter.

In some embodiments, a reference control parameter is a negative reference control parameter. For example, in some embodiments, a negative reference control parameter is obtained from a healthy individual or population of healthy individuals. In some embodiments, a negative reference control parameter is obtained from a population of healthy blood donors.

In some embodiments, an agent or therapy is identified as a RBC permeability modulating agent when the determined one or more cell (e.g., RBC) membrane permeability parameters (e.g., Pk0) is not comparable to the negative reference control parameter. In some embodiments, a determined one or more cell (e.g., RBC) membrane permeability parameters (e.g., Pk0) is not comparable to the negative reference control parameter when the determined Pk0 has a value that is at least 2%, 3%, 4%, 5%, 6%, 7%, 8%, 9%, 10%, 11%, 12%, 13%, 14%, 15%, 16%, 17%, 18%, 19%, or 20% different from the negative reference control parameter. In some embodiments, the determined one or more cell (e.g., RBC) membrane permeability parameters (e.g., Pk0) is not comparable to the negative reference control parameter when the determined one or more cell (e.g., RBC) membrane permeability parameters (e.g., Pk0) has a value that is 1, 2, 3, 4, 5, or more standard deviations away from the negative reference control parameter.

In some embodiments, a reference control parameter is a positive reference control parameter. For example, a positive reference control parameter can be obtained from a sample or plurality of samples of RBCs with modulated RBC membrane permeability.

In some embodiments, an agent or therapy is identified as RBC permeability modulating agent when the determined one or more cell (e.g., RBC) membrane permeability parameters (e.g., Pk0) is comparable to the positive reference control parameter. In some embodiments, a determined one or more cell (e.g., RBC) membrane permeability parameters (e.g., Pk0) is comparable to the positive reference control parameter when the determined parameter has a value that is within 2%, 3%, 4%, 5%, 6%, 7% 8%, 9% 10%, 11%, 12%, 13%, 14%, 15%, 16%, 17%, 18%, 19%, or 20% of the positive reference control parameter. In some embodiments, the determined one or more cell (e.g., RBC) membrane permeability parameters (e.g., Pk0) is comparable to the positive reference control parameter when the determined parameter has a value that is within 1, 2, 3, 4, or 5 standard deviations of the positive reference control parameter.

In some embodiments, a sample is analyzed within a particular time period after being subjected to an agent or composition (e.g., within about 5 minutes, about 10 minutes, about 30 minutes, about 1 hour, about 2 hours, or about 5 hours). In some embodiments, a method further comprises evaluating a dose response of an agent or composition (e.g., by subjecting each of a plurality of samples to varying concentrations of agent or composition).

In some embodiments, an agent or composition that induces a Pk0 of the sample within a range of about 100 mOsm/kg to about 120 mOsm/kg, about 102 mOsm/kg to about 118 mOsm/kg, about 105 mOsm/kg to about 115 mOsm/kg or about 108 mOsm/kg to about 112 mOsm/kg is a RBC permeability modulating agent. In some embodiments, an agent or composition that induces a Pk0 of the sample within a range of about 120 mOsm/kg to about 185 mOsm/kg, about 130 mOsm/kg to about 160 mOsm/kg, about 130 mOsm/kg to about 150 mOsm/kg, about 132 mOsm/kg to about 152 mOsm/kg, about 132 mOsm/kg to about 148 mOsm/kg, about 135 mOsm/kg to about 145 mOsm/kg about 137 mOsm/kg to about 147 mOsm/kg, about 140 mOsm/kg to about 144 mOsm/kg, about 138 mOsm/kg to about 142 mOsm/kg, about 132 mOsm/kg to about 164 mOsm/kg, about 137 mOsm/kg to about 159 mOsm/kg, or about 142 mOsm/kg to about 153 mOsm/kg is not a RBC permeability modulating agent.

In some embodiments, an agent or therapy that induces a shift of about 20 mOsm/kg, about 25 mOsm/kg, or about 30 mOsm/kg or more in the sample's Pk0 value indicates that the agent or composition is a RBC permeability modulating agent.

In some embodiments, further considerations may be necessary to determine if a RBC permeability modulating agent as identified herein is suitable for using as therapy in subjects (e.g., toxicity evaluations, etc.). For example, in some embodiments, it may be important for RBC permeability modulating agents to not cross the blood-brain-barrier (BBB). Accordingly, further evaluations of RBC permeability modulating agents may be performed before administering to subjects.

EXAMPLES

Example 1. Cell Scan for Cell Membrane Permeability

A sample of whole blood from a healthy volunteer was drawn into ACD anticoagulant. The unwashed sample was divided into aliquots and was analyzed using the Prior Shine Technology and/or the Provided Cell Scanning Technologies. The following outputs were obtained from the sample:
Cell-by-Cell Color Map Cell membrane permeability recorded on a cell-by-cell basis is shown in FIG. 1a. The number of blood cells within each aliquot were counted (typically, e.g., at least 1000), and the cell-by-cell data was then used to produce an exact frequency distribution of cell permeability. Frequency distributions of each sample are conveniently displayed using different colors (e.g., a color map), as shown in FIG. 1a. In a cell-by-cell graph, population density is represented by color, with zero density corresponding to white, the lowest nonzero density corresponding to the darker points (e.g., at 106), and, as density progressively increases, color of the points lightens and then darkens to black.

One feature of the cell-by-cell graph is the portion of the graph associated with intact cells (e.g., from about 300 mOsm/kg to about 70 mOsm/kg); during this period, the size of the cell population does not change, and thereafter, the cell population increases in volume, and then falls. The static initial period is the result of cell's exposure to fluid of a single tonicity (e.g., isotonic fluid), and the remainder is the result of exposure to progressive increase in osmotic stress.

"Pk0" coincided with the minimum absolute osmotic pressure (e.g., most hypotonic pressure) to which a cell can be subjected without loss of integrity. Pk0 can be identified by determining the right-most extent of the intact cell population in the cell-by-cell graph, i.e., the point of osmolality immediately preceding the point at which the cells ruptured. In FIG. 1a, this minimum pressure is the "peak"

106. As the osmolality of the surrounding solution was reduced, the red blood cell ruptures and forms a ghost cell, which releases its contents into the surrounding medium.

In the cell-by-cell graph, there typically appears to the right of the expanding intact cell (EIC) population, a second and smaller cluster. This smaller cluster comprises "ghost cells," which are cells that have ruptured and thereafter resealed themselves (labeled 105 in FIG. 1a). Between the EIC population and the ghost cell cluster appears a relatively colorless or cell free area, termed the "ghost gap" (labeled 104 in FIG. 1a). The presence of a ghost gap is normal for cells of healthy individuals and is diminished or absent for individuals with certain types of physiological conditions. A diminished or absent ghost gap indicates loss of uniformity of cell shape and/or size.

Figure 2:
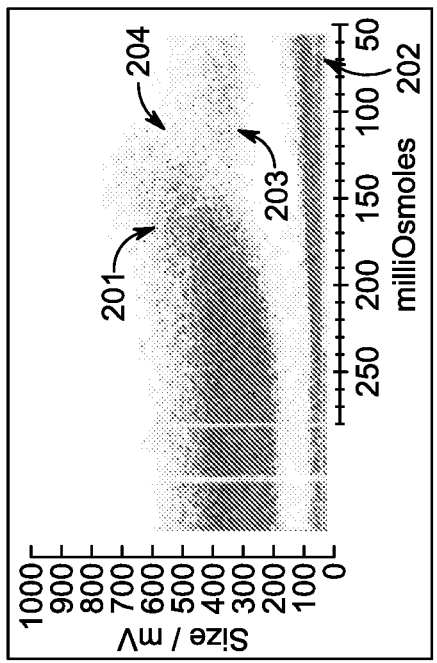
FIG. 2, comprising panels a-d, shows varying degrees of severity of cell fragmentation.
Figure 2:
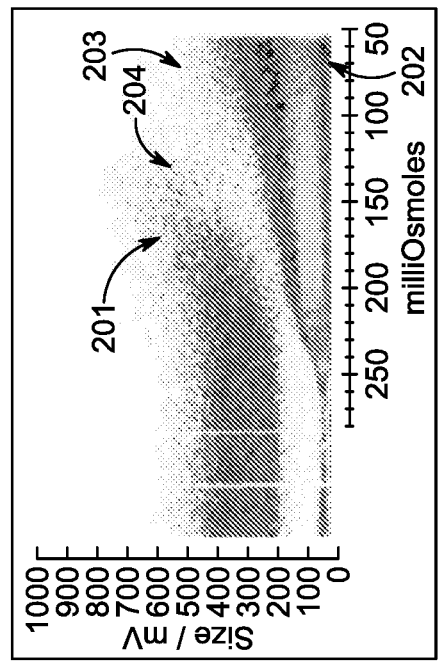
Figure 2:
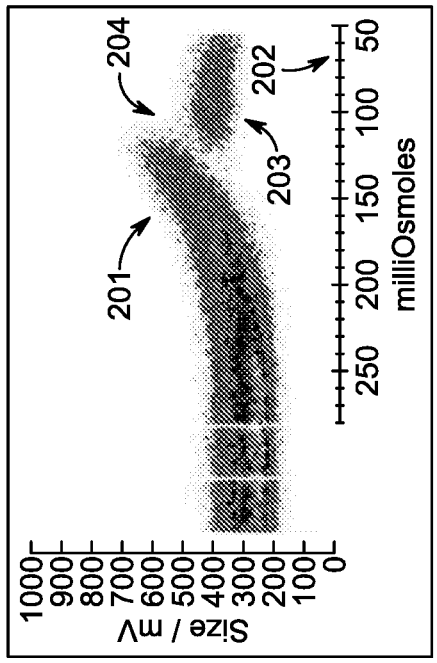
Figure 2:
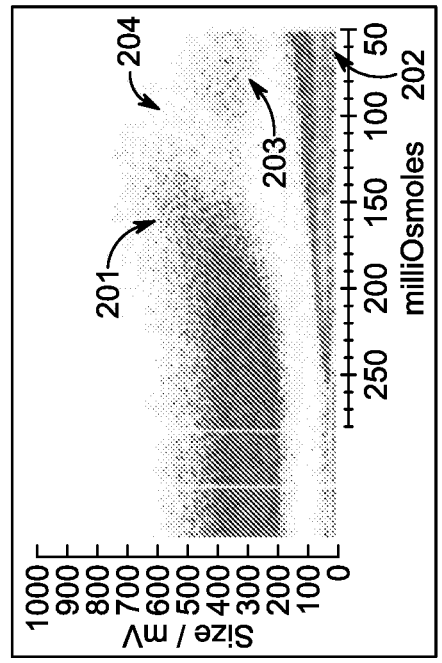

Another feature in the cell-by-cell graph is a region associated with the presence of cell fragments, which have a smaller volume (e.g., an average volume of about 20 fL) and therefore appear at the bottom of the graph, above the baseline (202 in FIG. 2) and toward the right. Cell fragments (i.e., schistocytes) are differentiated by their relatively small size and dynamic response to osmotic stress (e.g., increase in size and/or number under osmotic stress). As the osmolality of the surrounding solution was reduced, fragments appeared to increase in size by about 70% and increased in number by about 200%. For a healthy individual, the cell-by-cell graph showed few, if any, cell fragments. For unhealthy individuals, the cell-by-cell graph displayed a larger population of cell fragments, which increased in size with the increase in osmotic stress. In some embodiments, severity of cell fragmentation can be ranked on a scale of zero (no fragments) through 3 (most severe), or from low to moderate to severe as shown in FIG. 2. In some embodiments, an actual count of cell fragments is provided.

A third feature of the cell-by-cell graph is a region associated with the presence of platelets, located below the standard curve and immediately above the baseline. Platelets are characterized by their smaller size (e.g., a mean volume of about 10 fL). In some embodiments, platelets do not appear to increase significantly in size when subjected to decreasing osmolality, and the number of platelets does not increase with osmotic stress. For a healthy individual, the cell-by-cell graph showed a normal platelet population just above the baseline. A larger population of platelets was observed, though, in individuals with, for example, certain infections, hemoglobinopathies, tuberculosis, rheumatoid arthritis, and cancers.
Percent Cell Volume Change vs. Osmolality ("Cell Scan Plot")

Using the technologies described herein, a cell-by-cell analysis was converted into a plot of percent change of cell volume vs. osmolality ("Cell Scan Plot") by converting the individual peak voltage into a cell volume, then calculating a mean volume for an aliquot of cells, and plotting the means to generate the Cell Scan Plot. The percentage change of cell volume at each osmolality is calculated and compared to the mean cell volume of an isotonic cell (e.g., FIG. 1b). On such a plot, Pk0 (see 101) is the osmotic pressure at which the net water flow is zero (i.e., when a cell achieved its maximum volume, i.e., when it is a perfect sphere). As described herein, in some embodiments, Pk0 can be used as an indicator of an individual's health status.
Fluid Flux Curve (FFC)

The Fluid Flux Curve (FFC) was determined by taking the first order derivative (with respect to osmolality) of Cell Scan Plot (FIG. 1c). In an FFC, Pk0 occurred at the zero crossing (101), which was where the slope of the Cell Scan Plot changes from positive to negative. A positive value on the FFC represented a net flow of fluid into the cell, while negative rates represented a net flow of fluid out of the cell. In the FFC, the positive peak 102 and negative peak 103 corresponded to the maximum and minimum, respectively, on the FFC. As used herein, "Pymax" is the magnitude of fluid flux at the maximum, and "Pymin" is the magnitude of fluid flux at the minimum.

From cell size at Pk0 and isotonic cell size, a cell size and shape were estimated, as shown in FIG. 1e. In FIG. 1e, the depiction of a red blood cell at the isotonic osmolality is scaled to size.

Frequency Distribution of Cell-by-Cell Analysis

The frequency distribution of the cell-by-cell analysis, as shown in FIG. 1d, was determined from the cell-by-cell plot of FIG. 1a. The frequency distribution is a classical density distribution of red blood cell population and was examined at different osmolarities to calculate statistical parameters including the mean, the standard deviation, coefficient of variation, normality, skewness, kurtosis, and the number of inflection points. As shown in FIG. 1d, three distributions are depicted, which correspond to the three "cuts" on the cell-by-cell curve (FIG. 1a). These "cuts" correspond to the distribution at three osmolality values: the solid thin line 107 being isotonic (resting) cells (i.e., 280 mOsm/kg), bold line 109 being spherical cells (i.e., 142 mOsm/kg), and dotted line 108 being ghost cells (i.e., 110 mOsm/kg). It will be appreciated that the "cuts" can be made at any point along the cell-by-cell plot, and a frequency distribution plotted for each of them.

Raw Data Curve

An exemplary "Raw Data Curve" is shown in FIG. 1f, which shows superimposed graphs of mean voltage 111 and cell count 110 for a scan against osmolality. As shown, the cell count, which was initially relatively high at the beginning of the scan, reduced throughout the test due to the dilution of the sample using cell scanning technologies described herein. The mean voltage rose to a maximum at a critical osmolality, where the red blood cells achieved a spherical shape, and then reduced. In some embodiments, a Raw Data Curve, such as the one in FIG. 1f, can be used to confirm that a suitable osmolality gradient was achieved during the course of the RBC permeability measurement. In some embodiments, a suitable osmolality gradient is substantially linear.

Scattering

Figure 3:
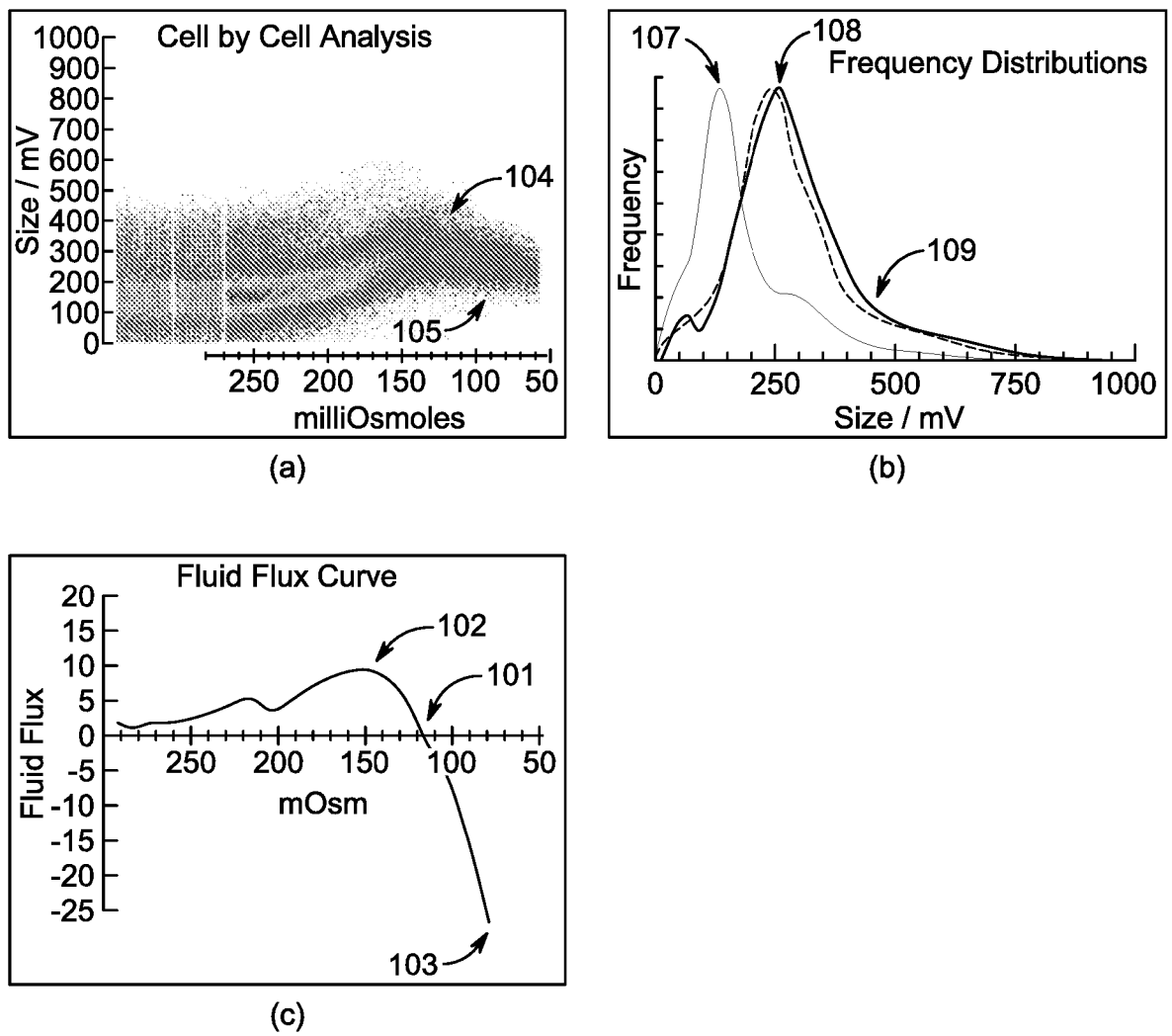
FIG. 3, comprising panels a-c, shows exemplary methods for determining scattering of a RBC permeability analysis (e.g., heterogeneity of the cell population). Scattering can be determined, e.g., from a cell-by-cell graph (FIG. 3a), from a frequency distribution curve (FIG. 3b), and/or from a fluid flux curve (FIG. 3c).

Scattering, or cell heterogeneity, was measured in at least six ways, including intensity of color on the cell-by-cell graph (FIG. 3a), size of the ghost gap (FIG. 3a), standard deviation on the Frequency Distribution Curve (FIG. 3b), number of inflection points (jaggedness) on any of the Frequency Distribution Curves (FIG. 3b), the irregularities of the FFC (FIG. 3c), and peak width at 10% below maximum peak height (W10) of the Cell Scan Plot.

Sphericity Index

Sphericity index is measured as described in WO 97/24601. In some embodiments, sphericity index is multiplied by a scaling factor (e.g., a scaling factor of 10). A sphericity index multiplied by a scaling factor of 10 is referred to herein as a scaled sphericity index (sSI).

Example 2. Identification of a RBC Membrane Permeability Modulating Agent

Figure 4:
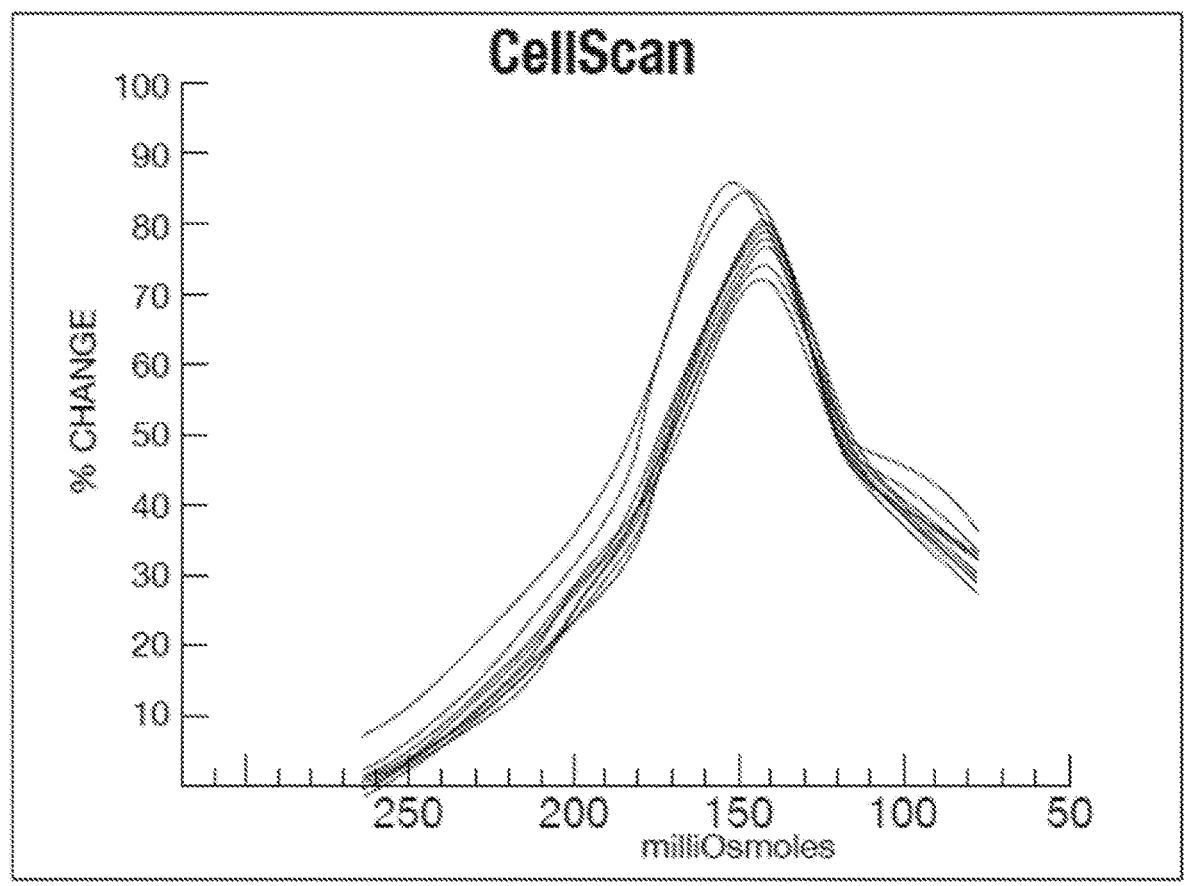
FIG. 4 is a cell scan plot demonstrating % change in cell volume vs. osmolality after treatment of samples of RBCs with various agents. Agents (from top to bottom): L-arabinose, glucose, lactose, fructose, L-rhamnose, D-galactose, mannitol, xylose, maltose.

A sample of whole blood from a healthy volunteer was drawn into ACD anticoagulant. Blood samples were divided into aliquots, and each sample was contacted with an agent at concentrations consistent with the agent's in vivo concentration. Agents that were tested included alcohols, alpha fetoproteins, amphotericin B, bovine albumen, carcinoembryonic antigen (CEA), concanavalin A (Con A), fetuin, fibronectin, 5-HT, kallikrein, ovomucoid, prostacyclin, prostaglandin, semen, transferrin, and several sugars, including N-acetyl-D-glucosamine, N-acetyl neurominic acid, 2-deoxy-D-ribose, fructose, D- and L-arabinose, beta-D-galactopyranoside, erythrose, D- and L-fucose, D- and L-glucose, D-galactose, lactose, maltose, iso-maltose, D-mannose, mannitol, L-rhamnose, ribose, sucrose, and D-xylose. Five minutes after exposure to an agent, the blood sample was evaluated for cell membrane permeability and Pk0 was measured. FIG. 4 shows the results of exemplary agents tested in this Example. As shown in FIG. 4, none of the sugars tested resulted in a Pk0 shift after five minutes. After 10 minutes, low molecular weight sugars (<182 Da) increased Pk0, while high molecular weight sugars (342-380 Da) slightly lowered Pk0, e.g., by about 10 mOsm/kg. Lactose (MW=360 Da) lowered Pk0 to 100 mOsm/kg. Small differences (e.g., 20-30 mOsm/kg) in Pk0 between D and L isomers of the same sugar were observed and verified that the observed effects are not osmotic, since enantiomers would not be expected to display different osmotic effects.

As shown in Table 1, very few of the tested agents induced water permeability resistance, i.e., decreased RBC membrane permeability to water (only certain agents which altered RBC membrane permeability are listed). Notably, 5-HT was effective within minutes and is found in platelets, suggesting that it may, in fact, be the key factor controlling cell membrane permeability in vivo. Lactose and amphotericin B were also identified as RBC membrane permeability modulating agents suggests that they (or analogs thereof) may be useful for treating and/or preventing malaria.

TABLE 1

| Agent | Concentration | Pk0 (mOsm/kg) |
| --- | --- | --- |
| 5-HT | 900 ng/mL | 110 |
| Lactose | 1:20 (v/v) saturated lactose solution | 110 |
| Amphotericin B | 0.5 µg/mL | 85 |

Example 3. Effect of 5-HT on Cell Membrane Permeability of Healthy RBCs

Figure 5:
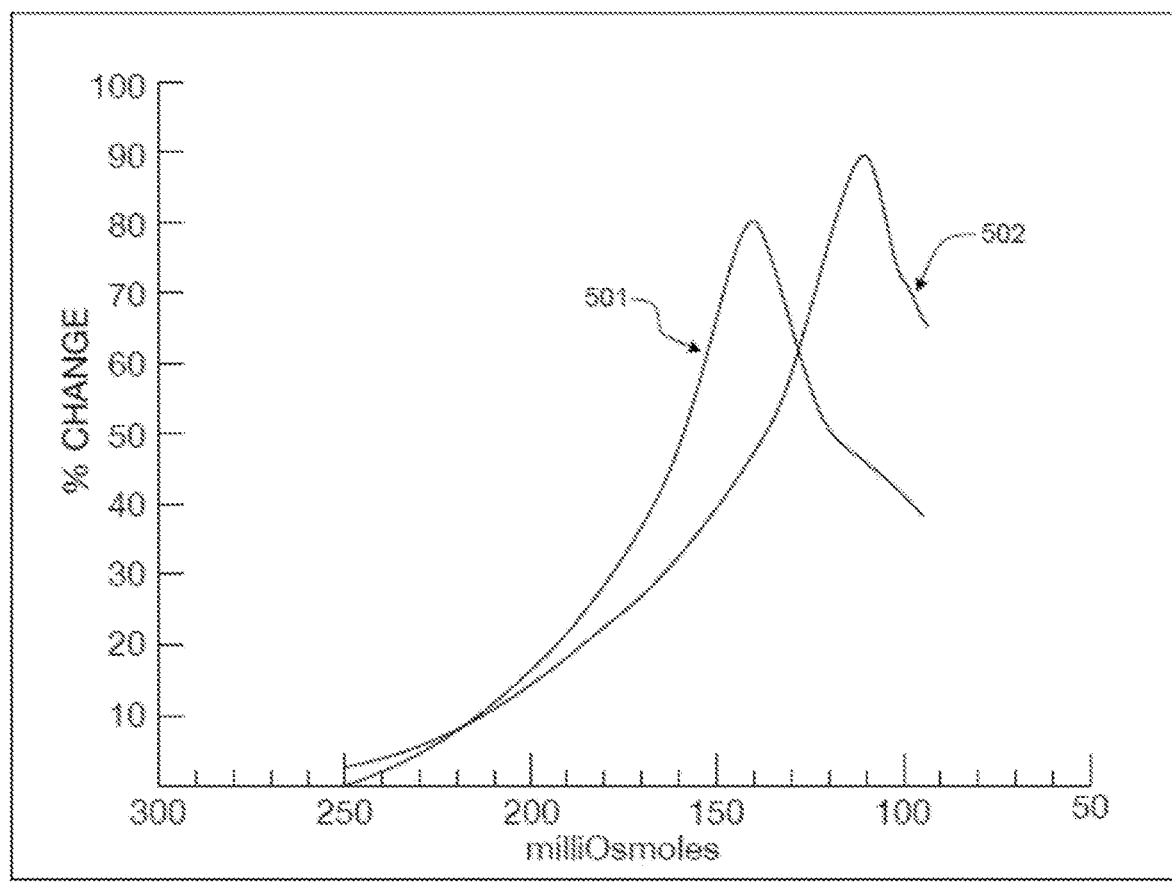
FIG. 5 is a cell scan plot from a normal healthy individual demonstrating % change in cell volume vs. osmolality before (501) and after (502) contacting a sample of RBCs with 5-HT. As can be seen in FIG. 5, Pk0 shifts approx. 30 mOsm/kg after contacting with 5-HT.

A sample of whole blood from a healthy volunteer was drawn into ACD anticoagulant. The sample was then treated with 5-HT (900 ng/mL), and cell membrane permeability was evaluated 5 minutes after treatment. As can be seen in FIG. 5, treatment with 5-HT converted the sample from normal Pk0 of approx. 140 mOsm/kg (FIG. 5, 501) to Pk0 of approx. 110 mOsm/kg (FIG. 5, 502).

Figure 6:
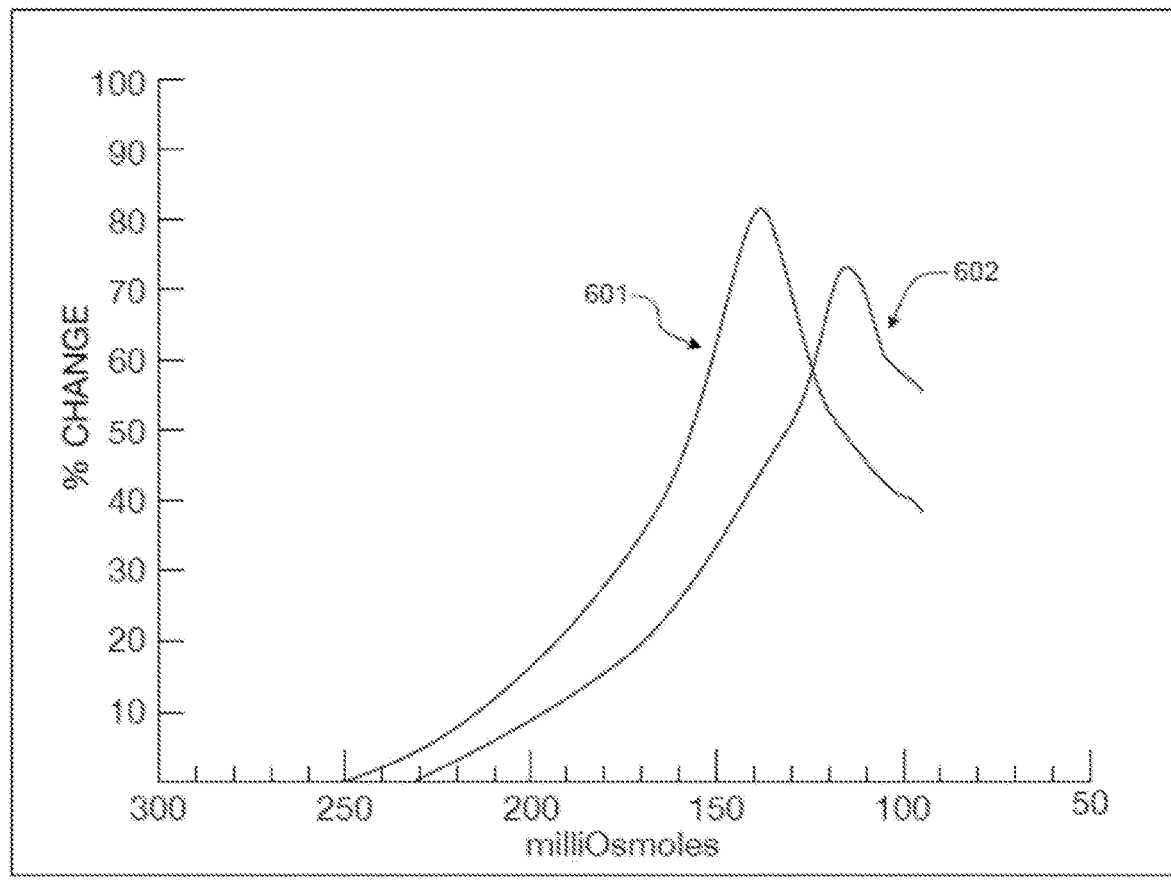
FIG. 6 is a cell scan plot from a normal healthy individual demonstrating % change in cell volume vs. osmolality before and after exposing a sample of RBCs to platelet contents produced by rupturing and centrifuging the platelets. As can be seen in FIG. 6, Pk0 before exposure to platelet supernatant was approx. 140 mOsm/kg, while Pk0 shifted to approx. 110 mOsm/kg after exposure to platelet supernatant.

Example 4. Effect of Platelet Contents on Cell Membrane Permeability of Healthy RBCs To further confirm our hypothesis that 5-HT is a naturally occurring cell membrane permeability factor, 5-HT obtained from ruptured platelets was used to induce a shift in Pk0 according to the following procedure: A sample of whole blood from a healthy volunteer was drawn into ACD anticoagulant. The blood was centrifuged at 190 g for 15 minutes at 22° C. The platelets were separated, washed and dispersed in distilled water, frozen, thawed, and centrifuged to remove the membrane. The resulting supernatant was then added to a suspension of washed RBCs, resulting in approx. 500-900 ng/mL 5-HT, and Pk0 of the RBCs was measured 5 minutes after treatment. As can be seen in FIG. 6, Pk0 before exposure to platelet supernatant was approx. 140 mOsm/kg (FIG. 6, 601), while Pk0 shifted to approx. 110 mOsm/kg after treatment with the platelet supernatant (FIG. 6, 602).

Example 5. Cellular Assay of Malaria Resistance

A sample of whole blood from a healthy volunteer is tested to confirm a normal Pk0 of approx. 140 mOsm/kg. The sample is divided into multiple aliquots, and 5-HT (e.g., 900 ng/mL 5-HT) is added to half of the samples at random in order to induce resistance to water intake. All samples are then evaluated for Pk0. A shift in Pk0 from approx. 140 mOsm/kg to approx. 110 mOsm/kg is expected in samples exposed to 5-HT. All samples are then exposed to *P. vivax, ovale, malariae*, and *falciparum* in culture. At certain time points after exposure (e.g., every day for 7 days), the cultures are inspected for malarial infection (e.g., merozoite growth). It is expected that samples that are pre-treated with 5-HT will not become infected with malaria, while those that did not receive 5-HT treatment will become infected.

Example 6. Prevention and Treatment of Malaria in Primates

Five primates are pretreated with 5-HT, and then exposed to malaria parasites. If none develop symptoms of malaria, 5-HT will be considered an effective prophylaxis for malaria.

Additionally, five primates infected with malaria are treated with 5-HT. Recovery of the primates within days and/or a negative smear confirming elimination of the parasite will be considered to show that 5-HT is an effective treatment for malaria.

Example 7. Animal Studies of RBC Membrane Permeability

Red blood cells of hundreds of species have been examined to determine their RBC membrane permeability and its relation to malarial resistance. Methods provided herein enabled reliable and convenient testing of such a large number of samples. Most reptiles, many birds, and a few mammals have cell membranes that are relatively resistant to water flow. Many species with relatively resistant cell membranes live in malarial areas or erstwhile malarial areas. Among 240 species of ungulates, including antelopes, asses, camels, cattle, chevrotains, deer, dolphins, elephants, giraffes, goats, hippos, horses, hyrax, llamas, musk deer, okapi, oxen, pigs, rhinos, whales and zebras, only camelids display water resistance, with elephants and hyraxes being moderately resistant and the remainder showing normal or reduced water resistance. Of the animals tested, those with resistant cells are found predominantly in malarial areas and/or they came from them.

Blood samples were collected from approximately 300 species and analyzed for RBC membrane permeability. Table 2 summarizes results from exemplary species in geographical areas where malaria is prevalent.

TABLE 2

| Species | Pk0 (mOsm/kg) |
| --- | --- |
| Elephant African | 105 |
| Elephant Asian | 116 |
| Heron night | 109 |
| Bustard barbary | 108 |
| Bustard cory | 100 |
| Bustard greater | 110 |
| Buzzard | 110 |
| Buzzard common | 108 |
| Emu | 101 |
| Peacock | 104 |
| Python Burmese | 104 |
| Python Indian | 99 |
| Emu | 101 |
| Pelican Eastern | 99 |
| Guanaco | 94 |
| Camel Arabian | 90 |
| Camel Bactian | 97 |
| Vicuna | 93 |
| Tortoise Spur thighed[1] | 84 |
| Tortoise Hermans | 105 |
| Hyrax Rock | 87 |
| Llama | 80 |

[1]Notably, the spur-thighed tortoise, which has one of the longest known life expectancies (over 200 years), also has one of the lowest Pk0 values of all species tested.

Table 3 summarizes results of exemplary species from areas where malaria is less prevalent.

TABLE 3

| Species | Pk0 (mOsm/kg) |
| --- | --- |
| Pudu | 235 |
| Nyala | 230 |
| Goat | 240 |
| Sheep | 220 |

Upon analyzing these data in relation to the indigenous location of each sample, it was recognized that animals indigenous to regions where malaria is prevalent exhibited lower Pk0 values (Table 2) compared to animals indigenous to regions where malaria is not prevalent (Table 3). Mean Pk0 of animals indigenous to regions where malaria is prevalent was 100.2, while mean Pk0 of animals indigenous to other regions was higher. This trend suggests that species with lower Pk0 values possess a previously unappreciated mechanism for resistance to malaria. The present disclosure encompasses this recognition, namely that vertebrates resistant to infection by the genus *Plasmodium* (e.g., mammals, birds, and squamate reptiles) have a common feature of a relatively low Pk0 (e.g., a Pk0 between about 80 mOsm/kg and about 110 mOsm/kg).

The results of these animal studies, therefore, suggest that inducing RBC membrane resistance to water (e.g., as evidenced by a lower Pk0) is a viable method of treating and/or preventing malaria.

Example 8. RBC Membrane Permeability in Hemoglobinopathies

It has been known, since as early as 1880, that subjects with certain hemoglobinopathies have RBCs that have altered functional characteristics, such as increased resistance to membrane water flow. Such subjects, however, are often relatively resistant to infection with malaria, but the mechanism of resistance remains unknown. This disclosure encompasses the recognition that these two attributes may be related, such that subjects with RBCs that are resistant to membrane water flow (e.g., those having a relatively low Pk0) are in a resistant state for malarial infection, as described herein. Using the methods provided herein, 84 heterozygotes for beta thalassemia 0 were tested and shown to have a mean Pk0 value of 117. Furthermore, such subjects often have an increase in platelet count, which is a source of 5-HT (see, e.g., Example 4), and could, without wishing to be bound by any theory, be the mechanism for the observed resistance to malaria infection.

Example 9. Susceptibility to Malaria in Pregnant Women

Using cell scanning technologies provided herein, 450 pregnant women were evaluated and determined to have an average Pk0 of 149 mOsm/kg, which is higher than the average for healthy non-pregnant individuals. As described herein, such Pk0 values suggest that pregnant women are susceptible to malarial infection. Such a hypothesis is supported by a finding of fourfold increase in incidence of malaria in pregnant women in a holoendemic region of Senegal. *Transactions of the Royal Society of Tropical Medicine and Hygiene*, Volume 91, Issue 2, March-April 1997, Pages 166-170.

Example 10. Patients with Malaria

Of 10,487 patients tested using provided cell scanning technologies, 588 patients were found to have a Pk0 value below 120 mOsm/kg. None of these 588 were diagnosed or had ever been diagnosed with malaria.

Patients with malaria were all determined to have a Pk0 of 120 mOsm/kg or greater, as summarized below:

| Pk0 (mOsm/kg) | % of Patients with Malaria | N = 15 |
| --- | --- | --- |
| 70-79 | 0 | 0 |
| 80-89 | 0 | 0 |
| 90-99 | 0 | 0 |
| 100-109 | 0 | 0 |
| 110-119 | 0 | 0 |
| 120-129 | 0.13 | 1 |
| 130-139 | 0.14 | 3 |
| 140-149 | 0.11 | 4 |
| 150-159 | 0.23 | 5 |
| >160 | 0.35 | 2 |

Fifteen patients who had been diagnosed with malaria were evaluated using provided cell scanning technologies. Pk0 values for these patients are summarized below:

| n | Pk0 |
| --- | --- |
| 1 | 140.1 |
| 2 | 136.0 |
| 3 | 151.5 |
| 4 | 153.6 |
| 5 | 181.0 |
| 6 | 155.0 |
| 7 | 157.0 |
| 8 | 164.0 |
| 9 | 142.8 |
| 10 | 131.3 |
| 11 | 159.0 |
| 12 | 130.8 |
| 13 | 146.6 |
| 14 | 143.0 |
| 15 | 122.5 |
| mean | 147.6 |
| SD | 14.9 |

APPENDIX A: CERTAIN ASPECTS OF WO 97/24598

The WO 97/24598 disclosure provides a new method in which a sample of cells suspended in a liquid medium, wherein the cells have at least one measurable property distinct from that of the liquid medium, is subjected to analysis to determine a measure of cell permeability of the sample of cells by a method including the steps:
  (a) passing a first aliquot of the sample cell suspension through a sensor,
  (b) measuring said at least one property of the cell suspension,
  (c) recording the measurement of said property for the first aliquot of cells,
  (d) subjecting a second aliquot of the sample cell suspension to an alteration in at least one parameter of the cell environment which has the potential to induce a flow of fluid across the cell membranes and thereby alter the said at least one property of the cells,
  (e) passing said second aliquot through a sensor,
  (f) measuring said at least one property of the cell suspension under the altered environment,
  (g) recording the measurement of said at least one property for the second aliquot of cells,
  (h) comparing the data from steps (c) and (g) as a function of the extent of said alteration of said parameter of the cell environment and change in the recorded measurements of said at least one property to determine a measure of cell permeability of the sample.

Preferably, the property of the cells which differs from the liquid medium is one which is directly related to the volume of the cell. Such a property is electrical resistance or impedance which may be measured using conventional particle counters such as the commercially available instrument sold under the trade name Coulter Counter by Coulter Instruments Inc. Preferably, the sensor used to detect cells and measure a change in the cells' property is that described in WO 97/24600. In this apparatus the cell suspension is caused to flow through an aperture where it distorts an electrical field. The response of the electrical field to the passage of the cells is recorded as a series of voltage pulses, the amplitude of each pulse being proportional to cell size.

In the preferred method of the WO 97/24598 disclosure, a measurement of cell permeability is determined by obtaining a measure of the volume of fluid which crosses a sample cell membrane in response to an altered environment. The environmental parameter which is changed in the method may be any change which results in a measurable property of the cells being altered. Preferably, a lytic agent is used to drive fluid across the cell membranes and thereby cause a change in cell volume. Preferably therefore, the environmental parameter change is an alteration in osmolality, most preferably a reduction in osmolality. Typically, the environment of the first aliquot is isotonic and thus the environment of the second aliquot is rendered hypotonic. Other suitable lytic agents include soap, alcohols, poisons, salts, and an applied shear stress.

It is possible to subject only a single aliquot of sample suspension to one or more alterations in osmolality to achieve this effect, although is preferred to use two or more different aliquots of the same sample suspension. Most preferably, the sample suspension is subjected to a continuous osmotic gradient, and in particular an osmotic gradient generated in accordance with the method of WO 97/24599.

In the preferred method of WO 97/24601, a number of measurements of particular cell parameters are made over a continuous series of osmolarities, including cell volume and cell surface area, which takes account of the deviation of the cells from spherical shape particles commonly used to calibrate the instruments. An estimate of in vivo cell shape made so that an accurate measurement of cell volume and cell surface area at all shapes is obtained. A sample suspension is fed continuously into a solution the osmolality of which is changed continuously to produce a continuous concentration gradient. Reducing the osmolality of the solution surrounding a red blood cell below a critical level causes the cell first to swell, then rupture, forming a ghost cell which slowly releases its contents, almost entirely hemoglobin, into the surrounding medium. The surface area of each cell remains virtually unchanged on an increase in cell volume due to a reduction in osmolality of the cell's environment as the cell membrane is substantially inelastic. The time between initiation of the alteration of the environment in each aliquot to the passage of the cells through the sensing zone is kept constant so that time is not a factor in any calculation in cell permeability. An effect of feeding the sample under test into a continuously changing osmolality gradient, is to obtain measurements which are equivalent to treating one particular cell sample with that continuously changing gradient.

Preferably, the measurements are recorded on a cell-by-cell basis in accordance with the method of WO 97/24601. The number of blood cells within each aliquot which are counted is typically at least 1000 and the cell-by-cell data is then used to produce an exact frequency distribution of cell permeability. Suitably this density can be displayed more visibly by using different colors to give a three-dimensional effect (e.g., showing size vs. number vs. osmotic pressure), similar to that seen in radar rainfall pictures used in weather forecasting. Alternatively, for a single solution of any tonicity, the measured parameter change could be displayed against a number of individual cells showing the same change. In this way a distribution of cell permeability in a tonicity of given osmolality can be obtained.

As discussed above, the methods in WO 97/24601 can provide an accurate estimate of cell volume, or other cell parameter related to cell volume, and cell surface area over a continuous osmotic gradient for individual cells in a sample. A plot of change in cell volume against osmolality reveals a characteristic curve showing how the cell volume changes with decreasing osmolality and indicates maximum and minimum rates of flow across the membrane and the flow rates attributed to a particular or series of osmotic pressures.

Having obtained measures of osmotic pressure ($P_{osm}$), cell volume, surface area (SA) and other relevant environmental factors, it is possible to obtain a number of measures of cell permeability:

1) Cp Rate

This coefficient of permeability measures the rate of fluid flow across a square meter of membrane in response to a specified pressure. All positive rates represent a net flow into the cell, while all negative rates are the equivalent of a net flow out of the cell. The rate is determined by:

$$Cp \text{ rate} = \Delta \text{ cell volume}/\Delta P_{osm}/SA \text{ at S.T.P.}$$

2) Permeability Constant $pk_n$.

This set of permeability measures describe each pressure where the net permeability rate is zero, and are numbered $pk_0, pk_1 \ldots pk_n$.

(i) $pk_0$ coincides with the minimum absolute pressure (hypotonic) to which a cell can be subjected without loss of integrity. A pressure change of one tenth of a milliosmole per kg (0.0001 atms) at $pk_0$ produces a change in permeability of between one and two orders of magnitude making $pk_0$ a distinct, highly reproducible measure.

(ii) $pk_1$ is a measure of the cells' ability to volumetrically regulate in slightly hypotonic pressures. After a certain pressure, the cell can no longer defeat the osmotic force, resulting in a change in the cell's volume. $pk_1$ provides a measure of the cells ability to perform this regulation, thereby measuring a cell's maximum pump transfer capability.

(iii) $pk_2$, a corollary of $pk_1$ is a measure of the cells ability to volumetrically regulate in hypertonic pressures, and occurs at low differential pressures, when compared to the cell's typical in vivo hydrostatic pressure.

The permeability constant $pk_n$ is described by the following equation:

$$pk_n = \Delta P_{osm}/SA \text{ at S.T.P.}$$

When calculating $pk_0$, $\Delta P_{osm}$=(isotonic pressure)−(pressure where net flow is zero); when calculating $pk_1$, $\Delta P_{osm}$= (isotonic pressure)−(first hypotonic pressure where net positive flow begins). The calculation of $pk_2$ is identical to $pk_1$ except $\Delta P_{osm}$ measures the first hypertonic pressure where net positive flow is not zero.

3) CPΔ

This dimensionless value is the comparison of any two Cp rates, and is expressed as the net amount of fluid to cross the cell membrane between any two lytic concentrations. It provides a volume independent and pressure dependent comparison of permeability rates. This measure may be used to compare permeability changes in the same individual over a period ranging from minutes to months.

4) $Cp_{max}$

This is the maximum rate of flow across the cell's membrane. For almost all cells, there are two maxima, one positive (net flow into the cell) and one negative (net flow out of the cell) situated either side of $pk_0$. $Cp_{max}$ is determined by detecting the maximum positive and negative gradients of the continuous curve of change in cell volume against osmolality.

5) Membrane Structural Resistance (MSR)

This is a measure of the structural forces inside a cell which resist the in-flow or out-flow of water. It is determined by the ratio of $Cp_{max}$ to all other non-zero flow rates into the cell. As the membrane is theoretically equally permeable at all pressures, change from the maximum flow rate outside the pressure range of $pk_1$ to $pk_2$ are due to mechanical forces. It is clear that $pk_0$ is an entirely mechanical limit on the cell because as $Cp_{rate}$ approaches zero, MSR approaches ∞, thereby producing more strain than the membrane can tolerate.

$$MSR = Cp_{MX}/Cp_{rate} \times 100\%$$

6) Cpml

This is a measure of the physiological permeability available to an individual per unit volume of tissue or blood, or for the whole organ or total body, and is calculated by:

$$Cpml = \Delta \text{ cell volume}/\Delta P_{osm}/m^3 \text{ per ml of whole blood}$$

7) $Cp_{net}$ $Cp_{net}$ is defined as the rate at which fluid can be forced across a unit area of membrane at standard temperature and pressure over unit time and is a pressure independent measure of the coefficient of permeability, given by the equation:

$$CP_{net} = \frac{(\text{Volume}_{sph} - \text{Volume}_{iso})}{SA}$$

Figure 7:
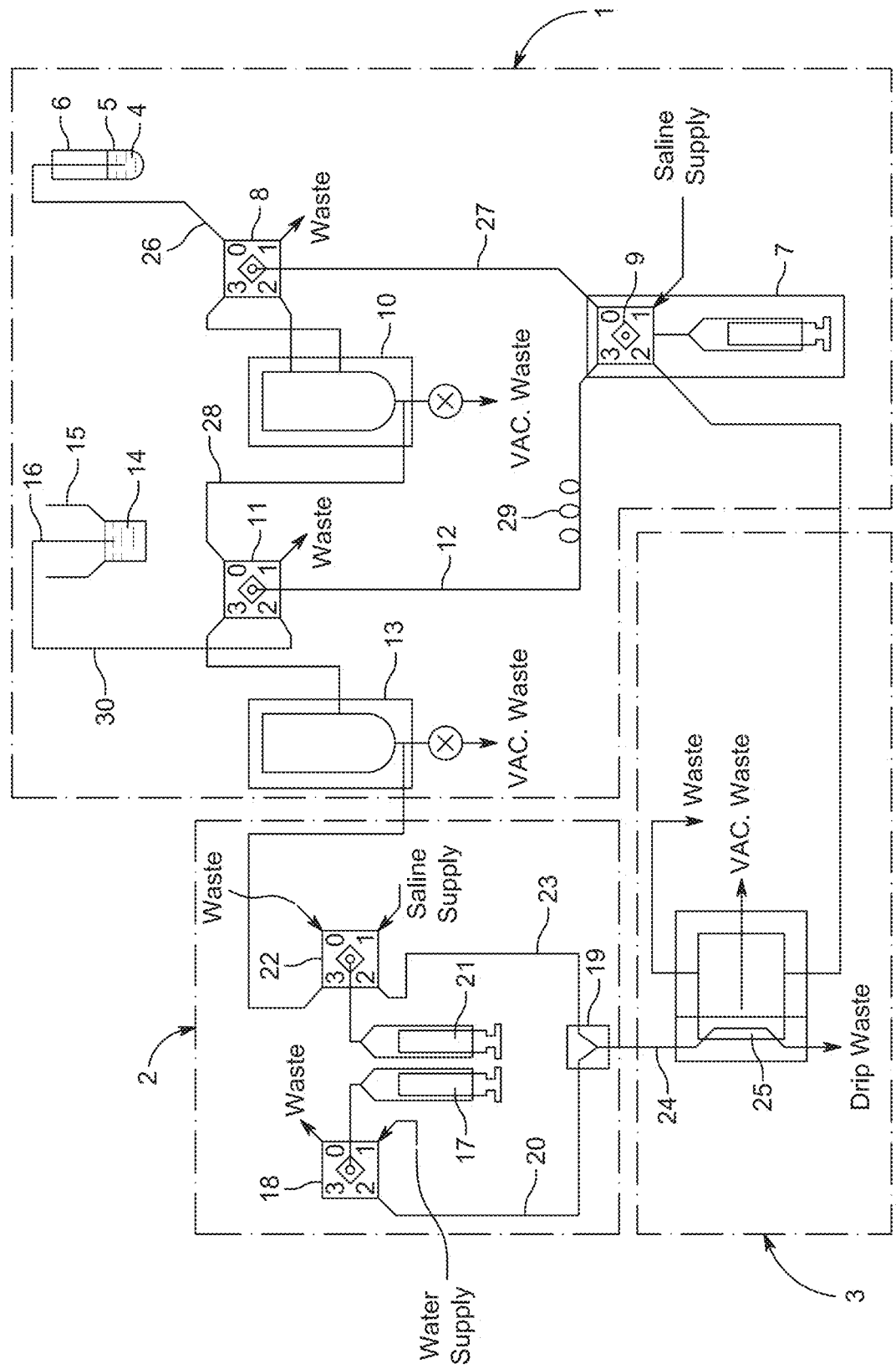
FIG. 7 shows schematically an instrument used to sample and test blood cells.

FIG. 7 shows schematically the arrangement of a blood sampler for use in the method of the WO 97/24598 disclosure. The blood sampler comprises a sample preparation section 1, a gradient generator section 2 and a sensor section 3.

A whole blood sample 4 contained in a sample container 5 acts as a sample reservoir for a sample probe 6. The sample probe 6 is connected along PTFE fluid line 26 to a diluter pump 7 via multi-position distribution valve 8 and multi-position distribution valve 9. The diluter pump 7 draws saline solution from a reservoir (not shown) via port #1 of the multi-position distribution valve 9. As will be explained in detail below, the diluter pump 7 is controlled to discharge a sample of blood together with a volume of saline into a first well 10 as part of a first dilution step in the sampling process.

In a second dilution step, the diluter pump 7 draws a dilute sample of blood from the first well 10 via multi-position distribution valve 11 into PTFE fluid line 12 and discharges this sample together with an additional volume of saline into a second well 13. The second well 13 provides the dilute sample source for the gradient generator section 2 described in detail below.

Instead of using whole blood, a pre-diluted sample of blood 14 in a sample container 15 may be used. In this case, a sample probe 16 is connected along PTFE fluid line 30, multi-position distribution valve 11, PTFE fluid line 12 and multi-position distribution value 9 to the diluter pump 7. In a second dilution step, the diluter pump 7 draws a volume of the pre-diluted sample 14 from the sample container 15 via fluid line 30 and multi-position distribution value 11 into fluid line 12 and discharges the sample together with an additional volume of saline into the second well 13 to provide the dilute sample source for the gradient generator section 2.

The gradient generator section 2 comprises a first fluid delivery syringe 17 which draws water from a supply via multi-position distribution valve 18 and discharges water to a mixing chamber 19 along PTFE fluid line 20. The gradient generator section 2 also comprises a second fluid delivery syringe 21 which draws the diluted sample of blood from the second well 13 in the sample preparation section 1 via multi-position distribution valve 22 and discharges this to the mixing chamber 19 along PTFE fluid line 23 where it is mixed with the water from the first fluid delivery syringe 17. As will be explained in detail below, the rate of discharge of water from the first fluid delivery syringe 17 and the rate of discharge of dilute blood sample from the second fluid delivery syringe 21 to the mixing chamber is controlled to produce a predetermined concentration profile of the sample suspension which exits the mixing chamber 19 along PTFE fluid line 24. Fluid line 24 is typically up to 3 metres long. A suitable gradient generator is described in detail in the Applicant's WO 97/24529.

As will also be explained in detail below, the sample suspension exits the mixing chamber 19 along fluid line 24 and enters the sensor section 3 where it passes a sensing zone 25 which detects individual cells of the sample suspension before the sample is disposed of via a number of waste outlets.

In a routine test, the entire system is first flushed and primed with saline, as appropriate, to clean the instrument, remove pockets of air and debris, and reduce carry-over.

The diluter pump 7 comprises a fluid delivery syringe driven by a stepper motor (not shown) and is typically arranged initially to draw 5 to 10 ml of saline from a saline reservoir (not shown) via port #1 of multi-position distribution valve 9 into the syringe body. A suitable fluid delivery syringe and stepper motor arrangement is described in detail in the Applicant's WO 97/24599. Port #1 of the multi-position distribution valve 9 is then closed and port #0 of both multi-position distribution valve 9 and multi-position distribution valve 8 are opened. Typically 100 µl of whole blood is then drawn from the sample container 5 to take up the dead space in the fluid line 26. Port #0 of multi-position distribution valve 8 is then closed and any blood from the whole blood sample 4 which has been drawn into a fluid line 27 is discharged by the diluter pump 7 to waste via port #1 of multi-position distribution valve 8.

In a first dilution step, port #0 of multi-position distribution value 8 is opened and the diluter pump 7 draws a known volume of whole blood, typically 1 to 20 µl, into PTFE fluid line 27. Port #0 is then closed, port #2 opened and the diluter pump 7 discharges the blood sample in fluid line 27 together with a known volume of saline in fluid line 27, typically 0.1 to 2 ml, into the first well 10. Port #2 of multi-position distribution value 8 and port #0 of multi-position distribution value 9 are then closed.

Following this, port #0 of multi-position distribution valve 11 and port #3 of multi-position distribution valve 9 are opened to allow the diluter pump 7 to draw the first sample dilution held in the first well 10 to take up the dead space in PTFE fluid line 28. Port #0 of multi-position distribution valve 11 is then closed and port #1 opened to allow the diluter pump 7 to discharge any of the first sample dilution which has been drawn into fluid line 12 to waste via port #1.

In a second dilution step, port #0 of multi-position distribution valve 11 is re-opened and the diluter pump 7 draws a known volume, typically 1 to 20 µl, of the first sample dilution into fluid line 12. Fluid line 12 includes a delay coil 29 which provides a reservoir to prevent the sample contaminating the diluter pump 7. Port #0 of multi-position distribution valve 11 is then closed, port #3 opened, and the diluter pump 7 then discharges the first sample dilution in fluid line 12, together with a known volume of saline, typically 0.1 to 20 ml, into the second well 13. Port #3 of multi-position distribution valve 11 is then closed. At this stage, the whole blood sample has been diluted by a ratio of typically 10000:1. As will be explained below, the instrument is arranged automatically to control the second dilution step to vary the dilution of the sample suspension to achieve a predetermined cell count to within a predetermined tolerance at the start of a test routine.

In the gradient generator section 2, the first fluid delivery syringe 17 is primed with water from a water reservoir. Port #3 of multi-position distribution valve 22 is opened and the second fluid delivery syringe draws a volume of the dilute blood sample from the second well 13 into the syringe body. Port #3 of multi-position distribution valve 22 is then closed and port #2 of both multi-position distribution valve 18 and multi-position distribution valve 22 are opened prior to the controlled discharge of water and dilute blood sample simultaneously into the mixing chamber 19.

Figure 8:
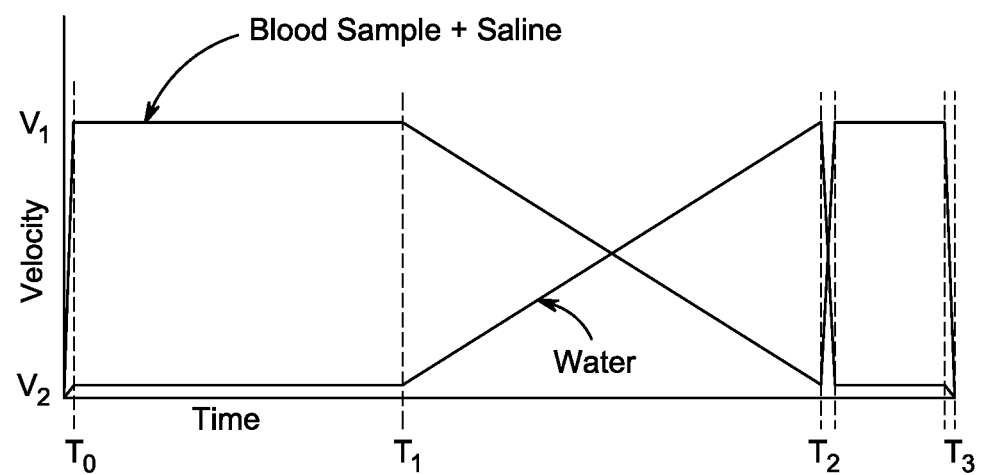
FIG. 8 shows velocity profiles for the discharge of fluids from fluid delivery syringes of a gradient generator section of the instrument of FIG. 7.

FIG. 8 shows how the velocity of the fluid discharged from each of the first and second fluid delivery syringes is varied with time to achieve a predetermined continuous gradient of osmolality of the sample suspension exiting the mixing chamber 19 along fluid line 24. The flow rate of the sample suspension is typically in the region of 200 µl s$^{-1}$ which is maintained constant whilst measurements are being made. This feature is described in detail in the Applicant's WO 97/24529. As shown in FIG. 2, a cam profile associated with a cam which drives fluid delivery syringe 21 accelerates the syringe plunger to discharge the sample at a velocity $V_1$, whilst a cam profile associated with a cam which drives fluid delivery syringe 17 accelerates the associated syringe plunger to discharge fluid at a lower velocity $V_2$. Once a constant flow rate from each delivery syringe has been established at time $T_0$, at time $T_1$ the cam profile associated with fluid delivery syringe 21 causes the rate of sample discharge to decelerate linearly over the period $T_2$-$T_1$, to a velocity $V_2$, while simultaneously, the cam profile associated with fluid delivery syringe 17 causes the rate of fluid discharge to accelerate linearly to velocity $V_1$. During this period, the combined flow rate of the two syringes remains substantially constant at around 200 µl s$^{-1}$. Finally, the two syringes are flushed over the period $T_3$-$T_2$.

Once both the first fluid delivery syringe 17 and the second fluid delivery syringe 21 have discharged their contents, the first delivery syringe is refilled with water in preparation for the next test. If a blood sample from a different subject is to be used, the second fluid delivery syringe 21 is flushed with saline from a saline supply via port #1 of multi-position distribution valve 22 to clean the contaminated body of the syringe.

The sample suspension which exits the mixing chamber 19 passes along fluid line 24 to the sensor section 3. A suitable sensor section is described in detail in the Applicant's WO 97/24600. The sample suspension passes to a sensing zone 25 comprising an electrical field generated adjacent an aperture through which the individual cells of the sample suspension must pass. As individual blood cells of the sample suspension pass through the aperture the response of the electrical field to the electrical resistance of each individual cell is recorded as a voltage pulse. The amplitude of each voltage pulse together with the total number of voltage pulses for a particular interrupt period, typically 0.2 seconds, is also recorded and stored for subsequent analysis including a comparison with the osmolality of the sample suspension at that instant which is measured simultaneously. The osmolality of the sample suspension may also be determined without measurement from a knowledge of the predetermined continuous osmotic gradient generated by the gradient generator section 2. As described below, the osmolality (pressure) is not required to determine the cell parameters.

Figure 9:
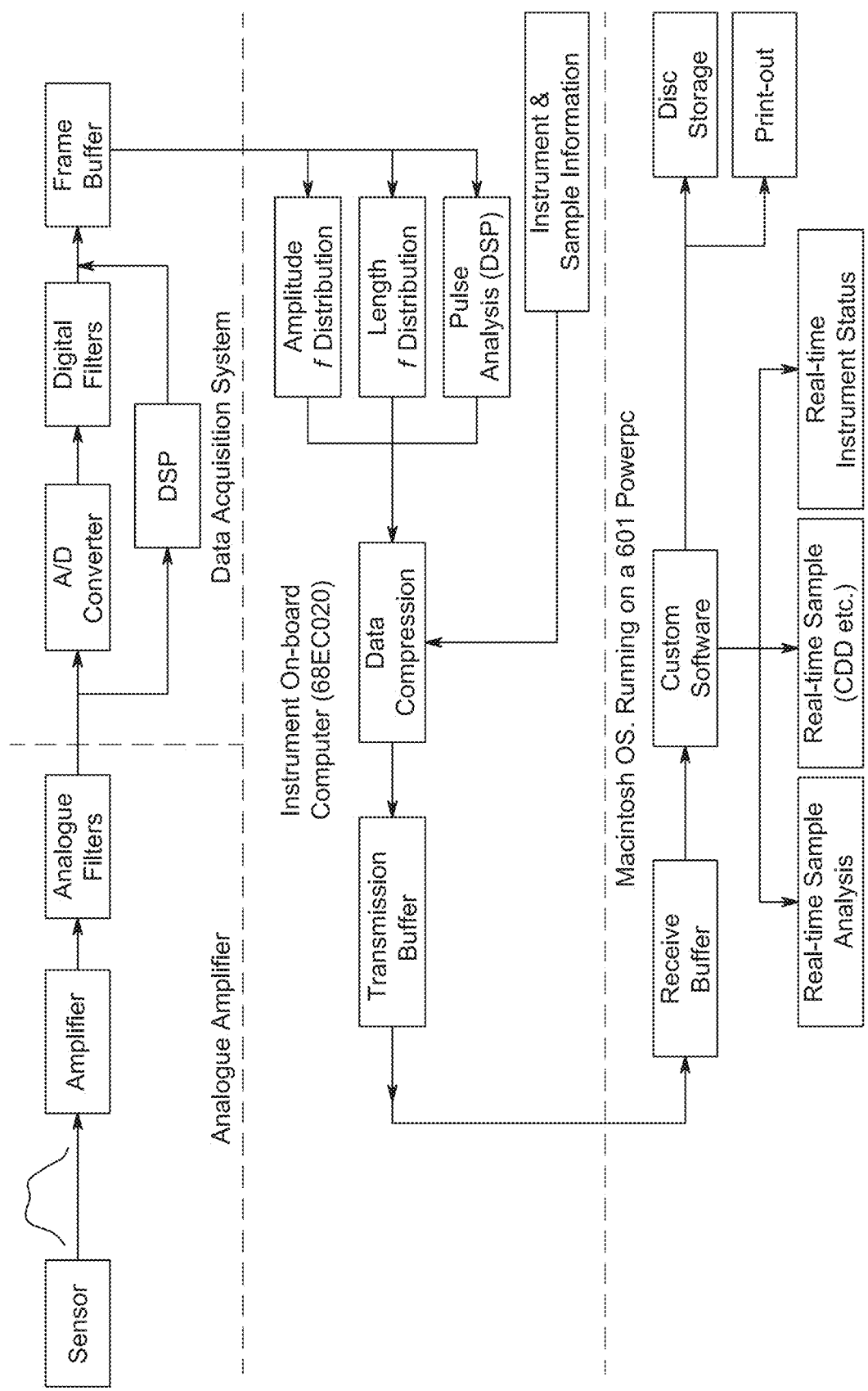
FIG. 9 shows a block diagram illustrating the data processing steps used in the instrument of FIG. 7.

FIG. 9 shows how data is collected and processed. Inside each instrument is a main microprocessor which is responsible for supervising and controlling the instrument, with dedicated hardware or low-cost embedded controllers responsible for specific jobs within the instrument, such as operating diluters, valves, and stepper motors or digitizing and transferring a pulse to buffer memory. The software which runs the instrument is written in C and assembly code and is slightly less than 32 K long.

When a sample is being tested, the amplitude and length of each voltage pulse produced by the sensor is digitized to 12-bit precision and stored in one of two buffers, along with the sum of the amplitudes, the sum of the lengths, and the number of pulses tested. Whilst the instrument is collecting data for the sensors, one buffer is filled with the digitized values while the main microprocessor empties and processes the full buffer. This processing consists of filtering out unwanted pulses, analyzing the data to alter the control of the instrument and finally compressing the data before it is sent to the personal computer for complex analysis.

Optional processing performed by the instrument includes digital signal processing of each sensor pulse so as to improve filtering, improve the accuracy of the peak detection and to provide more information about the shape and size of the pulses. Such digital signal processing produces about 25 16-bit values per cell, generating about 25 megabytes of data per test.

Data processing in the personal computer consists of a custom 400K program written in C and Pascal. The PC displays and analyses the data in real time, controls the user interface (windows, menus, etc.) and stores and prints each sample.

The software also maintains a database of every sample tested enabling rapid comparison of any sample which has been previously tested. Additionally, the software monitors the instrument's operation to detect malfunctions and errors, such as low fluid levels, system crashes or the user forgetting to turn the instrument on.

Figure 10:
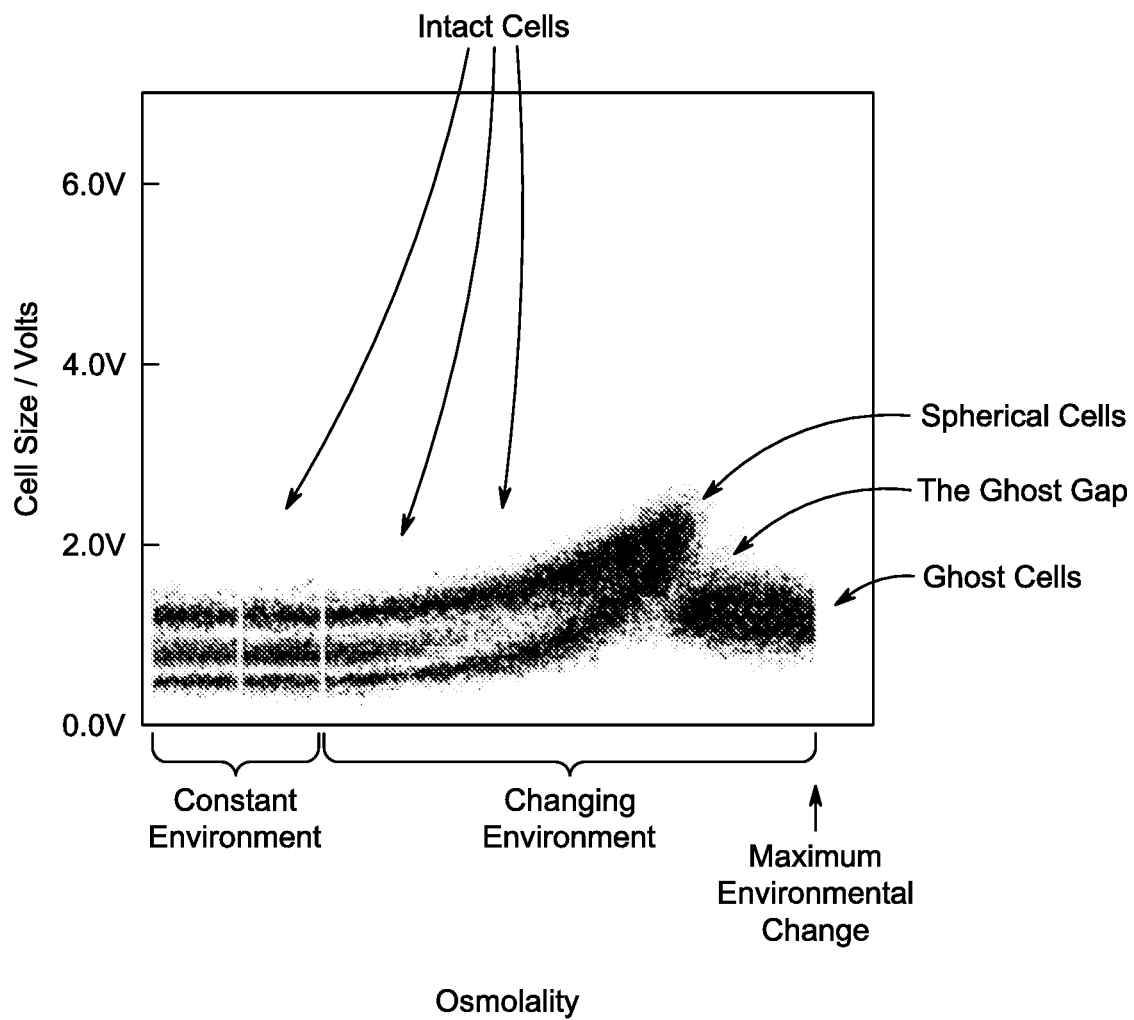
FIG. 10 shows an example of a three-dimensional plot of osmolality against measured voltage for cells of a blood sample analyzed in accordance with the WO 97/24598 disclosure.
Figure 11:
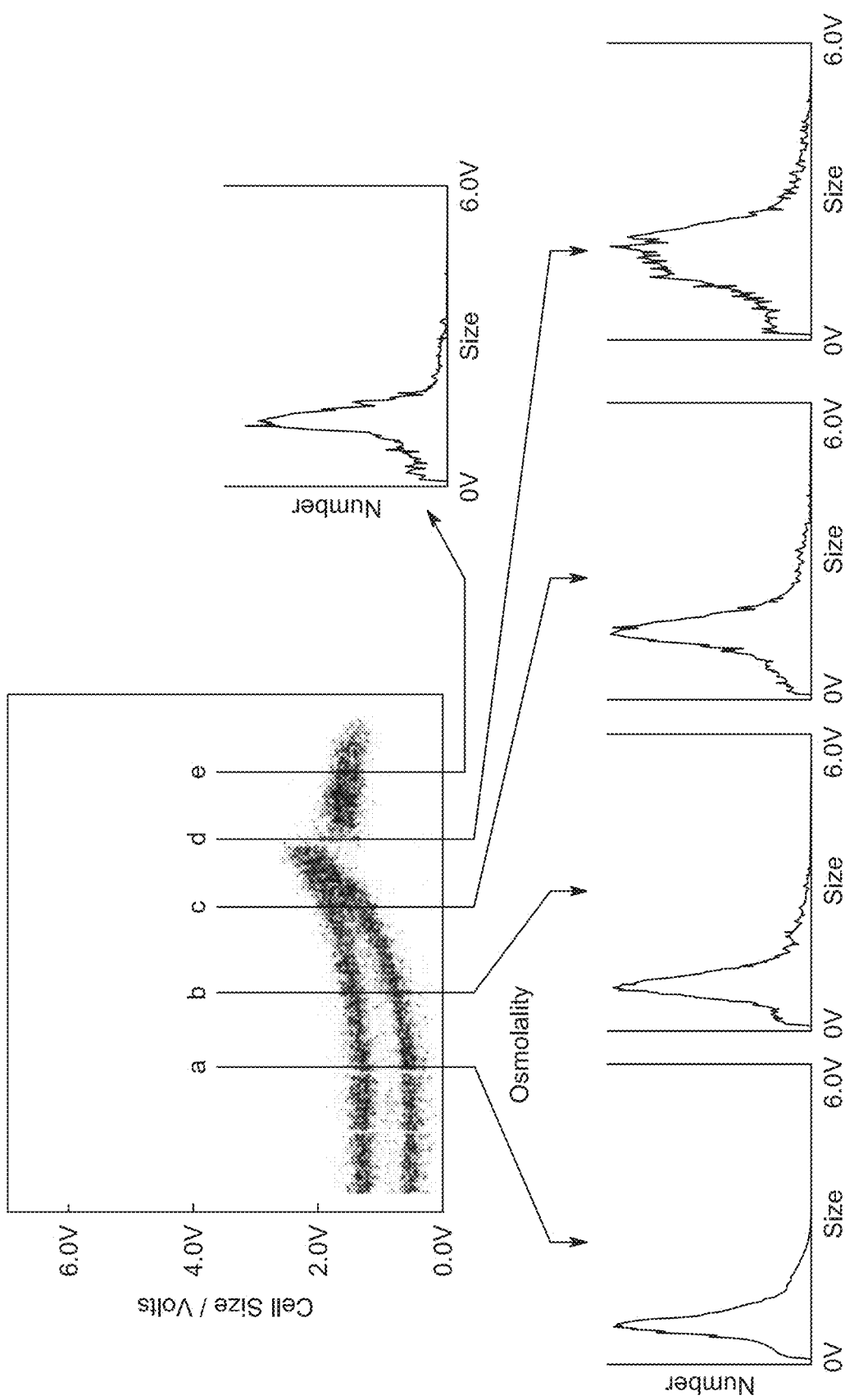
FIG. 11 shows another example of a three-dimensional plot of osmolality against measured voltage which illustrates the frequency distribution of blood cells at intervals.

The voltage pulse generated by each cell of the sample suspension as it passes through the aperture of sensing zone 25 is displayed in graphical form on a VDU of a PC as a plot of osmolality against measured voltage. The sample suspension passes through the sensor section at a rate of 200 µl s$^{-1}$. The second dilution step is controlled to achieve an initial cell count of around 5000 cells per second, measured at the start of any test, so that in an interrupt period of 0.20 seconds, around 1000 cells are detected and measured. This is achieved by varying automatically the volume of saline discharged by the diluter pump 7 from the fluid line 12 in the second dilution step. Over a test period of 40 seconds, a total of 200 interrupt periods occur and this can be displayed as a continuous curve in a three-dimensional form to illustrate the frequency distribution of measured voltage at any particular osmolality, an example of which is shown in FIG. 10 and FIG. 11.

The measured cell voltage, stored and retrieved on an individual cell basis is shown displayed on a plot of voltage against the osmolality of the solution causing that voltage change. Using individual dots to display the measured parameter change for each individual cell results in a display whereby the distribution of cells by voltage, and thereby by volume, in the population is shown for the whole range of solutions covered by the osmolality gradient. The total effect is a three-dimensional display shown as a measured property change in terms of the amplitude of the measured voltage pulses against altered parameter, in this case the osmolality of the solution, to which the cells have been subjected and the distribution or density of the cells of particular sizes within the population subjected to the particular osmolality. The effect is to produce a display analogous to a contour map, which can be intensified by using color to indicate the areas of greatest intensity.

When full data is available on the distribution of cell size in a particular population of cells subjected to hemolytic shock in a wide range of hypotonic solutions, at osmolarities just below a critical osmolality causing lysis, a gap in the populations is visible. As shown in FIG. 10, ghost cells are fully visible or identifiable in the three-dimensional plot and the unruptured cells are clearly identifiable, but between them is a region defined by osmolality and cell volume where relatively few individuals appear. The existence of this phenomenon, which we have termed the "ghost gap", has not previously been recognized.

If the entire series of steps are repeated at timed intervals on further aliquots of the original sample and the resulting measured voltage is plotted against osmolality, time and frequency distribution, a four-dimensional display, is obtained which may be likened to a change in weather map. This moving three-dimensional display, its motion in time being the fourth dimension, provides an additional pattern characteristic of a particular blood sample. This is shown in the series of images in FIG. 12. The images shown in FIG. 12 are the results of tests carried out at hourly intervals at a temperature of 37° C. As the measurements are so exact, the repeat values are superimposable using computer sequencing techniques.

As shown, cells slowly lose their ability to function over time, but they also change in unexpected ways. The size and shape of the cells in a blood sample change in a complex, non-linear but repeatable way, repeating some of the characteristic patterns over the course of days and on successive testing. The patterns, emerging over time, show similarity among like samples and often show a characteristic wave motion. The pattern of change may vary between individuals reflecting the health of the individual, or the pattern may vary within a sample. Thus a sample that is homogeneous when first tested may split into two or several sub-populations which change with time and their existence can be detected by subjecting the sample to a wide range of different tonicities and recording the voltage pulse in the way described. As shown in FIG. 12, after the first few hours the cell becomes increasingly spherical in the original sample, it then becomes flatter for several hours, then more spherical again, reaches a limit, and then becomes thinner and finally may swell again. It has been determined that the rate at which observed changes take place are influenced by pH, temperature, available energy and other factors.

The three-dimensional pattern provides data which enables identification of the precise osmolality at which particular cells reach their maximum volume, when they become spheres. With appropriate calibration, which is described in detail below, and using the magnitude of the voltage pulse, it is possible to define precisely and accurately the actual volume of such cells and thereafter derive a number of other cell parameters of clinical interest.

The amplitude of the voltage pulses produced by the sensor 25 as individual cells pass through the electrical field are proportional to the volume of each cell. However, before a conversion can be performed to provide a measure of cell volume, the instrument requires calibration. This is performed using spherical latex particles of known volume and by comparison with cell volumes determined using conventional techniques.

Experimental results have shown that the mapping of measured voltage to spherical volume of commercially available latex particles is a linear function. Accordingly, only a single size of spherical latex particles needs to be used to determine the correct conversion factor. In a first calibration step, a sample containing latex particles manufactured by Bangs Laboratories Inc. having a diameter of 5.06 μm i.e. a volume of 67.834 m³, was sampled by the instrument. In this particular test, the instrument produced a mean voltage of 691.97 mV. The spherical volume is given by the equation:

Spherical volume=measured voltage×$K_{volts}$ where $K_{volts}$ is the voltage conversion factor.

Re-arranging this equation gives:

$$K_{volts} = \frac{\text{spherical volume}}{\text{measured voltage}}$$

which in this case gives, $$K_{volts} = \frac{67.834}{691.97} = 0.0980$$

This value of $K_{volts}$ is only valid for the particular instrument tested and is stored in a memory within the instrument.

In a second calibration step, a shape correction factor is determined to take account of the fact that the average blood cell in the average individual has a bi-concave shape. Applying the above voltage conversion factor $K_{volts}$ assumes that, like the latex particles, blood cells are spherical and would therefore give an incorrect cell volume for cell shapes other than spherical. In the WO 97/24598 disclosure, a variable shape correction function is determined so that the mean volume of the blood cells at any osmolality up to the critical osmolality causing lysis can be calculated extremely accurately.

Figure 13:
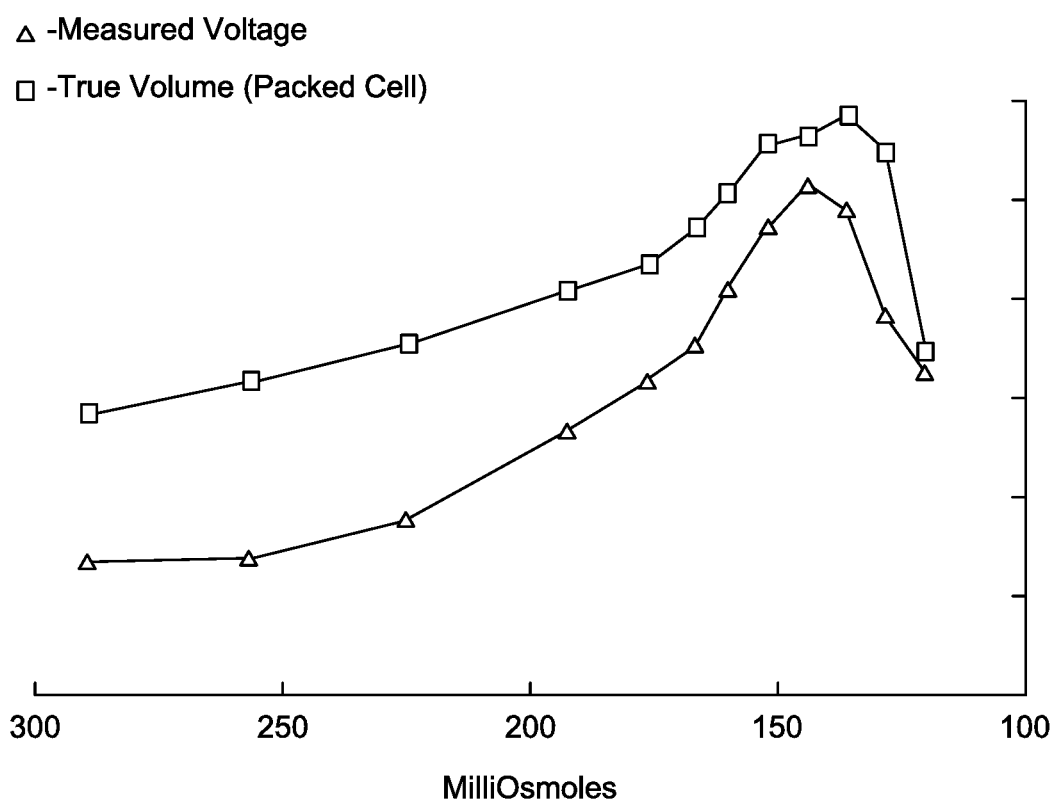
FIG. 13 shows superimposed plots of osmolality (x-axis) against measured voltage and true volume, respectively.

To illustrate this, a sample was tested at a number of accurately known osmolarities and the volume of the blood cells measured using a standard reference method, packed cell volume. A portion of the same sample was also tested by the method of the present invention using the instrument of FIG. 7 to measure the voltage pulses from individual cells at the corresponding osmolarities. The results of these procedures are plotted as two superimposed graphs of osmolality (x-axis) against measured voltage and true volume, respectively, in FIG. 13.

At an isotonic osmolality of 290 mOsm, the true volume, as determined by the packed cell volume technique, was 92.0 fL, whilst the measured mean voltage was 670 mV. The true isotonic volume of the cells is given by equation:

Volume$_{iso}$=Voltage$_{iso}$×$K_{volts}$×$K_{shape}$ where Voltage$_{iso}$ is the measured voltage and $K_{shape}$ is a shape correction factor.

Re-arranging:

$$K_{shape} = \frac{\text{Volume}_{iso}}{\text{Voltage}_{iso} \times K_{volts}}$$

which in this example gives, $$K_{shape} = \frac{92.0}{670 \times 0.0980} = 1.4$$

The shape correction factor $K_{shape}$ for each of the aliquots is different with the maximum shape correction being applied at isotonic osmolarities where the blood cells are bi-concave rather than spherical. To automate the calculation of $K_{shape}$ at any osmolality of interest a shape correction function is required. The following general function describes a shape correction factor based on any two sensor readings i.e. measured voltages:

$f(K_{shape})=f(SR1, SR2)$ where SR1 is a sensor reading (measured voltage) at a known shape, typically spherical, and SR2 is a sensor reading (measured voltage) at an osmolality of interest, typically isotonic.

Analysis has shown that this is a linear function and that:

$$f(K_{shape}) = 1 + \left[\frac{(SR1 - SR2)}{(SR1)}\right] \times K_a$$

where $K_a$ is an apparatus dependent constant, which is determined as follows:

$K_{shape}$ at an osmolality of 290 mOsm is known (see above), applying the values SR1=1432 mV, SR2=670 mV and $K_{shape}$=1.4 to the above equation gives:

$$1.4 = 1 + \left[\frac{(1432 - 670)}{1432}\right] \times K_a$$

rearranging:

$K_a = 0.7518$

This value of $K_a$ is constant for this instrument.

The true isotonic volume of a blood sample is determined by comparing the measured voltage at an isotonic volume of interest with the measured voltage of cells of the same blood sample at some known or identifiable shape, most conveniently cells which have adopted a spherical shape, whereby:

$$\text{Volume}_{iso} = \text{Voltage}_{iso} \times K_{volts} \times f(K_{shape})$$

$$= SR2 \times 0.0980 \times \left[1 + \left[\frac{(SR1 - SR2)}{SR1}\right] \times 0.7518\right]$$

Figure 14A:
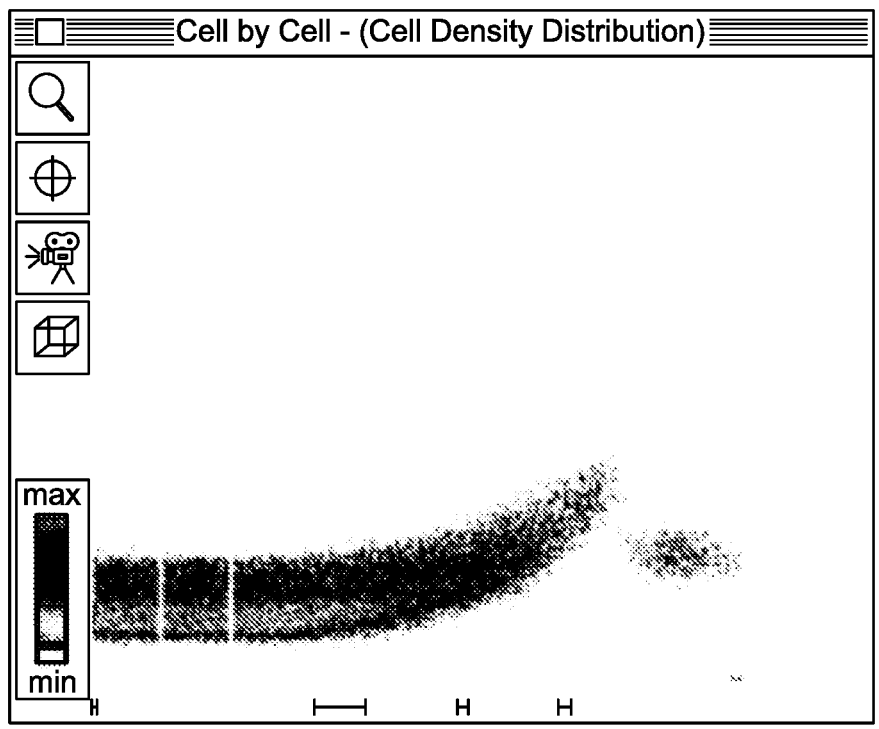
FIGS. 14A-14D show the results for a blood sample.
Figure 14B:
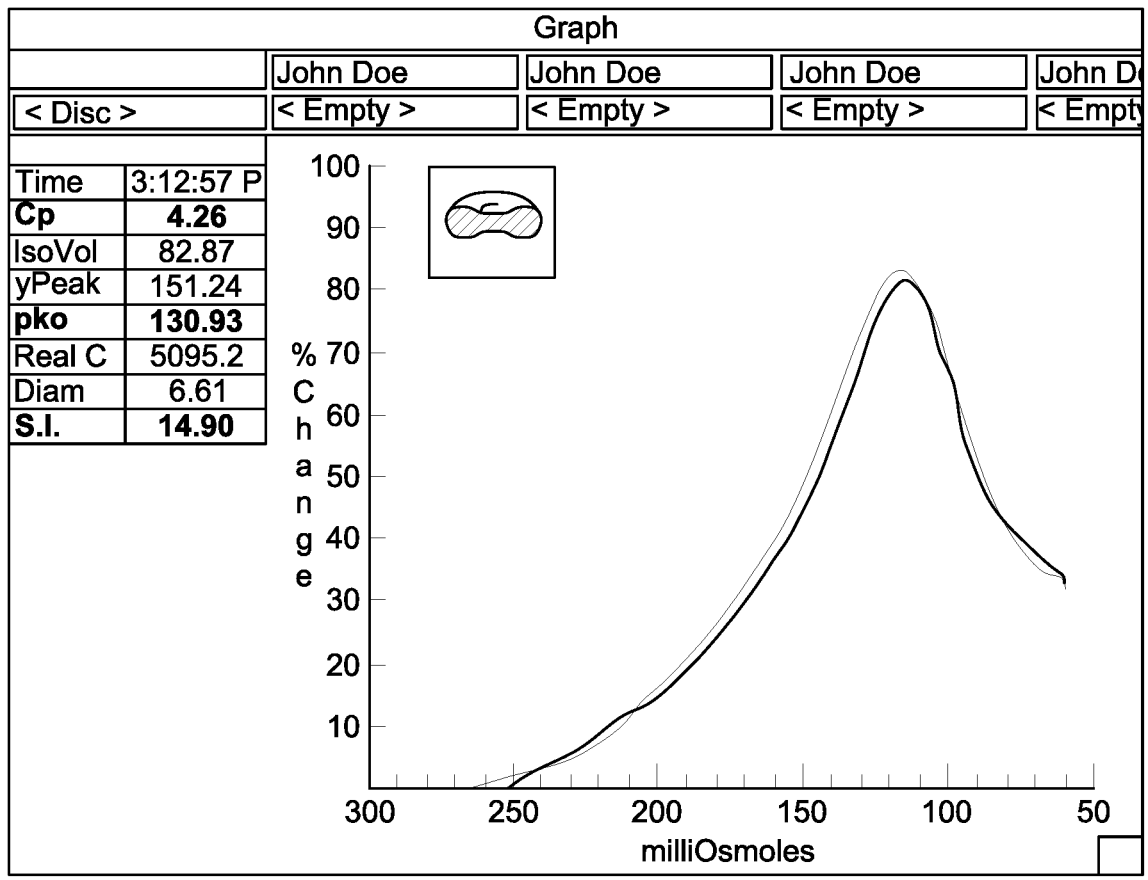
Figures 14C, 14D:
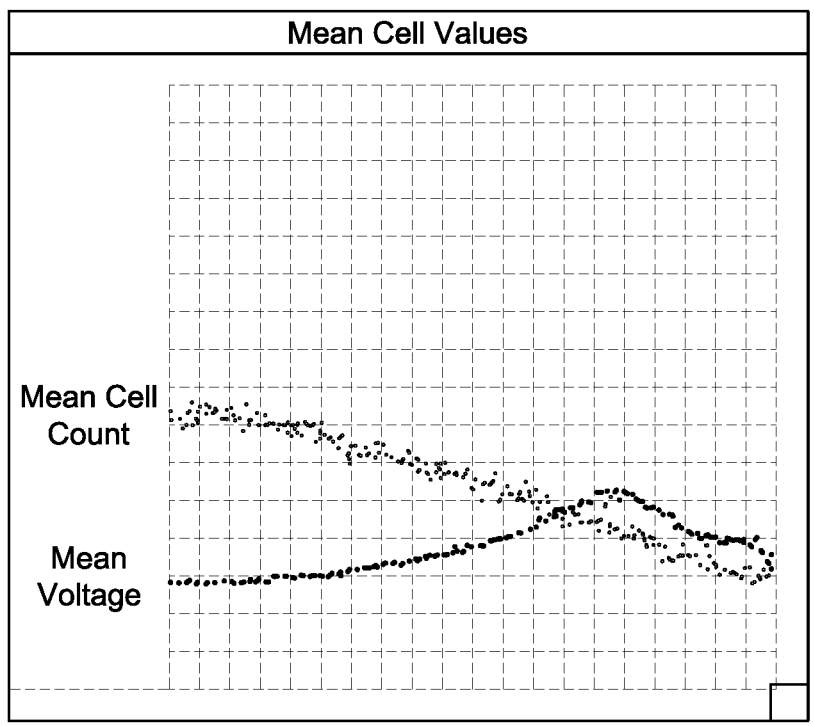

In the WO 97/24598 disclosure, the point at which the blood cells become spherical when subjected to a predetermined continuous osmotic gradient can be determined very accurately. FIGS. 14A-14D show the results for a blood sample. FIG. 14A shows a three-dimensional plot of measured voltage against osmolality, FIG. 14B shows a graph of osmolality against percentage change in measured voltage for a series of tests of a sample, FIG. 14C shows the results in a tabulated form, and FIG. 14D shows superimposed graphs of mean voltage and cell count for the test, respectively, against osmolality. As shown, the cell count, which is initially 5000 cells per second at the beginning of a test, reduces throughout the test due to the dilution of the sample in the gradient generator section 2. The mean voltage rises to a maximum at a critical osmolality where the blood cells achieve a spherical shape and then reduces. Using standard statistical techniques, the maxima of the curve in FIG. 14B, and therefore the mean voltage at the maxima, can be determined. The mean voltage at this point gives the value SR1 for the above equation. It is then possible to select any osmolality of interest, and the associated measured voltage SR2, and calculate the true volume of the cell at that osmolality. Typically, the isotonic osmolality is chosen, corresponding to approximately 290 mOsm.

For the above test, at 290 mOsm, SR1=1432 mV and SR2=670 mV. Accordingly:

$$f(K_{shape})_{290} = 1 + \left[\frac{1432 - 670}{1432}\right] \times 0.7518$$

$K_{shape}$ 290=1.40 and therefore:

$$\begin{aligned}\text{Volume}_{iso} &= SR2 \times K_{volts} \times K_{shape} \\ &= 670 \times 0.0980 \times 1.40 \\ &= 91.92 \; fL,\end{aligned}$$

and:

$$\begin{aligned}\text{Volume}_{sph} &= SR1 \times K_{volts} \times K_{shape} \\ &= 1432 \times 0.098 \times 1.0 \\ &= 140.34 \; fL\end{aligned}$$

Knowledge of the mean volume of the sphered cells allows calculation of spherical radius as:

$$\text{Volume}_{sph} = \frac{4\pi r^3}{3}$$

from which the spherical radius $$r = \left[\frac{3 \times \text{Volume}_{sph}}{4\pi}\right]^{\frac{1}{3}}$$

$$r = \left[\frac{3 \times 140.34}{4\pi}\right]^{\frac{1}{3}}$$

$$= 3.22 \; \mu m$$

Having determined $\text{volume}_{iso}$, $\text{volume}_{sph}$ and the spherical cell radius, it is possible to calculate a number of other parameters. In particular:

1. Surface Area (SA)

Since the surface area SA is virtually unchanged at all osmolarities, the cell membrane being virtually inelastic, and in particular between spherical and isotonic, the surface area SA may be calculated by substituting r into the expression:

$$\begin{aligned}SA &= 4\pi r^2 \\ &= 4\pi \times (3.22)^2 \\ &= 130.29 \; \mu m^2\end{aligned}$$

2. Surface Area to Volume Ratio (SAVR)

Given that the walls of a red cell can be deformed without altering their area, once the surface area SA is known for a cell or set of cells of any particular shape, the surface area is known for any other shape, thus the surface area to volume ratio SAVR can be calculated for any volume. SAVR is given by the expression:

$$SAVR = \frac{4\pi r^2}{\text{Volume}_{iso}} = \frac{SA}{\text{Volume}_{iso}}$$
$$= \frac{130.29}{91.99}$$
$$= 1.42$$

3. Sphericity Index (SI)

The present invention can easily measure the SAVR, a widely quoted but hitherto, rarely measured indication of cell shape. For a spherical cell, it has the value of 3/r, but since cells of the same shape but of different sizes may have different SAVR values, it is desirable to use the sphericity index SI which is a dimensionless unit independent of cell size, given by the expression:

$$SI = SAVR \times \frac{r}{3}$$
$$= 1.52$$
$$= 1.42 \times \frac{3.22}{3}$$

4. Cell Diameter (D)

When the normal cell is in the form of a bi-concave disc at isotonic osmolality, it is known that the ratio of the radius of a sphere to that of the bi-concave disc is 0.8155. On this basis, therefore, the diameter D of a cell in the form of a bi-concave disc is given by:

$$D = \frac{2r}{0.8155}$$
$$= \frac{2 \times 3.22}{0.8155}$$
$$= 8.19 \ \mu m$$

Figure 15:
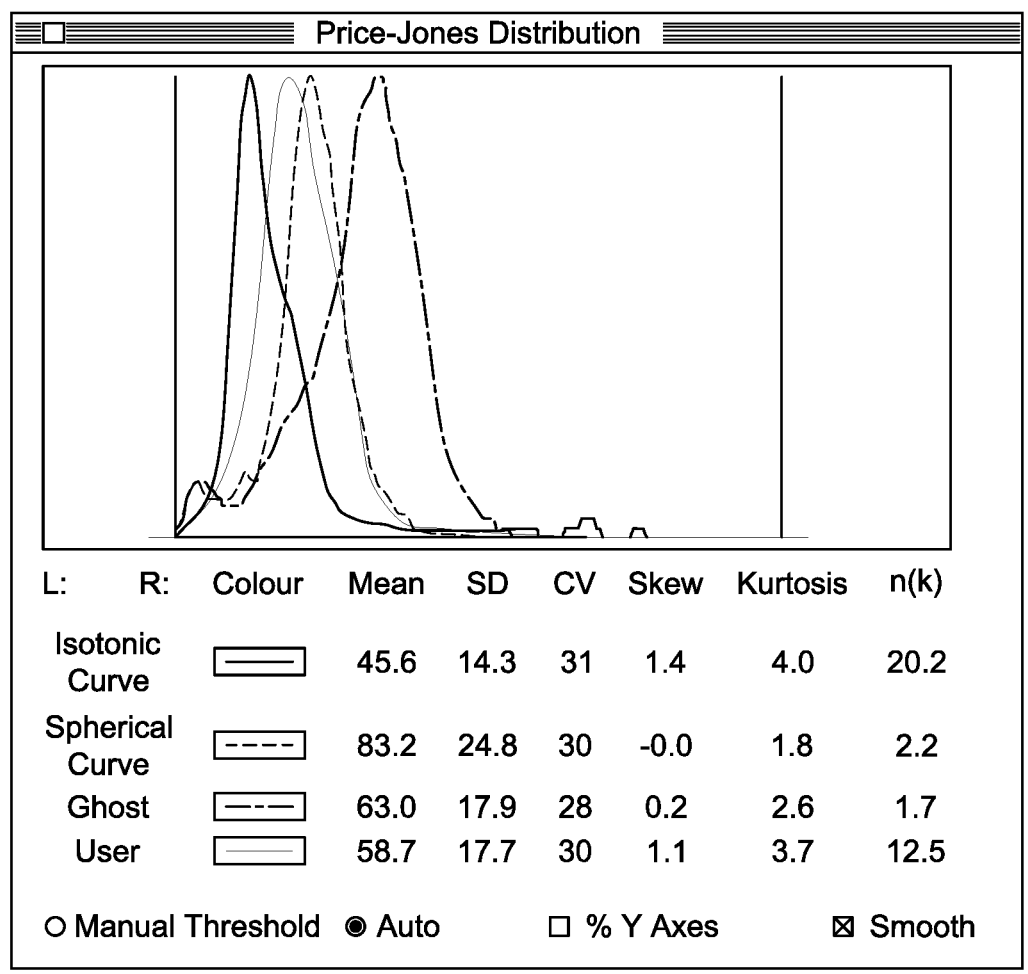
FIG. 15 shows Price-Jones (frequency distribution) curves of the results shown in FIGS. 14A-14D.

The same parameter can be determined for all other osmolarities. The frequency distribution of the cell diameters is given both as dispersion statistics as well as a frequency distribution plot. The present invention provides an automated version of the known manual procedure of plotting a frequency distribution of isotonic cell diameters known as a Price-Jones curve. The present invention is capable of producing a Price-Jones curve of cell diameters for any shape of cell and, in particular, isotonic, spherical and ghost cells (at any osmolality) and is typically based on 250,000 cells. This is shown in FIG. 15.

5. Cell Thickness (CT)

When the cell is in the form of a bi-concave disc, an approximate measure of the cell thickness can be derived from the cross-sectional area and the volume. The area is of course derivable from the radius of the cell in spherical form. The cell thickness can therefore be calculated as follows:

$$CT = \frac{\text{Volume}_{iso}}{\pi r^2}$$
$$= \frac{91.92}{\pi \times 3.22^2}$$
$$= 2.82 \ \mu m$$

6. Surface Area Per Milliliter (SAml)

The product of the surface area (SA) and the cell count (RBC) is the surface area per milliliter (SAml) available for physiological exchange. The total surface area of the proximal renal tubes that are responsible for acid-base regulation of the body fluids is 5 m². The total surface area of the red blood cells that also play an important part in the regulation of the acid-base balance is 4572 m², almost 3 orders of magnitude larger. RBC is calculated internally from a knowledge of the flow rate of the diluted blood sample, a cell count for each sample and the dilution of the original whole blood sample. Typically, RBC is approximately $4.29 \times 10^9$ red cells per ml.

$$SAml = SA \times RBC \text{ (per ml)}$$
$$= 130.29 \ \mu m^2 \times 4.29 \ 10^9$$
$$= 0.56 \ m^2 \ ml^{-1}$$

7. Cell Permeability (Cp)

Figure 16:
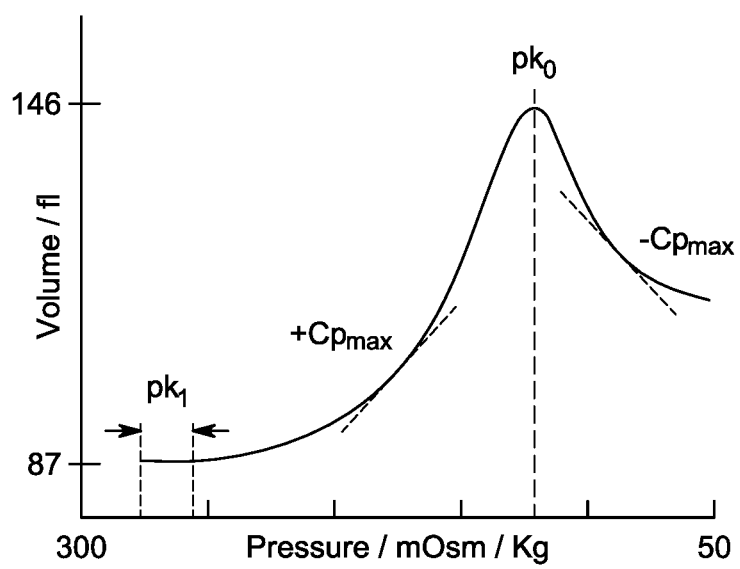
FIG. 16 shows a graph of osmolality against cell volume and indicates a number of different measures of cell permeability.
Figure 17:
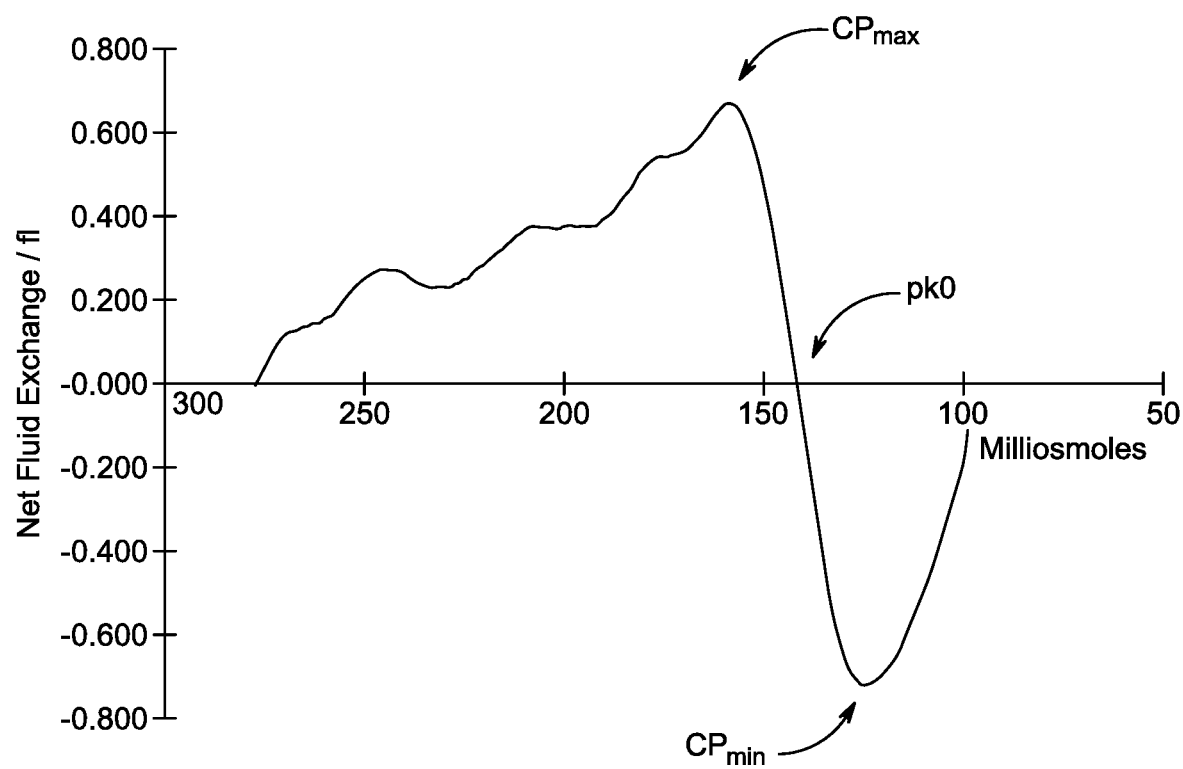
FIG. 17 shows a graph of osmolality against net fluid flow.

The plot of cell volume against osmolality in FIG. 16 reveals a characteristic curve showing how the cell volume changes with decreasing osmolality and indicates maximum and minimum rates of flow across the membrane and the flow rates attributed to a particular or series of osmotic pressures. Many of the cell permeability measurements are primarily dependent upon the change in volume of the cells at different pressures. The results are shown plotted as a graph of net fluid exchange against osmotic pressure in FIG. 17.

Having obtained measures of osmotic pressure ($P_{osm}$), cell volume, surface area (SA) and other relevant environmental factors, it is possible to obtain a number of measures of cell permeability, such as Cp rate, permeability constant, $Cp\Delta$, $Cp_{max}$, MSR, Cpml, and $Cp_{net}$, as described above.

APPENDIX B: CERTAIN ASPECTS OF WO 97/24601

The WO 97/24601 disclosure provides a new method in which a sample of cells suspended in a liquid medium, wherein the cells have at least one measurable property distinct from that of the liquid medium, is subjected to analysis by a method including the steps of:
  (a) passing a first aliquot of the sample cell suspension through a sensor,
  (b) measuring said at least one property of the cell suspension,
  (c) recording the measurement of said property for the first aliquot of cells,
  (d) subjecting the first or at least one other aliquot of the sample cell suspension to an alteration in at least one parameter of the cell environment which has the potential to alter the shape of the cells to a known or identifiable extent to create an altered cell suspension,
  (e) passing said altered cell suspension through a sensor,
  (f) measuring said at least one property of the altered cell suspension,
  (g) recording the measurement of said at least one property for said altered suspension,
  (h) comparing the data from steps (c) and (g) and determining a shape compensation factor to be applied to the measurement of said at least one property of the first aliquot of cells in step (c) in the calculation of a cell parameter to take account of a variation in shape between the first aliquot of cells in step (c) and said altered cell suspension in step (g).

In the WO 97/24601 disclosure, a cell parameter, for example cell volume, is determined by subjecting one or more aliquots of a sample cell suspension to one or more alterations of at least one parameter of the cell environment to identify a point at which the cells achieve a particular shape to obtain a sample specific shape compensation factor.

All existing automated methods include a fixed shape correction in the treatment of sensor readings taken from a single cell suspension in which the cell environment is not altered during the course of the test, which compensates for the deviation of the cells from spherical shape particles commonly used to calibrate the instruments. However, in a calculation of cell volume, as the cell shape is unknown, a fixed correction of approximately 1.5 is entered into the calculation on the assumption that a sample cell has the shape of a biconcave disc. This correction is correct for the average cell in the average person at isotonic osmolality, but it is incorrect for many categories of illness where the assumed fixed correction may induce an error of up to 60% in the estimate of cell volume. In the method of the WO 97/24601 disclosure, an estimate is made of the in vivo cell shape so that a true estimate of cell volume or other cell parameter at all shapes is obtained. In the preferred embodiment of the WO 97/24601 disclosure, a shape correction function is determined which is used to generate a shape correction factor which is a measure of the shape of the cell specific for that cell sample. The value of the shape correction factor generated by this function then replaces the conventional fixed shape correction of 1.5 to obtain a true measure of cell volume and other cell parameters.

According to a second aspect of the present invention, an apparatus for testing a sample cell suspension in a liquid medium in accordance with the method of the first aspect of the present invention comprises data processing means programmed to compare data from said steps (c) and (g) to determine a shape compensation factor to be applied to the measurement of said at least one property of the first aliquot of cells in the calculation of a cell parameter to take account of a variation in shape between the first aliquot of cells and said altered cell suspension.

Preferably, the data processing means comprises the internal microprocessor of a personal computer.

Preferably, the property of the cells which differs from the liquid medium is one which is directly related to the volume of the cell. Such a property is electrical resistance or impedance, and this is measured as in the normal Coulter Counter by determining the flow of electrical current through the cell suspension as it passes through a sensing zone of the sensor. The sensing zone is usually a channel or aperture through which the cell suspension is caused to flow. Any type of sensor may be used provided that the sensor produces a signal which is proportional to the cell size. Such sensor types may depend upon voltage, current, RF, NMR, optical, acoustic or magnetic properties. Most preferably, the sensor is substantially as described in WO 97/24600.

Although the method is usually carried out on blood cells, for instance white or, usually, red blood cells, it may also be used to investigate other cell suspensions, which may be plant or animal cells or micro-organism cells, for instance, bacterial cells.

The environmental parameter which is changed in the method may be any change which will result in a measurable parameter of the cells being altered. The method is of most value where the change in environmental parameter changes the size, shape, or other anatomical property of the cell. The method is of particular value in detecting a change in the volume of cells as a result of a change of osmolality of the surrounding medium. Preferably therefore, the environmental parameter change is an alteration, usually a reduction, in osmolality. Typically the environment of the first aliquot is isotonic, and thus the environment of the altered suspension in step (g) is rendered hypotonic, for instance by diluting a portion of isotonic sample suspension with a hypotonic diluent.

The method of the present invention, as well as being applicable to cells, as described above, may also be applicable to other natural and synthetic vesicles which comprise a membrane surrounding an interior space, the shape or size or deformability of which may be altered by altering an environmental parameter. Such vesicles may be useful as membrane models, for instance, or as drug delivery devices or as devices for storing and/or stabilizing other active ingredients or to contain hemoglobin in blood substitutes.

In the method, the time between the initiation of the alteration of the environment to the passage of the cells through the sensing zone may vary but preferably is less than 1 minute, more preferably less than 10 seconds. The time is generally controlled in the method and preferably it is kept constant. If it changes, then time may be a further factor which is taken into account in the calculation step of step (h).

Although it is possible for the method of the WO 97/24601 disclosure to comprise merely of the treatment of two aliquots of the sample cell suspension, more usually the method includes the steps of subjecting another aliquot of sample cell suspension to a second alteration in at least one parameter of the cell environment passing said altered aliquot through the sensor, recording the change in said property of the cell suspension under the altered environment as each of a number of cells of the aliquot passes through the sensor, recording all the concomitant properties of the environment together with the said change on a cell-by-cell basis, and comparing the data from previous step (c) and the preceding step as a function of the extent of said second alteration of environmental parameter. Usually there are many further aliquots treated in a similar way. The greater the number of aliquots tested, the greater the potential accuracy, precision and resolution of the results which are obtained. It is also possible to subject a only single aliquot of sample suspension to a series of such alterations in at least one parameter of the cell environment.

In its simplest form, the test is dependent upon two sensor measurements, one of which is at a maximum, or near to it. However, the environment required to induce a cell to reach a maximum size can be entirely unknown.

Furthermore, the environmental changes can be sequential, non-sequential, non-sequential, random, continuous or discontinuous, provided that the maximum achievable cell size is recorded. One convenient way of ensuring this is to test the cell in a continuously changing environment so that all possible cell sizes are recorded, including the maximum.

The second alteration in the cell environment is usually of the same type as the first alteration. It may even be of the same extent as the first alteration, but the time between initiation of the alteration and passage of the cells through the sensing zone may be different, thereby monitoring the rate of change in the cells properties when subjected to a particular change in environmental parameter. This technique may also be used to monitor cells which have been in storage for several years.

In another embodiment the second alteration in environmental parameter is of the same type as the first alteration, but has a different extent. In such a case, it is preferred for the time between initiation of the alteration and passage of the cells through the sensing zone to be the same for each aliquot of the cell suspension. Preferably, in this embodiment of the method second and subsequent aliquots of cell suspension are subjected to successively increasing extents of alteration of the environmental parameter such that the change of said property produces a maximum and then decreases as the extent of alteration of environmental parameter is increased. In the preferred embodiment in which the property of the cell suspension which is monitored is directly related to the volume of the cells, and where the alteration of environmental parameter for the second and subsequent aliquots results in a volume increase of the cells, preferably, the environmental change is varied until the cell volume passes a maximum.

Since the preferred application of the method of the WO 97/24601 disclosure is to analyze red blood cells, the following discussion is based mainly on the study of such cells. It will be realized, however, that the method is, as mentioned above, applicable to other cell types and to determine other information concerning an organism from a study of such cell types.

In current practice, cell shape, particularly red blood cell shape, is not estimated by any automated method. The present WO 97/24601 disclosure enables the user to determine cell shape and derive other data, such as cell volume, surface area, surface area to volume ratio, sphericity index, cell thickness, and surface area per milliliter. Aside from research and experimental laboratories, none of these measurements are currently available in any clinical laboratory and hitherto, none could be completed within 60 seconds. In particular, the preferred method where the sample cell suspension is subjected to a concentration gradient, enables the automatic detection or a user to detect accurately when the cells adopt a substantially spherical shape immediately before lysis.

The commercially available Coulter Counter particle counter instrument produces a signal in proportion to the volume of particles which pass through a sensing zone, typically a voltage pulse for each particle. The size of the signal is calibrated against spherical latex particles of known volume to produce a conversion factor to convert a measured signal, typically voltage, into a particle volume, typically femtoliters. When using particle counters of this type to measure the size of particles that are not spheres, as is typical in biological samples such as platelets, fibroblasts or red blood cells which have the shape of a disc, a fixed shape correction factor is used in addition to the conversion factor. This fixed shape correction, based on theoretical and empirical data, is designed to produce a correct volume estimate when measuring particles that are not spherical as the size of the voltage pulses are not solely related to cell volume. For instance, normal red blood cells produce sensor pulses which are too small by a factor of around 1.5 when measured on these instruments and therefore a fixed correction of 1.5 is entered into the calculation of cell volume to produce the correct valve.

In the preferred method of the WO 97/24601 disclosure, this fixed shape correction factor is replaced with a sample specific shape correction factor $f(K_{shape})$ generated from a shape correction function (see Appendix A). The shape correction function is continuous for all cell shapes and ranges in value from 1.0 for spherical cells to infinity for a perfectly flat cell. The shape correction function increases the accuracy with which cell parameters which depend on anatomical measurement, such as cell volume, can be determined. Preferably, the shape correction factor a blood cell is determined by comparing the measured voltage (SR1) with the measured (SR2) voltage of cells of the same blood sample at some known or identifiable shape, most conveniently cells which have adopted a spherical shape.

The WO 97/24601 disclosure also provides a new method in which a sample of cells suspended in a liquid medium, wherein the cells have at least one measurable property distinct from that of the liquid medium, is subjected to analysis by a method including the steps of:
  (a) passing a first aliquot of the sample cell suspension through a sensor,
  (b) measuring said at least one property of the cell suspension as each of a number of cells of the first aliquot passes through the sensor,
  (c) recording the measurement of said property for the first aliquot of cells on a cell-by-cell basis,
  (d) subjecting the first or at least one other aliquot of the sample cell suspension to an alteration in at least one parameter of the cell environment which has the potential to alter the said at least one property of the cells to create an altered cell suspension,
  (e) passing said altered cell suspension through a sensor,
  (f) measuring said at least one property of the altered cell suspension as each of a number of cells of the altered cell suspension passes through the sensor,
  (g) recording the measurement of said at least one property for the altered cell suspension on a cell-by-cell basis,
  (h) comparing the data from steps (c) and (g) as a function of the extent of said alteration of said parameter of the cell environment and frequency distribution of said at least one property.

By carrying out the method of the WO 97/24601 disclosure, and in particular by recording the property change data for the cells on a cell-by-cell basis, the data can be subsequently treated so as to identify sub-populations of cells within the sample which respond differently to one another under the imposition of the environmental parameter alteration.

The WO 97/24601 disclosure provides a method for testing blood samples which enables data to be obtained on a cell-by-cell basis. By using the data on a cell-by-cell basis, it enables new parameters to be measured and to obtain information on the distribution of cells of different sizes among a population and reveal sub-populations of cells based on their anatomical and physiological properties.

A measure of reproducibility is the standard deviation of the observations made. An aspect of the WO 97/24601 disclosure is to provide improvements in which the standard deviation of the results obtained is reduced to ensure clinical utility.

The WO 97/24601 disclosure also provides an apparatus for testing a sample cell suspension in a liquid medium in accordance with the methods of the WO 97/24601 disclosure comprising data processing means programmed to compare data from said steps (c) and (g) as a function of the extent of said alteration of said parameter of the cell environment and frequency distribution of said at least one property.

Other environmental parameter changes which may be investigated include changes in pH, changes in temperature, pressure, ionophores, changes by contact with lytic agents, for instance toxins, cell membrane pore blocking agents or any combinations of these parameters. For instance, it may be useful to determine the effectiveness of lytic agents and/or pore blockers to change the amount or rate of cell volume change on a change in environmental parameters such as osmolality, pH or temperature. Furthermore the effects of two or more agents which affect transport of components in or out of cells on one another may be determined by this technique. It is also possible to subject the cell suspension to a change in shear stress during the passage of the cell suspension through the sensing zone by changing the flow rate through the sensor, without changing any of the other environmental parameters or in conjunction with a change in other environmental parameters. A change in the shear stress may affect the shape of the cell and thus the electrical, optical or other property which is measured by the sensor. Monitoring such a change in the deformation of cells may be of value. In particular, it may be of value to monitor the change in deformability upon changes imposed by disease or, artificially by changing other environmental parameters, such as chemical components of the suspending medium, pH, temperature or osmolality.

Preferably, the data processing means comprises the internal microprocessor of a personal computer.

When full data are available on the distribution of cell size in a particular population of cells subjected to hemolytic shock in a wide range of hypotonic solutions, at osmolarities just below the critical osmolality causing lysis, a gap in the populations is visible. On a 3-D plot or an alternative way of representing the data such as a contour map, the ghost cells are clearly visible and the unruptured cells are clearly identifiable, but between them there is a region defined by, for example, osmolality and cell size where the cells are widely distributed. The existence of this phenomenon, which has been termed "ghost gap", has not previously been recognized, and it has been discovered that the nature of this phenomenon varies with species and between healthy and diseased individuals of particular species. It is a measure of the degree of anisocytosis (size heterogeneity) and can be used in the measurement of the degree of poikilocytosis (shape heterogeneity) of the cell population, which is often used as the basis for classifying all anemia.

The measurements of the cell parameter changes may be stored and retrieved as voltage pulses and they may be displayed as individual dots on a display of voltage against the osmolality of the solution causing the parameter change. When observations are made using a suspension at a single tonicity, the resulting plot shows the frequency distribution of voltage by the intensity of the dots representing cells of the same volume.

The number of blood cells within each aliquot which are counted is typically at least 1000 and the cell-by-cell data is then used to produce an exact frequency distribution of size. Suitably this density can be made more visible by using different colours to give a three dimensional effect, similar to that seen in radar rainfall pictures used in weather forecasting. Alternatively, for a single solution of any tonicity, the measured parameter change could be displayed against the number of individual cells showing the same change. In this way a distribution of cell volume or voltage in a particular tonicity of given osmolality can be obtained.

The method of the WO 97/24601 disclosure may be further improved by, instead of subjecting portions of a sample each to one of a series of hypotonic solutions of different osmolarities to form the individual aliquots, the sample is fed continuously into a solution, the osmolality of which is changed continuously to produce a continuous gradient of aliquots for passage through the sensing zone. Preferably, identical portions of the sample under test are subjected to solutions of each osmolality throughout the range under test after the same time from imposition of the environmental parameter change to the time of passage through the sensing zone. This technique ensures that the cells are subjected to the exact concentration which cause critical changes in that particular sample. Further, an effect of feeding the sample under test into a continuously changing osmolality gradient, is to obtain measurements which are equivalent to treating one particular cell sample with that continuously changing gradient. This technique is the subject of WO 97/24529.

Further, in the WO 97/24601 disclosure, it is possible to examine a particular blood sample at various intervals of time and compare the sets of results to reveal dynamic changes in cell function.

These dynamic changes have revealed that cells slowly decrease their ability to function over time, but they also change in unexpected ways. The size and shape of the cells in a blood sample change in a complex, non-linear but repeatable way, repeating some of the characteristic patterns of change over the course of days and on successive testing. The patterns, emerging over time, show similarity among like samples and often show a characteristic wave motion. The pattern of change may vary between individuals reflecting the health of the individual, or the pattern may vary within a sample. Thus a sample that is homogeneous when first tested may split into two or several sub-populations which change with time and their existence can be detected by subjecting the sample to a wide range of different tonicities and recording the cell size in the way described.

If the entire series of steps are repeated at timed intervals on further aliquots of the original sample and the resulting property change is plotted against osmolality, time and frequency distribution, a four-dimensional display, is obtained which may be likened to a changing weather map. The rate of change of the property in relation to the time taken to perform each test must be such that any changes which occur during the test must not substantially affect the results.

EQUIVALENTS

The embodiments of the disclosure described above are intended to be merely exemplary; numerous variations and modifications will be apparent to those skilled in the art. All such variations and modifications are intended to be within the scope of the present invention as defined in any appended claims.

The invention claimed is:

1. A method of treating or preventing malaria, comprising administering to a subject in need thereof red blood cell (RBC) permeability modulating therapy.

2. The method of claim 1, wherein the RBC permeability modulating therapy is or comprises administering a therapeutically effective amount of a RBC permeability modulating agent.

3. The method of claim 2, wherein the RBC permeability modulating agent is 5-hydroxytryptamine, or a pharmaceutically acceptable salt thereof, and
    wherein the RBC permeability modulating therapy comprises administering the RBC permeability modulating agent to the subject at a concentration in a range from about 500 ng/ml to about 900 ng/mL.

4. The method of claim 2, wherein the RBC permeability modulating agent comprises 5-hydroxytryptophan (5-HTP).

5. The method of claim 2, wherein the RBC permeability modulating agent is or comprises a serotonin norepinephrine reuptake inhibitor (SNRI), monoamine oxidase inhibitors (MAOI), tricyclic antidepressants (TCA), or serotonin antagonist and reuptake inhibitor (SARI).

6. The method of claim 2, wherein the RBC permeability modulating agent is administered orally in an oral dosage form.

7. The method of claim 1, wherein the subject has a PK0 from about 120 mOsm/kg to about 185 mOsm/kg, from about 130 mOsm/kg to about 160 mOsm/kg, from about 130 mOsm/kg to about 150 mOsm/kg, from about 132 mOsm/kg to about 148 mOsm/kg, from about 135 mOsm/kg to about 145 mOsm/kg, or from about 138 mOsm/kg to about 142 mOsm/kg.

8. The method of claim 1, wherein the subject has received or is receiving one or more additional agents selected from mefloquine, doxycycline, atovaquone, and proguanil.

9. The method of claim 1, wherein the subject has received or is receiving one or more additional agents selected from amodiaquine, arteether, artemether, artesunate, artemisinin, atovaquone, chloroquine, cinchoine, cinchonidine, clindamycin, dihydroartemisinin, doxycycline, halofantrine, hydroxychloroquine, lumefantrine, mefloquine, piperaquine, primaquine, pyrimethamine, quinidine, quinine, sulfadoxine, sulfamethoxypyridazine, tafenoquine, and tetracycline.

10. The method of claim 1, wherein the subject is resistant to treatment with one or more agents selected from amodiaquine, arteether, artemether, artesunate, artemisinin, atovaquone, chloroquine, cinchoine, cinchonidine, clindamycin, dihydroartemisinin, doxycycline, halofantrine, hydroxychloroquine, lumefantrine, mefloquine, piperaquine, primaquine, pyrimethamine, quinidine, quinine, sulfadoxine, sulfamethoxypyridazine, tafenoquine, and tetracycline.

11. The method of claim 1, wherein the subject has one or more of the following risk factors:
(i) lives in a geographical area with a high incidence of malaria;
(ii) has recently traveled to a geographical area with a high incidence of malaria;
(iii) has recently been bitten by a mosquito in a geographical area with a high incidence of malaria;
(iv) is harboring dormant malaria parasite;
(v) under 5 years of age; or
(vi) is pregnant.

12. The method of claim 2, wherein the RBC permeability modulating agent decreases the RBC permeability of the subject.

13. The method of claim 2, wherein the RBC permeability modulating agent comprises lactose, and
wherein the RBC permeability modulating therapy comprises administering the RBC permeability modulating agent to the subject at a concentration of about 1:20 (v/v) in saturated lactose solution.

14. The method of claim 2, wherein the RBC permeability modulating agent comprises amphotericin B, and
wherein the RBC permeability modulating agent is administered to the subject at a concentration of about 0.5 μg/mL.

15. The method of claim 2, the method further comprising:
establishing a baseline cell membrane permeability parameter of the subject, the cell membrane permeability parameter comprising Pk0; and
administering the RBC permeability modulating agent to the subject at a regular interval until the cell membrane permeability parameter of the subject decreases by a predetermined amount compared to the baseline cell membrane permeability parameter of the subject.

16. The method of claim 15, wherein the RBC permeability modulating agent comprises at least one of amphotericin B, lactose, and 5-hydroxytryptamine.

17. The method of claim 16, wherein the predetermined amount comprises a decrease in Pk0 in range from about 20 mOsm/kg to about 30 mOsm/kg.

18. The method of claim 17, comprising preventing malaria, wherein administering the RBC permeability modulating agent to the subject occurs prior to exposure of the subject to malaria.

19. The method of claim 17, comprising treating malaria, wherein administering the RBC permeability modulating agent to the subject occurs after exposure of the subject to malaria.

20. The method of claim 16, wherein the predetermined amount comprises a decrease to a Pk0 value below about 120 mOsm/kg.

* * * * *